United States Patent [19]

Yoshida et al.

[11] Patent Number: 5,679,762

[45] Date of Patent: Oct. 21, 1997

[54] BLOCK POLYMER, THERMOPLASTIC ADDITION POLYMER, AND THEIR PRODUCTION PROCESS AND USE

[75] Inventors: Masatoshi Yoshida, Nara; Nobuhiro Kobayashi; Hiroaki Hasegawa, both of Suita, all of Japan

[73] Assignee: Nippon Shokubai Co., Ltd., Osaka, Japan

[21] Appl. No.: 507,243

[22] PCT Filed: Dec. 22, 1994

[86] PCT No.: PCT/JP94/02198

§ 371 Date: Aug. 18, 1995

§ 102(e) Date: Aug. 18, 1995

[87] PCT Pub. No.: WO95/18162

PCT Pub. Date: Jul. 6, 1995

[30] Foreign Application Priority Data

| Dec. 24, 1993 | [JP] | Japan | 5-328954 |
| Dec. 13, 1994 | [JP] | Japan | 6-309189 |
| Dec. 21, 1994 | [JP] | Japan | 6-318630 |

[51] Int. Cl.$^6$ .................................................. C08G 63/68
[52] U.S. Cl. .......................... 528/364; 528/374; 528/376
[58] Field of Search ............................ 528/374, 376, 528/364

[56] References Cited

U.S. PATENT DOCUMENTS

| 4,434,261 | 2/1984 | Brugel et al. | 524/109 |
| 5,057,619 | 10/1991 | Kumar et al. | 556/420 |
| 5,093,385 | 3/1992 | Ali | 522/57 |
| 5,200,436 | 4/1993 | Kumar et al. | 522/57 |
| 5,294,728 | 3/1994 | Emmons et al. | 558/255 |
| 5,399,642 | 3/1995 | Emmons et al. | 526/224 |

FOREIGN PATENT DOCUMENTS

| 0541272 | 12/1993 | European Pat. Off. . |
| 2757429 | 5/1979 | Germany . |
| 59-47276 | 3/1984 | Japan . |
| 59-227967 | 12/1984 | Japan . |
| 354212 | 3/1991 | Japan . |
| 397735 | 4/1991 | Japan . |
| 3190911 | 8/1991 | Japan . |
| 4227615 | 8/1992 | Japan . |
| 5500827 | 2/1993 | Japan . |
| 63132914 | 6/1995 | Japan . |

OTHER PUBLICATIONS

"Living Radical Polymerization of Methyl Methacrylate with a Tetrafunctional Photoiniferter: Synthesis of a Star Polymer", Poly. J., vol. 16, No. 6, pp. 511–514 (1984).

"Living Radical Polymerization in Homogeneous System with Phenylazotriphenylmethane as a Thermal Iniferter", Poly., Bull., vol. 16, pp. 277–284, (1986).

*Primary Examiner*—Mark D. Sweet
*Attorney, Agent, or Firm*—Roylance, Abrams, Berdo & Goodman, L.L.P.

[57] ABSTRACT

An inexpensive block polymer which is effectively available in various uses with regard to hot-melt resin compositions, pressure sensitive adhesives, carriers for pressure sensitive adhesives, and the like. This block polymer has a structure including a polyvalent mercaptan segment at its center from which two or more polymer segments are radially extended. The number-average molecular weight of this polymer is in a range of 2,000 to 1,000,000, and the two or more polymer segments have two or more different compositions. This block polymer is obtainable by a process including two or more steps of radical polymerization of polymerizable monomer components having different compositions using a polyvalent mercaptan as a polymerization initiator.

19 Claims, 1 Drawing Sheet

BLOCK POLYMER, THERMOPLASTIC ADDITION POLYMER, AND THEIR PRODUCTION PROCESS AND USE

TECHNICAL FIELD

The present invention relates to a block polymer, a thermoplastic addition polymer, and their production process and use.

BACKGROUND ART

Examples of known thermoplastic polymers having two or more polymer segments which are radially extended from a central segment of the polymers are as follows: a hybrid star-shaped polymer having a condensed polymer segment and acrylic addition polymer segments which are radially extended from the condensed polymer segment (Japanese Official Patent Provisional Publication (Kokai) No. Showa 63-132914); a star-shaped polymer having a structure including a diphenylethylene derivative at its center from which three polymer segments formed by polymerization are radially extended (Japanese Official Patent Provisional Publication (Kokai) No. Heisei 3-190911); a star-shaped polymer having a structure in which a polyfunctional crosslinking agent having at least two polymerizable double bonds is included at the polymer center from which two or more polymer segments formed by polymerization are radially extended (Japanese Patent Publication (Kohyo) No. Heisei 5-500827); a star-shaped block polymer formed by photo-initiated radical polymerization utilizing a dithiocarbamate group (Poly. J., vol. 16, p. 511 (published 1984)); a star-shaped block polymer formed by thermal-cleavage radical polymerization utilizing a triphenylmethyl group that is introduced into a terminal of a polymer (Poly. Bull., vol. 16, p. 277 (published 1985)); and so on.

In the above-mentioned conventional star-shaped polymers, the centers of the radial structures derive from the condensed polymer, diphenylethylene derivative, the polyfunctional crosslinking agent, the polyfunctional polymerization-initiator, and the like. Therefore, the combination of the polymer segments is limited, the polymer segments are limited to those which derive from homopolymers, the type of monomer units constituting the polymer segments is limited, or the irradiation of light (ultraviolet rays) is needed and the permeability of monomers in a depth direction is too weak for industrial mass production. Thus, the conventional star-shaped polymers are only utilized in very limited industrial fields and expensive.

In addition, in the above-mentioned conventional star-shaped polymers, blocks of an identical polymer cause phase separation, whereby the transparency is deteriorated and the mechanical strength is weakened.

DISCLOSURE OF THE INVENTION

Objects of the Invention

It is an object of the present invention to provide an inexpensive block polymer which is effectively available in various uses with regard to resins for molding, hot-melt adhesives, hot-melt pressure sensitive adhesives, thermoplastic elastomers, resins for toners, carriers for pressure sensitive adhesive double coated tapes of high strength, water-soluble pressure sensitive adhesives, impact resistance-improving resins, compatibilizers, tackifiers, dispersants, and the like.

It is another object of the present invention to provide a process for easily producing such a block polymer by industrially inexpensive radical polymerization.

It is another object of the present invention to provide a new thermoplastic addition polymer having excellent transparency and mechanical strength, of which the functionality can be enhanced without involving the phase separation, although it is a block polymer.

It is another object of the present invention to provide a process for producing such a thermoplastic addition polymer with industrial ease.

It is another object of the present invention to provide use of the block polymer of the present invention.

It is another object of the present invention to provide use of the thermoplastic addition polymer of the present invention.

SUMMARY OF THE INVENTION

A block polymer of the present invention includes a polyvalent mercaptan segment and two or more polymer segments and has a number-average molecular weight of 2,000 to 1,000,000, wherein the two or more polymer segments are radially extended from the polyvalent mercaptan segment and have two or more different compositions.

A process for producing a block polymer, according to the present invention, includes a preparation step, a first polymerization step, an adding step, and a second polymerization step. The preparation step includes a step of preparing a first mixture including a first polymerizable unsaturated monomer and a polyvalent mercaptan. The first polymerization step includes a step of carrying out radical polymerization of the first polymerizable unsaturated monomer, the radical polymerization being initiated with a mercapto group of the polyvalent mercaptan which is contained in the prepared mixture. The adding step includes a step of adding a second polymerizable unsaturated monomer to a product from the radical polymerization in the first polymerization step, thus producing a second mixture, wherein the second polymerizable unsaturated monomer has a composition different from that of the first polymerizable unsaturated monomer. The second polymerization step includes a step of carrying out radical polymerization of the polymerizable unsaturated monomers which are contained in the second mixture.

A thermoplastic addition polymer, according to a first embodiment of the present invention, includes a collective of macromolecules having a polyvalent mercaptan segment and two or more copolymer segments. The copolymer segments include two or more kinds of different polymerizable unsaturated monomer units, are radially extended from the polyvalent mercaptan segment, and have compositions which continuously vary over the entire collective of macromolecules.

A thermoplastic addition polymer, according to a second embodiment of the present invention, includes two or more kinds of different polymerizable unsaturated monomer units and has a number-average molecular weight of 4,000 to 1,000,000, only one glass transition temperature peak with a width of 50° C. or more, and a parallel-rays transmittance of 85% or more.

A process for producing a thermoplastic addition polymer, according to the present invention, includes a preparation step, an adding step, and a polymerization step. The preparation step includes a step of preparing a mixture including a first polymerizable unsaturated monomer and a polyvalent mercaptan. The adding step includes a step of gradually adding a second polymerizable unsaturated monomer to the mixture obtained by the preparation step, wherein the second polymerizable unsaturated monomer has a composition different from that of the first polymerizable unsaturated monomer. The polymerization step includes a step of carrying out radical polymerization of a mixture of the first polymerizable unsaturated monomer and the added second polymerizable unsaturated monomer during the adding step, the radical polymerization being initiated with a mercapto group of the polyvalent mercaptan.

A hot-melt resin composition, according to a first embodiment of the present invention, includes a block polymer having a polyvalent mercaptan segment and two or more polymer segments and further having a number-average molecular weight of 10,000 to 200,000, wherein the two or more polymer segments are radially extended from the polyvalent mercaptan segment and have two or more different compositions.

A hot-melt resin composition, according to a second embodiment of the present invention, includes a block polymer obtainable by a production process including a preparation step, a first polymerization step, an adding step, and a second polymerization step. The preparation step includes a step of preparing a first mixture including a first polymerizable unsaturated monomer and a polyvalent mercaptan. The first polymerization step includes a step of carrying out radical polymerization of the first polymerizable unsaturated monomer, the radical polymerization being initiated with a mercapto group of the polyvalent mercaptan. The adding step includes a step of adding a second polymerizable unsaturated monomer to a reaction mixture obtained by the first polymerization step, thus producing a second mixture, wherein the second polymerizable unsaturated monomer has a composition different from that of the first polymerizable unsaturated monomer. The second polymerization step includes a step of carrying out radical polymerization of the polymerizable unsaturated monomers which are contained in the second mixture.

A hot-melt resin composition, according to a third embodiment of the present invention, includes a block polymer having a polyvalent mercaptan segment and two or more polymer segments and further having a number-average molecular weight of 10,000 to 200,000, wherein the two or more polymer segments have two or more different compositions including a carboxyl group-containing polymerizable unsaturated monomer unit and a (meth)acrylic acid ester monomer unit and are radially extended from the polyvalent mercaptan segment.

A hot-melt resin composition, according to a fourth embodiment of the present invention, includes a block polymer obtainable by a production process including a preparation step, a first polymerization step, an adding step, and a second polymerization step. The preparation step includes a step of preparing a first mixture including a first polymerizable unsaturated monomer and a polyvalent mercaptan, wherein the first polymerizable unsaturated monomer includes a carboxyl group-containing polymerizable unsaturated monomer and a (meth)acrylic acid ester monomer. The first polymerization step includes a step of carrying out radical polymerization of the first polymerizable unsaturated monomer, the radical polymerization being initiated with a mercapto group of the polyvalent mercaptan. The adding step includes a step of adding a second polymerizable unsaturated monomer to a reaction mixture obtained by the first polymerization step, thus producing a second mixture, wherein the second polymerizable unsaturated monomer includes a carboxyl group-containing polymerizable unsaturated monomer and a (meth)acrylic acid ester monomer and has a composition different from that of the first polymerizable unsaturated monomer. The second polymerization step includes a step of carrying out radical polymerization of the polymerizable unsaturated monomers which are contained in the second mixture.

A hot-melt resin composition, according to a fifth embodiment of the present invention, includes a thermoplastic addition polymer including a collective of macromolecules having a polyvalent mercaptan segment and two or more copolymer segments. The two or more copolymer segments include two or more kinds of different polymerizable unsaturated monomer units, are radially extended from the polyvalent mercaptan segment, and have compositions which continuously vary over the entire collective of macromolecules.

A hot-melt resin composition, according to a sixth embodiment of the present invention, includes a thermoplastic addition polymer, wherein the thermoplastic addition polymer includes two or more kinds of different polymerizable unsaturated monomer units and has a number-average molecular weight of 10,000 to 200,000, only one glass transition temperature peak with a width of 50° C. or more, and a parallel-rays transmittance of 85% or more.

A hot-melt resin composition, according to a seventh embodiment of the present invention, includes a thermoplastic addition polymer which is obtainable by a production process including a preparation step, an adding step, and a polymerization step. The preparation step includes a step of preparing a mixture including a first polymerizable unsaturated monomer and a polyvalent mercaptan. The adding step includes a step of gradually adding a second polymerizable unsaturated monomer to the mixture obtained by the preparation step, wherein the second polymerizable unsaturated monomer has a composition different from that of the first polymerizable unsaturated monomer. The polymerization step includes a step of carrying out radical polymerization of a mixture of the first polymerizable unsaturated monomer and the added second polymerizable unsaturated monomer during the adding step, the radical polymerization being initiated with a mercapto group of the polyvalent mercaptan.

A hot-melt resin composition, according to an eighth embodiment of the present invention, includes a thermoplastic addition polymer including a collective of macromolecules having a polyvalent mercaptan segment and two or more copolymer segments. The two or more copolymer segments include polymerizable unsaturated monomer units including a carboxyl group-containing polymerizable unsaturated monomer unit and a (meth)acrylic acid ester monomer unit, are radially extended from the polyvalent mercaptan segment, and have compositions which continuously vary over the entire collective of macromolecules.

A hot-melt resin composition, according to a ninth embodiment of the present invention, includes a thermoplastic addition polymer, wherein the thermoplastic addition polymer includes a carboxyl group-containing polymerizable unsaturated monomer unit and a (meth)acrylic acid ester monomer unit and has a number-average molecular weight of 10,000 to 200,000, only one glass transition temperature peak with a width of 50° C. or more, and a parallel-rays transmittance of 85% or A hot-melt resin composition, according to a tenth embodiment of the present invention, includes a thermoplastic polymer which is obtainable by a production process including a preparation step, an adding step, and a polymerization step. The preparation step includes a step of preparing a mixture including a polymerizable unsaturated monomer and a polyvalent mercaptan, wherein the first polymerizable unsaturated monomer includes carboxyl group-containing polymerizable unsaturated monomer and a (meth)acrylic acid ester monomer. The adding step includes a step of gradually adding a second polymerizable unsaturated monomer to the mixture obtained by the preparation step, wherein the second polymerizable unsaturated monomer includes a carboxyl group-containing polymerizable unsaturated monomer and a (meth)acrylic acid ester monomer and has a composition different from that of the first polymerizable unsaturated monomer. The polymerization step includes a step of carrying out radical polymerization of a mixture of the first polymerizable unsaturated monomer and the second polymerizable unsaturated monomer during the adding step, the radical polymerization being initiated with a mercapto group of the polyvalent mercaptan.

A hot-melt resin composition, according to an eleventh embodiment of the present invention, includes a thermoplastic addition polymer of a branched structure which has two or more (meth)acrylic polymer segments including a carboxyl group-containing polymerizable unsaturated monomer unit and a (meth)acrylic acid ester monomer unit.

A hot-melt resin composition, according to a twelfth embodiment of the present invention, includes a thermoplastic addition polymer which has a branched structure and is obtainable by a production process including a preparation step and a polymerization step. The preparation step includes a step of preparing a mixture including a polymerizable unsaturated monomer and a polyvalent mercaptan, wherein the polymerizable unsaturated monomer includes a carboxyl group-containing polymerizable unsaturated monomer and a (meth)acrylic acid ester monomer. The polymerization step includes a step of carrying out radical polymerization of the polymerizable unsaturated monomer, the radical polymerization being initiated with a mercapto group of the polyvalent mercaptan.

A hot-melt resin composition, according to a thirteenth embodiment of the present invention, has the same features as of any one of the hot-melt resin compositions according to the first to twelfth embodiments of the present invention, but further includes a metal ion source.

A hot-melt resin composition, according to a fourteenth embodiment of the present invention, includes a metal ion source, a phosphoric acid ester, and one or both of a (meth)acrylic block polymer and a (meth)acrylic thermoplastic addition polymer. The (meth)acrylic block polymer includes a carboxyl group-containing polymerizable unsaturated monomer unit and a (meth)acrylic acid ester monomer unit. The (meth)acrylic thermoplastic addition polymer includes a carboxyl group-containing polymerizable unsaturated monomer unit and a (meth)acrylic acid ester monomer unit.

A hot-melt resin composition, according to a fifteenth embodiment of the present invention, has the same features as of any one of the hot-melt resin compositions according to the first to fourteenth embodiments of the present invention, but further includes a tackifier resin.

A pressure sensitive adhesive composition of the present invention is a pressure sensitive adhesive composition for producing a pressure sensitive adhesive for soft vinyl chloride, the pressure sensitive adhesive being applicable to a soft polyvinyl chloride molding. And a pressure sensitive adhesive composition, according to a first embodiment of the present invention, includes an acrylic block polymer and an organic solvent. The acrylic block polymer is obtainable by a production process including a preparation step, a first polymerization step, an adding step, and a second polymerization step. The preparation step includes a step of preparing a first mixture including a polyvalent mercaptan and a first polymerizable unsaturated monomer which is formable into a high glass transition temperature type polymer having a glass transition temperature of 273 K. or higher. The first polymerization step includes a step of carrying out radical polymerization of the first polymerizable unsaturated monomer, the radical polymerization being initiated with a mercapto group of the polyvalent mercaptan, thus producing a reaction mixture. The adding step includes a step of adding a monomer mixture to the reaction mixture, thus producing a second mixture, wherein the monomer mixture is formable into a polymer having no compatibility with the high glass transition temperature type polymer and includes an alkyl (meth)acrylate monomer. The second polymerization step includes a step of carrying out radical polymerization of the monomers which are contained in the second mixture. As to the organic solvent, there is used an organic solvent into which the acrylic block polymer can be dissolved and/or dispersed.

A pressure sensitive adhesive product, according to an embodiment of the present invention, has a pressure sensitive adhesive layer for soft vinyl chloride, the pressure sensitive adhesive layer being formed using the pressure sensitive adhesive composition of the present invention, and is applicable to a soft polyvinyl chloride molding.

A pressure sensitive adhesive product, according to another embodiment of the present invention, has a pressure sensitive adhesive layer for soft vinyl chloride and further has a base material made of soft polyvinyl chloride, wherein the pressure sensitive adhesive layer is formed using the pressure sensitive adhesive composition of the present invention, and wherein the base material is attached to one or both faces of the pressure sensitive adhesive layer.

A resin composition for a carrier, according to the present invention, is a resin composition which is formable into a carrier for a pressure sensitive adhesive product. And a resin composition for a carrier, according to a first embodiment of the present invention, includes an acrylic block polymer. The acrylic block polymer is obtainable by a production process including a preparation step, a first polymerization step, an adding step, and a second polymerization step. The preparation step includes a step of preparing a first mixture including a polyvalent mercaptan and a first polymerizable unsaturated monomer which is formable into a high glass transition temperature type polymer having a glass transition temperature of 273 K. or higher. The first polymerization step includes a step of carrying out radical polymerization of the first polymerizable unsaturated monomer, the radical polymerization being initiated with a mercapto group of the polyvalent mercaptan, thus producing a reaction mixture. The adding step includes a step of adding a monomer mixture to the reaction mixture, thus producing a second mixture, wherein the monomer mixture is formable into a polymer having no compatibility with the high glass transition temperature type polymer and includes an alkyl (meth)acrylate monomer. The second polymerization step includes a step of carrying out radical polymerization of the monomers which are contained in the second mixture.

A pressure sensitive adhesive product, according to another embodiment of the present invention, has a carrier for a pressure sensitive adhesive product and further has a pressure sensitive adhesive layer, wherein the carrier is formed from the resin composition of the present invention for a carrier, and wherein the pressure sensitive adhesive layer is formed on one or both faces of the carrier.

DETAILED DESCRIPTION OF THE INVENTION

A block polymer of the present invention includes a polyvalent mercaptan segment and two or more polymer segments and has a number-average molecular weight of 2,000 to 1,000,000, wherein the two or more polymer segments are radially extended from the polyvalent mercaptan segment and have two or more different compositions.

In a block polymer according to an embodiment of the present invention, the polyvalent mercaptan segment includes a 3- to 6-valent mercaptan residue, and the two or more polymer segments have two different compositions, the block polymer being shown by the following general formula (I):

  (I)

wherein:

PA and PB denote the polymer segments having different compositions;

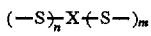

denotes the 3- to 6-valent mercaptan residue;

n+m is a number in a range of 3 to the valence number of the mercaptan residue;

n is a number of 0.1 or more; and m is a number of 0.1 or more.

A process for producing a block polymer, according to the present invention, includes a preparation step, a first polymerization step, an adding step, and a second polymerization step. The preparation step includes a step of preparing a first mixture including a first polymerizable unsaturated monomer and a polyvalent mercaptan. The first polymerization step includes a step of carrying out radical polymerization of the first polymerizable unsaturated monomer, the radical polymerization being initiated with a mercapto group of the polyvalent mercaptan which is contained in the prepared mixture. The adding step includes a step of adding a second polymerizable unsaturated monomer to a product from the radical polymerization in the first polymerization step, thus producing a second mixture, wherein the second polymerizable unsaturated monomer has a composition different from that of the first polymerizable unsaturated monomer. The second polymerization step includes a step of carrying out radical polymerization of the polymerizable unsaturated monomers which are contained in the second mixture.

A thermoplastic addition polymer, according to a first embodiment of the present invention, includes a collective of macromolecules having a polyvalent mercaptan segment and two or more copolymer segments. The copolymer segments include two or more kinds of different polymerizable unsaturated monomer units, are radially extended from the polyvalent mercaptan segment, and have compositions which continuously vary over the entire collective of macromolecules.

A thermoplastic addition polymer, according to a second embodiment of the present invention, includes two or more kinds of different polymerizable unsaturated monomer units and has a number-average molecular weight of 4,000 to 1,000,000, only one glass transition temperature peak with a width of 50° C. or more, and a parallel-rays transmittance of 85% or more.

The thermoplastic addition polymer of the present invention may further include a sulfur atom in a range of 0.005 to 4% by weight.

A process for producing a thermoplastic addition polymer, according to the present invention, includes a preparation step, an adding step, and a polymerization step. The preparation step includes a step of preparing a mixture including a first polymerizable unsaturated monomer and a polyvalent mercaptan. The adding step includes a step of gradually adding a second polymerizable unsaturated monomer to the mixture obtained by the preparation step, wherein the second polymerizable unsaturated monomer has a composition different from that of the first polymerizable unsaturated monomer. The polymerization step includes a step of carrying out radical polymerization of a mixture of the first polymerizable unsaturated monomer and the added second polymerizable unsaturated monomer during the adding step, the radical polymerization being initiated with a mercapto group of the polyvalent mercaptan.

The process for producing a thermoplastic addition polymer, according to the present invention, may further include a prepolymerization step of carrying out radical polymerization of the first polymerizable unsaturated monomer in between the preparation step and the adding step, the radical polymerization being initiated with a mercapto group of the polyvalent mercaptan.

A hot-melt resin composition, according to a first embodiment of the present invention, includes a block polymer having a polyvalent mercaptan segment and two or more polymer segments and further having a number-average molecular weight of 10,000 to 200,000, wherein the two or more polymer segments are radially extended from the polyvalent mercaptan segment and have two or more different compositions.

A hot-melt resin composition, according to a second embodiment of the present invention, includes a block polymer obtainable by a production process including a preparation step, a first polymerization step, an adding step, and a second polymerization step. The preparation step includes a step of preparing a first mixture including a first polymerizable unsaturated monomer and a polyvalent mercaptan. The first polymerization step includes a step of carrying out radical polymerization of the first polymerizable unsaturated monomer, the radical polymerization being initiated with a mercapto group of the polyvalent mercaptan. The adding step includes a step of adding a second polymerizable unsaturated monomer to a reaction mixture obtained by the first polymerization step, thus producing a second mixture, wherein the second polymerizable unsaturated monomer has a composition different from that of the first polymerizable unsaturated monomer. The second polymerization step includes a step of carrying out radical polymerization of the polymerizable unsaturated monomers which are contained in the second mixture.

A hot-melt resin composition, according to a third embodiment of the present invention, includes a block polymer having a polyvalent mercaptan segment and two or more polymer segments and further having a number-average molecular weight of 10,000 to 200,000, wherein the two or more polymer segments have two or more different compositions including a carboxyl group-containing polymerizable unsaturated monomer unit and a (meth)acrylic acid ester monomer unit and are radially extended from the polyvalent mercaptan segment.

A hot-melt resin composition, according to a fourth embodiment of the present invention, includes a block polymer obtainable by a production process including a preparation step, a first polymerization step, an adding step, and a second polymerization step. The preparation step includes a step of preparing a first mixture including a first polymerizable unsaturated monomer and a polyvalent mercaptan, wherein the first polymerizable unsaturated monomer includes a carboxyl group-containing polymerizable unsaturated monomer and a (meth)acrylic add ester monomer. The first polymerization step includes a step of carrying out radical polymerization of the first polymerizable unsaturated monomer, the radical polymerization being initiated with a mercapto group of the polyvalent mercaptan. The adding step includes a step of adding a second polymerizable unsaturated monomer to a reaction mixture obtained by the first polymerization step, thus producing a second mixture, wherein the second polymerizable unsaturated monomer includes a carboxyl group-containing polymerizable unsaturated monomer and a (meth)acrylic acid ester monomer and has a composition different from that of the first polymerizable unsaturated monomer. The second polymerization step includes a step of carrying out radical polymerization of the polymerizable unsaturated monomers which are contained in the second mixture.

A hot-melt resin composition, according to a fifth embodiment of the present invention, includes a thermoplastic addition polymer including a collective of macromolecules having a polyvalent mercaptan segment and two or more copolymer segments. The two or more copolymer segments include two or more kinds of different polymerizable unsaturated monomer units, are radially extended from the polyvalent mercaptan segment, and have compositions which continuously vary over the entire collective of macromolecules.

A hot-melt resin composition, according to a sixth embodiment of the present invention, includes a thermoplastic addition polymer, wherein the thermoplastic addition polymer includes two or more kinds of different polymerizable unsaturated monomer units and has a number-average molecular weight of 10,000 to 200,000, only one glass transition temperature peak with a width of 50° C. or more, and a parallel-rays transmittance of 85% or more.

A hot-melt resin composition, according to a seventh embodiment of the present invention, includes a thermoplastic addition polymer which is obtainable by a production process including a preparation step, an adding step, and a polymerization step. The preparation step includes a step of preparing a mixture including a first polymerizable unsaturated monomer and a polyvalent mercaptan. The adding step includes a step of gradually adding a second polymerizable unsaturated monomer to the mixture obtained by the preparation step, wherein the second polymerizable unsaturated monomer has a composition different from that of the first polymerizable unsaturated monomer. The polymerization step includes a step of carrying out radical polymerization of a mixture of the first polymerizable unsaturated monomer and the added second polymerizable unsaturated monomer during the adding step, the radical polymerization being initiated with a mercapto group of the polyvalent mercaptan.

As to the hot-melt resin composition according to the seventh embodiment of the present invention, the process for producing a thermoplastic addition polymer may further include a prepolymerization step of carrying out radical polymerization of the first polymerizable unsaturated monomer in between the preparation step and the adding step, the radical polymerization being initiated with a mercapto group of the polyvalent mercaptan.

A hot-melt resin composition, according to an eighth embodiment of the present invention, includes a thermoplastic addition polymer including a collective of macromolecules having a polyvalent mercaptan segment and two or more copolymer segments. The two or more copolymer segments include polymerizable unsaturated monomer units including a carboxyl group-containing polymerizable unsaturated monomer unit and a (meth)acrylic acid ester monomer unit, are radially extended from the polyvalent mercaptan segment, and have compositions which continuously vary over the entire collective of macromolecules.

A hot-melt resin composition, according to a ninth embodiment of the present invention, includes a thermoplastic addition polymer, wherein the thermoplastic addition polymer includes a carboxyl group-containing polymerizable unsaturated monomer unit and a (meth)acrylic acid ester monomer unit and has a number-average molecular weight of 10,000 to 200,000, only one glass transition temperature peak with a width of 50° C. or more, and a parallel-rays transmittance of 85% or more.

A hot-melt resin composition, according to a tenth embodiment of the present invention, includes a thermoplastic addition polymer which is obtainable by a production process including a preparation step, an adding step, and a polymerization step. The preparation step includes a step of preparing a mixture including a first polymerizable unsaturated monomer and a polyvalent mercaptan, wherein the first polymerizable unsaturated monomer includes a carboxyl group-containing polymerizable unsaturated monomer and a (meth)acrylic acid ester monomer. The adding step includes a step of gradually adding a second polymerizable unsaturated monomer to the mixture obtained by the preparation step, wherein the second polymerizable unsaturated monomer includes a carboxyl group-containing polymerizable unsaturated monomer and a (meth)acrylic acid ester monomer and has a composition different from that of the first polymerizable unsaturated monomer. The polymerization step includes a step of carrying out radical polymerization of a mixture of the first polymerizable unsaturated monomer and the second polymerizable unsaturated monomer during the adding step, the radical polymerization being initiated with a mercapto group of the polyvalent mercaptan.

As to the hot-melt resin composition according to the tenth embodiment of the present invention, the process for producing a thermoplastic addition polymer may further include a prepolymerization step of carrying out radical polymerization of the first polymerizable unsaturated monomer in between the preparation step and the adding step, the radical polymerization being initiated with a mercapto group of the polyvalent mercaptan.

A hot-melt resin composition, according to an eleventh embodiment of the present invention, includes a thermoplastic addition polymer of a branched structure which has two or more (meth)acrylic polymer segments including a carboxyl group-containing polymerizable unsaturated monomer unit and a (meth)acrylic acid ester monomer unit.

In the hot-melt resin composition according to the eleventh embodiment of the present invention, the thermoplastic addition polymer may further have a polyvalent mercaptan segment, and the (meth)acrylic polymer segments may radially be extended from the polyvalent mercaptan segment.

A hot-melt resin composition, according to a twelfth embodiment of the present invention, includes a thermoplastic addition polymer which has a branched structure and is obtainable by a production process including a preparation step and a polymerization step. The preparation step includes a step of preparing a mixture including a polymerizable unsaturated monomer and a polyvalent mercaptan, wherein the polymerizable unsaturated monomer includes a carboxyl group-containing polymerizable unsaturated monomer and a (meth)acrylic acid ester monomer. The polymerization step includes a step of carrying out radical polymerization of the polymerizable unsaturated monomer, the radical polymerization being initiated with a mercapto group of the polyvalent mercaptan.

A hot-melt resin composition, according to a thirteenth embodiment of the present invention, has the same features as of any one of the hot-melt resin compositions according to the first to twelfth embodiments of the present invention, but further includes a metal ion source.

The hot-melt resin composition, according to the thirteenth embodiment of the present invention, may further include a phosphoric acid ester.

A hot-melt resin composition, according to a fourteenth embodiment of the present invention, includes a (meth) acrylic thermoplastic addition polymer, a metal ion source, and a phosphoric acid ester. The (meth)acrylic thermoplastic addition polymer includes a carboxyl group-containing polymerizable unsaturated monomer unit and a (meth) acrylic acid ester monomer unit.

A hot-melt resin composition, according to a fifteenth embodiment of the present invention, has the same features as of any one of the hot-melt resin compositions according to the first to fourteenth embodiments of the present invention, but further includes a tackifier resin.

A pressure sensitive adhesive composition of the present invention is a pressure sensitive adhesive composition for producing a pressure sensitive adhesive for soft vinyl chloride, the pressure sensitive adhesive being applicable to a soft polyvinyl chloride molding. And a pressure sensitive adhesive composition, according to a first embodiment of the present invention, includes an acrylic block polymer and an organic solvent. The acrylic block polymer is obtainable by a production process including a preparation step, a first polymerization step, an adding step, and a second polymerization step. The preparation step includes a step of preparing a first mixture including a polyvalent mercaptan and a first polymerizable unsaturated monomer which is formable into a high glass transition temperature type polymer having a glass transition temperature of 273 K. or higher. The first polymerization step includes a step of carrying out radical polymerization of the first polymerizable unsaturated monomer, the radical polymerization being initiated with a mercapto group of the polyvalent mercaptan, thus producing a reaction mixture. The adding step includes a step of adding a monomer mixture to the reaction mixture, thus producing a second mixture, wherein the monomer mixture is formable into a polymer having no compatibility with the high glass transition temperature type polymer and includes an alkyl (meth)acrylate monomer. The second polymerization step includes a step of carrying out radical polymerization of the monomers which are contained in the second mixture. As to the organic solvent, there is used an organic solvent into which the acrylic block polymer can be dissolved and/or dispersed.

A pressure sensitive adhesive composition, according to a second embodiment of the present invention, includes the same features as of the pressure sensitive adhesive composition according to the first embodiment of the present invention, but further includes a feature in which the monomer mixture, which is added in the adding step in the production process for the acrylic block polymer, may further include a reactive functional group-containing polymerizable unsaturated monomer.

A pressure sensitive adhesive composition, according to a third embodiment of the present invention, includes the same features as of the pressure sensitive adhesive composition according to the second embodiment of the present invention, but further includes a crosslinking agent having at least two functional groups which are reactive to a reactive functional group of the reactive functional group-containing polymerizable unsaturated monomer.

A pressure sensitive adhesive product, according to an embodiment of the present invention, has a pressure sensitive adhesive layer for soft vinyl chloride, the pressure sensitive adhesive layer being formed using any one of the pressure sensitive adhesive compositions according to the first to third embodiments of the present invention, and is applicable to a soft polyvinyl chloride molding.

A pressure sensitive adhesive product, according to another embodiment of the present invention, has a pressure sensitive adhesive layer for soft vinyl chloride and further has a base material made of soft polyvinyl chloride, wherein the pressure sensitive adhesive layer is formed using any one of the pressure sensitive adhesive compositions according to the first to third embodiments of the present invention, and wherein the base material is attached to one or both faces of the pressure sensitive adhesive layer.

A resin composition for a carrier, according to the present invention, is a resin composition which is formable into a carrier for a pressure sensitive adhesive product. And a resin composition for a carrier, according to a first embodiment of the present invention, includes an acrylic block polymer. The acrylic block polymer is obtainable by a production process including a preparation step, a first polymerization step, an adding step, and a second polymerization step. The preparation step includes a step of preparing a first mixture including a polyvalent mercaptan and a first polymerizable unsaturated monomer which is formable into a high glass transition temperature type polymer having a glass transition temperature of 273 K. or higher. The first polymerization step includes a step of carrying out radical polymerization of the first polymerizable unsaturated monomer, the radical polymerization being initiated with a mercapto group of the polyvalent mercaptan, thus producing a reaction mixture. The adding step includes a step of adding a monomer mixture to the reaction mixture, thus producing a second mixture, wherein the monomer mixture is formable into a polymer having no compatibility with the high glass transition temperature type polymer and includes an alkyl (meth)acrylate monomer. The second polymerization step includes a step of carrying out radical polymerization of the monomers which are contained in the second mixture.

A resin composition for a carrier, according to a second embodiment of the present invention, includes the same features as of the resin composition for a carrier according to the first embodiment of the present invention, but further includes a feature in which the monomer mixture, which is added in the adding step in the production process for the acrylic block polymer, further includes a reactive functional group-containing polymerizable unsaturated monomer.

A resin composition for a carrier, according to a third embodiment of the present invention, includes the same features as of the resin composition for a carrier according to the second embodiment of the present invention, but further includes a crosslinking agent having at least two functional groups which are reactive to a reactive functional group of the reactive functional group-containing polymerizable unsaturated monomer.

A pressure sensitive adhesive product, according to another embodiment of the present invention, has a carrier for a pressure sensitive adhesive product and further has a pressure sensitive adhesive layer, wherein the carrier is formed from any one of the resin compositions according to the first to third embodiments of the present invention for a carrier, and wherein the pressure sensitive adhesive layer is formed on one or both faces of the carrier.

(Block polymer)

The block polymer of the present invention includes a polyvalent mercaptan segment and two or more polymer segments, wherein the two or more polymer segments are radially extended from the polyvalent mercaptan segment and have two or more different compositions.

The number-average molecular weight of the block polymer of the present invention is in a range of 2,000 to 1,000,000. In the case where the number-average molecular weight is less than the above-mentioned range, the performance as the block polymer is not displayed. In the case where the number-average molecular weight is more than the above-mentioned range, the melt-viscosity of the block polymer is high, so the handling property of the block polymer is poor. The number-average molecular weight of the block polymer is preferably in a range of 10,000 to 400,000, more preferably in a range of 20,000 to 200,000, with a view to obtaining the balance in which the performance as the block polymer is sufficiently displayed and in which the melt-viscosity of the block polymer is sufficiently low.

The polyvalent mercaptan segment is defined as a residue which is formed by dissociating protons of two or more mercapto groups from a polyvalent mercaptan (a mercaptan having two or more mercapto groups) which is explained in the later-mentioned section "Process for producing block polymer".

The polyvalent mercaptan segment is preferably a residue which is formed by dissociating protons of two or more mercapto groups from a mercaptan having a functionality of 2 to 10, the mercaptan being explained in the later-mentioned section "Process for producing block polymer". A mercaptan having only one mercapto group does not give the structure in which polymer segments are radially extended. A mercaptan having more than 10 mercapto groups does not easily give the structure in which polymer segments are radially extended from an identical center, thus desired properties may not be displayed.

The polyvalent mercaptan segment is preferably a residue which is formed by dissociating protons of two or more mercapto groups from at least one compound selected from mercaptans having a valency of 3 to 6, the mercaptans being exemplified in the later-mentioned section "Process for producing block polymer". The reason for this is because there are advantages in that the block polymer has a star-shaped structure in which polymer segments are radially extended from an identical center, and in that effects (for example, high cohesion) due to tangles of polymer chains, or a change of the form of a phase separation structure, can accordingly be expected.

The polymer segments are radially extended from the polyvalent mercaptan segment, which means that two polymer segments per one macromolecule are extended from the polyvalent mercaptan segment in two directions (including that the two polymer segments are linearly extended), or that three or more polymer segments per one macromolecule are extended from the polyvalent mercaptan segment in three or more directions. The carbon atom of an end of the polymer segment is bonded to a sulfur atom which derives from a mercapto group of the polyvalent mercaptan segment.

The number-average molecular weight of the polymer segment is usually in a range of 1,000 to 500,000, preferably in a range of 5,000 to 200,000, and more preferably in a range of 10,000 to 100,000. In the case where the number-average molecular weight of the polymer segment is less than the above-mentioned range, properties due to the polymer segment may not be introduced into the block polymer of the present invention. In the case where the number-average molecular weight of the polymer segment is more than the above-mentioned range, the viscosity during the production is high, thus the productivity may be poor.

The block polymer has two or more polymer segments per one macromolecule. The polymer segment is a segment having a structure of a homopolymer or copolymer formed by radical polymerization of a polymerizable unsaturated monomer. The polymer segment obtained by the radical polymerization can have more various compositions than a polymer segment obtained by ionic polymerization such as anionic polymerization. The monomer which can be used is not especially limited so long as it is radical-polymerizable. In addition, the polymer segment may be a copolymer segment.

The two or more polymer segments have two or more different compositions. In the case where the polymer segments derive from a homopolymer, the differences of the compositions are obtained from differences of the types of monomer units which constitute the polymer; and in the case where the polymer segments derive from a copolymer, the differences of the compositions are obtained from differences of the types and the ratios of the monomer units. The monomer units derive from polymerizable unsaturated monomers which are cited in the later-mentioned section "Process for producing block polymer".

The combination of the polymer segments having different compositions depends upon the performance (or use) which is demanded to the block polymer. Basic examples of the combination of the polymer segments are as follows: a combination of polymer segments which derive from polymers having different glass transition temperatures (Tg); a combination of polymer segments which derive from polymers having different compatibilities; a combination of polymer segments which derive from polymers having different solubilities; a combination of polymer segments which derive from polymers having an active hydrogen atom and from polymers having no active hydrogen atom; and so on.

For example, if a continuous phase of polymer segments deriving from polymers having a high Tg is formed by combining the polymer segments which derive from polymers having different Tg's, there is obtained a block polymer which is favorable for high heat- and impact-resistant molding materials and for toner resins. On the other hand, if a continuous phase of polymer segments deriving from polymers having a low Tg is formed by the same combination as mentioned above, there is obtained a block polymer which is favorable for films (carriers, coating films) having high strength and high elongation, hot-melt pressure sensitive adhesives, hot-melt adhesives, thermoplastic elastomers, and so on. An example of these block polymers includes a combination of a polymethyl methacrylate (PMMA) as the polymer having a high Tg with polybutyl acrylate (PBA) as the polymer having a low Tg. In the case of this combination, the number-average molecular weight of the PMMA is preferably in a range of 5,000 to 200,000, the number-average molecular weight of the PBA is preferably in a range of 10,000 to 150,000, and the ratio by weight of PMMA/PBA is preferably in a range of 10/90 to 90/10. In the case where the combination deviates from these ranges, sufficient performance may not be obtained. In order to form a continuous phase of polymer segments deriving from polymers having a high Tg, it is necessary to increase the ratio of the polymers having a high Tg or to decrease the melt-viscosity of the polymers having a high Tg. On the other hand, in order to form a continuous phase of polymer segments deriving from polymers having a low Tg, it is necessary to increase the ratio of the polymers having a low Tg or to decrease the melt-viscosity of the polymers having a low Tg.

An example of the combination of polymers having different compatibilities is a combination of an acrylonitrile-styrene copolymer (P(AN/St)) with a polybutadiene (PBd), and this combination can be preferably used as a dispersant for dispersing PBd rubber into an AS resin (acrylonitrile-styrene copolymer), or as a resin for improving impact resistance. In the case of this combination, the number-average molecular weight of the P(AN/St) is preferably in a range of 10,000 to 100,00, the number-average molecular weight of the PBd is preferably in a range of 3,000 to 100,000, the ratio by weight of (P(AN/St))/PBd is preferably in a range of 10/90 to 90/10, and the ratio by weight of acrylonitrile/styrene in the P(AN/St) is preferably in a range of 1/99 to 50/50. In the case where the combination deviates from these ranges, sufficient properties may not be obtained, or the handling may be difficult.

A preferable example of the combination of polymers having different solubilities is a combination of a polyacrylic acid (PAA) with a butyl acrylate-ethyl acrylate copolymer (P(BA/EA)), which combination can provide a pressure sensitive adhesive which has both of the water-solubility of the PAA and the pressure sensitive adhesion and the water-insolubility of the P(BA/EA) and is re-dispersible in water. In the case of this combination, the number-average molecular weight of the P(BA/EA) is preferably in a range of 10,000 to 150,000, the number-average molecular weight of the PAA is preferably in a range of 1,000 to 50,000, the ratio by weight of (P(BA/EA))/PAA is preferably in a range of 95/5 to 50/50, and the ratio by weight of butyl acrylate/ethyl acrylate in the P(BA/EA) is preferably in a range of 0/100 to 100/0 (namely, a homopolymer of butyl acrylate, a homopolymer of ethyl acrylate, and a copolymer having an optional ratio between both the homopolymers are preferable). In the case where the combination deviates from these ranges, the balance between the dispersibility (or solubility) in water and the pressure sensitive adhesion may be broken.

The block polymer of the present invention can be a polymer in which the polyvalent mercaptan segment includes a 3-to 6-valent mercaptan residue and in which the two or more polymer segments have two different compositions, the polymer being shown by the following general formula (I):

$$(PA-S)_n-X-(S-PB)_m \qquad (I)$$

In the formula (I), the PA and PB denote polymer segments having different compositions and, for example, can include the following combinations:

PA:PB,
PMMA:PBA,
(P(AN/St)):PBd, and
(P(BA/EA)):PAA

In the formula (I), the segment shown by the following formula:

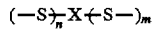

$$(-S)_n-X-(S-)_m$$

denotes the 3- to 6-valent mercaptan residue.

In the formula (I), n+m is a number in a range of 3 to the valence number of the mercaptan residue, n is a number of 0.1 or more, preferably 0.5 or more, and m is a number of 0.1 or more, preferably 0.5 or more. In the case where n or m is less than the above-mentioned range, the desired sufficient performance may not be obtained.

The block polymer of the present invention can be allowed to have more various performance by combining polymer segments having three or more different compositions.

The block polymer of the present invention is, for example, produced by the later-mentioned process of the present invention for producing a block polymer.

The block polymer of the present invention is different from conventional star-shaped block polymers in that a polyvalent mercaptan segment is the center from which two or more polymer segments are radially extended in the block polymer of the present invention. Because of this difference, the block polymer of the present invention has various properties, which conventional star-shaped block polymers do not have. For example, the block polymer of the present invention can have an introduced functional group, be a block polymer of various copolymers, and therefore undergo a post-crosslinking reaction (a reaction whereby the formed polymer is crosslinked by a crosslinking agent, or a self-crosslinking reaction of the formed polymer). In addition, the polyvalent mercaptan is more inexpensive than polymerization initiators that are used for producing conventional star-shaped block polymers.

(Process for producing block polymer)

The process for producing a block polymer, according to the present invention, includes a preparation step, a first polymerization step, an adding step, and a second polymerization step.

The preparation step includes a step of preparing a first mixture including a first polymerizable unsaturated monomer and a polyvalent mercaptan.

Any monomer that forms a homopolymer or copolymer by radical polymerization can be used as the first polymerizable unsaturated monomer. Its examples are as follows: (meth)acrylic acid; (meth)acrylates which are represented by alkyl (meth)acrylates, having 1 to 30 carbon atoms, hydroxyethyl (meth)acrylate, hydroxypropyl (meth)acrylate, glycidyl (meth)acrylate, methoxyethyl (meth)acrylate, ethoxyethyl (meth)acrylate, ethoxyethoxyethyl (meth)acrylate, and the like; styrene-based polymerizable monomers which are represented by α-methylstyrene, vinyltoluene, styrene, and the like; vinyl ethers which are represented by methyl vinyl ether, ethyl vinyl ether, isobutyl vinyl ether, vinyl acetate, and the like; fumaric acid, monoalkyl fumarates, dialkyl fumarates; maleic acid, monoalkyl maleates, dialkyl maleates; itaconic acid, monoalkyl itaconates, dialkyl itaconates; half esters of succinic anhydride or phthalic anhydride with hydroxylethyl (meth)acrylate; (meth)acrylonitrile, butadiene, isoprene, vinyl chloride, vinylidene chloride, vinyl ketones, vinyl pyridine, vinyl carbazole, and the like. These compounds may be used either alone or in combinations with each other.

The polyvalent mercaptan is a compound having two or more mercapto groups per one molecule, and the mercaptans in which the numbers of the mercapto groups per one molecule are 2, 3, . . . are called a 2-valent mercaptan, a 3-valent mercaptan, . . . , respectively. Examples of the polyvalent mercaptan are as follows: diesters of diols, such as ethylene glycol and 1,4-butanediol, with carboxyl group-containing mercaptans; polyester compounds of compounds having three or more hydroxyl groups, such as trimethylolpropane, pentaerythritol and dipentaerythritol, with carboxyl group-containing mercaptans; compounds having three or more mercapto groups, such as trithioglycerol; triazine polythiols such as 2-di-n-butylamino-4,6-dimercapto-S-triazine and 2,4,6-trimercapto-S-triazine; compounds obtained by adding hydrogen sulfide to two or more epoxy groups of polyvalent epoxy compounds to thereby introduce two or more mercapto groups; ester compounds obtained by esterifying two or more carboxyl groups of polyvalent carboxylic acids with mercaptoethanol; and the like. These compounds may be used either alone or in combinations with each other. In addition, the above-mentioned carboxyl group-containing mercaptans are compounds having one mercapto group and one carboxyl group, such as thioglycolic acid, mercaptopropionic acid, and thiosalicylic acid.

If the polymerization is carried out in the presence of the polyvalent mercaptan, the polymerization is initiated with a mercapto group of the polyvalent mercaptan, thus producing a thermoplastic addition polymer having a narrow molecular weight distribution and a high-branched structure.

The polyvalent mercaptan is preferably a compound having 3 to 6 mercapto groups (namely, a mercaptan having a functionality of 3 to 6), and more preferably a compound having 4 to 6 mercapto groups (namely, a mercaptan having a functionality of 4 to 6), for forming the polymer having a high-branched structure. Mercaptans having only one mercapto group do not give the structure in which polymer segments are radially extended. Mercaptans having more than 6 mercapto groups do not form the structure in which polymer segments are radially extended from an identical center, therefore intended properties may not be obtained.

Examples of the polyvalent mercaptan are as follows: 3-functional mercaptans such as trithioglycerol, trimethylolpropane trithioglycolate, and trimethylolpropane trithiopropionate; 4-functional mercaptans such as pentaerythritol tetrakisthioglycolate and pentaerythritol tetrakisthiopropionate; 6-functional mercaptans such as dipentaerythritol hexakisthioglycolate and dipentaerythritol hexakisthiopropionate; compounds obtained by adding hydrogen sulfide to polyvalent epoxy compounds; mercaptoethanol adducts of polyvalent carboxylic acids; and the like. One or more of these compounds can be used.

In the process of the present invention for producing a block polymer, if the preparation step, the first polymerization step, the adding step, and the second polymerization step are carried out, a block polymer including two or more polymer segments having two or more different compositions can be obtained; and if an adding step of adding a polymerizable unsaturated monomer having another composition to the product from the radical polymerization, thus obtaining another mixture, and a polymerization step of carrying out radical polymerization of the polymerizable unsaturated monomer contained in the resultant mixture are further carried out repeatedly one or more times after the second polymerization step, a block polymer including two or more polymer segments having three or more different compositions can be obtained.

The first mixture includes the polyvalent mercaptan in a ratio, for example, of 0.001 to 10 parts by weight per 100 parts by weight of the first polymerizable unsaturated monomer. In the case where the amount of the polyvalent mercaptan deviates from this range, the number-average molecular weight of the polymer segments may deviate from the range of 1,000 to 500,000. If it is considered that the more preferable number-average molecular weight is in a range of 5,000 to 200,000, the amount of the polyvalent mercaptan is preferably in a range of 0.01 to 2 parts by weight.

The first mixture may, as needed, further include, for example, organic solvents which are represented by: aromatic hydrocarbons such as toluene and xylene; esters such as ethyl acetate and butyl acetate; cycloaliphatic hydrocarbons such as cyclohexane; aliphatic hydrocarbons such as hexane and pentane; ketones such as acetone, methyl ethyl ketone, and methyl isobutyl ketone; and the like. The organic solvent may be either a single solvent or a mixed solvent. which an end of a polymer segment having one composition is bonded to a sulfur residue of one or more mercapto groups in each molecule of the polyvalent mercaptan. This product has an unreacted mercapto group. In order to efficiently bond an end of the polymer segment to the sulfur residue, it is preferable not to add to the polymerization system a polymerization initiator more than is needed.

The radical polymerization may be carried out by conventional radical polymerization methods such as bulk polymerization, solution polymerization, suspension polymerization, and emulsion polymerization. In order to obtain an inexpensive polymer, the bulk polymerization in which no superfluous volatile components are included is preferable.

The polymerization temperature is preferably in a range of 30° to 200° C., and more preferably in a range of 100° to 150° C. where the bulk polymerization can stably be carried out without a polymerization initiator.

In the first polymerization step, there may be used conventional polymerization initiators, for example: azo-based polymerization initiators such as 2,2'-azobisisobutyronitrile and 2,2'-azobiscyclohexanecarbonitrile; peroxide-based polymerization initiators such as benzoyl peroxide; and the like. However, the polymerization initiator is used in a ratio by weight of usually $1/3$ or less, preferably $1/10$ or less, to the polyvalent mercaptan, and more preferably is not used at all. In the case where the polymerization initiator is used in an amount larger than the above-mentioned range, not only the polymer segments, which are extended from the polyvalent mercaptan, but also a large amount of polymers, which are extended from the polymerization initiator, are formed, thus lowering the production efficiency of the block polymer. In addition, in the case where a compound including 50% by weight or more of a monomer having one acryloyl group per one molecule is used as the polymerizable unsaturated monomer, and where the bulk polymerization which is an industrially inexpensive production process is carried out, the polymerization stability is poor, an uncontrollable reaction occurs, and at worst a danger of explosion is involved.

In the first polymerization step, the radical polymerization of the first polymerizable unsaturated monomer component is carried out in the presence of the polyvalent mercaptan, and when the polymerization conversion reaches, for example, 50% or more, the polymerization is halted, because even if the second polymerization step is carried out without eliminating the residual polymerizable unsaturated monomer when the polymerization conversion reaches 50% or more, preferably 80% or more, polymer segments that are different from those produced in the first polymerization step are easily produced in the second polymerization step. The residual polymerizable unsaturated monomer may be eliminated by evaporation after the first polymerization step, in order to produce polymer segments in the second polymerization step, the polymer segments being different from those produced in the first polymerization step.

The adding step includes a step of adding a second polymerizable unsaturated monomer to a reaction mixture from the first polymerization step, thus producing a second mixture, wherein the second polymerizable unsaturated monomer has a composition different from that of the first polymerizable unsaturated monomer.

As to the second polymerizable unsaturated monomer, any monomer, that forms a homopolymer or copolymer by radical polymerization and has a composition different from that of the first polymerizable unsaturated monomer, can be used. Examples of the second polymerizable unsaturated monomer are compounds that were previously exemplified as the first polymerizable unsaturated monomer. The second polymerizable unsaturated monomers may be either alone or in combinations with each other.

The amount of the second polymerizable unsaturated monomer is, for example, in a range of 5 to 2,000 parts by weight per 100 parts by weight of the polymer produced in the first polymerization step. In the case where the amount deviates from this range, the performance deriving from the block structure may not be obtained. If this viewpoint is considered, the amount of the second polymerizable unsaturated monomer is preferably in a range of 10 to 1,000 parts by weight.

The combination of the first polymerizable unsaturated monomer with the second polymerizable unsaturated monomer depends upon the performance (or use) which is demanded to the block polymer. Basic examples of the combination are as follows:

(1) a combination of a monomer, which is formable into a polymer having a high glass transition temperature (Tg), with a monomer which is formable into a polymer having a low Tg;

(2) a combination of monomers which are formable into polymers having different compatibilities;

(3) a combination of monomers which are formable into polymers having different solubilities to solvents or other resins; and (4) a combination of a monomer, which is formable into a polymer having an active hydrogen atom, with a monomer which is formable into a polymer having no active hydrogen atom.

A particular example of combination (1) above is a combination of methyl methacrylate (MMA), as the monomer formable into a polymer having a high Tg, with butyl acrylate (BA) as the monomer formable into a polymer having a low Tg. In the case of this combination, the ratio by weight of MMA/BA is preferably in a range of 10/90 to 90/10. In the case where the ratio deviates from this range, sufficient performance may not be obtained.

A particular example of combination (2) above is a combination of monomers, which are formable into an acrylonitrile-styrene copolymer, namely acrylonitrile (AN) and styrene (St), with a monomer, which is formable into a polybutadiene, namely Bd (butadiene). In the case of this combination, the ratio by weight of (AN/St)/Bd is preferably in a range of 10/90 to 90/10, and the ratio by weight of AN/St is preferably in a range of 1/99 to 50/50. In the case where the ratios deviate from these ranges, sufficient properties may not be obtained, or the handling may be difficult.

A particular example of combination (3) above is a combination of a monomer, which is formable into a polyacrylic acid (PAA), namely acrylic acid (AA), with monomers, which are formable into a butyl acrylate-ethyl acrylate copolymer, namely butyl acrylate (BA) and ethyl acrylate (EA). The block polymer obtained from this combination is formable into a pressure sensitive adhesive which has both of the water-solubility of the PAA and the pressure sensitive adhesion and the water-insolubility of the P(BA/EA) and is re-dispersible in water. In the case of this combination, the ratio by weight of (BA/EA)/AA is preferably in a range of 95/5 to 50/50, and the ratio by weight of the BA/EA is preferably in a range of 0/100 to 100/0 (namely, a homopolymer of butyl acrylate, a homopolymer of ethyl acrylate, and a copolymer having an optional ratio between both the homopolymers are preferable). In the case where the ratios deviates from these ranges, the balance between the dispersibility (or solubility) in water and the pressure sensitive adhesion may be broken.

A particular example of combination (4) above is the same as exemplified for combination (3), except that the active hydrogen atom is used as the reaction site in combination (4). In combination (3), the active hydrogen atom is used for giving the water-solubility.

The second mixture may, as needed, further include, for example, organic solvents which are represented by: aromatic hydrocarbons such as toluene and xylene; esters such as ethyl acetate and butyl acetate; cycloaliphatic hydrocarbons such as cyclohexane; aliphatic hydrocarbons such as hexane and pentane; ketones such as acetone, methyl ethyl ketone, and methyl isobutyl ketone; and the like. The organic solvent may be either a single solvent or a mixed solvent.

The second polymerization step includes a step of carrying out radical polymerization of the polymerizable unsaturated monomers which are contained in the second mixture. As to polymerization conditions such as temperature, time, and ratio between starting materials, and as to polymerization methods, those explained for the first polymerization step can be employed.

In the second polymerization step, radical polymerization of a polymerizable monomer component having a composition different from that of a polymerizable monomer component used for the previously performed radical polymerization is carried out in the presence of products from the previously performed radical polymerization. As needed, unreacted monomer components may be removed from the reaction mixture containing the products from the previously performed radical polymerization, or the unreacted monomer components may be allowed to be present without being removed and may be used for the next radical polymerization. The next radical polymerization is initiated with all or some of the residual mercapto groups of the polyvalent mercaptan, thus producing a product in which an end of a polymer segment having another composition is bonded to a sulfur residue of the mercapto group. This product may have an unreacted mercapto group. In the case where the product has an unreacted mercapto group, a third polymer segment having another composition can be introduced by repeating the second polymerization step two times, third and fourth polymer segments having other compositions can be introduced by repeating the second polymerization step three times, and still another polymer segment having another composition can be introduced every time the repeated number of the second polymerization step is increased.

If the reaction mixture obtained from the second polymerization step does not contain a volatile component such as a solvent or a residual monomer, the mixture itself can be used as a block polymer. If the reaction mixture obtained from the second polymerization step contains the volatile component, the mixture itself can be used as a solution of a block polymer, or a block polymer can be obtained by removing the volatile component from the mixture using an apparatus such as twin-screw extruder or a thin-membrane evaporator.

In the present invention, the radical polymerization may be carried out by conventional radical polymerization methods such as bulk polymerization, solution polymerization, suspension polymerization, and emulsion polymerization. In order to obtain an inexpensive polymer, the bulk polymerization in which no superfluous volatile components are included is preferable.

If the polymerization is carried out by more multiple steps in the above-mentioned way, a block polymer including a combination of three or more kinds of polymers can be obtained.

In the process of the present invention for producing a block polymer, the radical polymerization of the polymerizable monomer is carried out in the presence of the polyvalent mercaptan, the radical polymerization being initiated with the mercapto group. Therefore, ends of polymer segments are bonded to sulfur residues of some of the mercapto groups of the polyvalent mercaptan, and the rest of the mercapto groups remains without initiating the radical polymerization. If the radical polymerization of the residual monomer component is carried out at once or in sequence in the presence of the product from the previous radical polymerization, the radical polymerization of the polymerizable monomer component having another composition is initiated with the residual mercapto groups of the polyvalent mercaptan, thus producing a polymer segment having another composition. In addition, the industrial mass production is easy.

In the process of the present invention, the polymerization can be carried out with good efficiency, because the polymerization is carried out by radical polymerization. In addition, it is unnecessary to strictly wash the polymerization vessel, although necessary for ionic polymerization. And the cost is reduced, because neither the purification of starting materials nor a catalyst is needed. Furthermore, the polymer segments formed by the radical polymerization are different from those formed by the ionic polymerization, in that the polymer segments formed by the radical polymerization can derive from copolymers or polymers of active hydrogen atom-containing monomers such as unsaturated carboxylic acids, monoesters of unsaturated dicarboxylic acids, and hydroxyl group-containing (meth)acrylates.

In the process of the present invention, if the radical polymerization is carried out by bulk polymerization, a solvent as used for the ionic polymerization is not needed, the removal of the solvent is accordingly not needed, thus block polymers having high performance can be produced with good productivity at a low cost.

(Thermoplastic addition polymer)

The thermoplastic addition polymer, according to the first embodiment of the present invention, includes a collective of macromolecules having a polyvalent mercaptan segment and two or more copolymer segments. The copolymer segments include two or more kinds of different polymerizable unsaturated monomer units, are radially extended from the polyvalent mercaptan segment, and have compositions which continuously vary over the entire collective of macromolecules.

The thermoplastic addition polymer, according to the second embodiment of the present invention, includes two or more kinds of different polymerizable unsaturated monomer units and has a number-average molecular weight of 4,000 to 1,000,000, only one glass transition temperature peak with a width of 50° C. or more, and a parallel-rays transmittance of 85% or more.

The glass transition temperature peak of the thermoplastic addition polymer according to the second embodiment of the present invention preferably has a width of 80° C. or more.

The thermoplastic addition polymer of the present invention may further include a sulfur atom in a range of 0.005 to 4% by weight.

The thermoplastic addition polymer, according to the first embodiment of the present invention, includes a collective of macromolecules having a polyvalent mercaptan segment and two or more copolymer segments.

The copolymer segments are radially extended from the polyvalent mercaptan segment, which means that two copolymer segments per one macromolecule are extended from the polyvalent mercaptan segment in two directions (including that the two copolymer segments are linearly extended), or that three or more copolymer segments per one macromolecule are extended from the polyvalent mercaptan segment in three or more directions. The carbon atom of an end of the copolymer segment is bonded to a sulfur atom which derives from a mercapto group of the polyvalent mercaptan segment.

The polyvalent mercaptan segment is defined as a residue which is formed by dissociating protons of two or more mercapto groups from the polyvalent mercaptan (the mercaptan having two or more mercapto groups).

In the present invention, the polyvalent mercaptan segment preferably derives from at least one compound selected from the group consisting of trimethylolpropane trithioglycolate, trimethylolpropane trithiopropionate, pentaerythritol tetrakisthioglycolate, pentaerythritol tetrakisthiopropionate, dipentaerythritol hexakisthioglycolate, and dipentaerythritol hexakisthiopropionate, which are 3- to 6-valent mercaptans. If the polyvalent mercaptan segment derives from the 3- to 6-valent mercaptan, a star-shaped structure in which copolymer segments are radially extended from the polyvalent mercaptan segment in 3 to 6 directions is formed, thus copolymer segments, of which the compositions are a little different, easily tangle with each other between adjacent macromolecules and do not form a large phase-separation structure. Therefore, the thermoplastic addition polymer can have a higher parallel-rays transmittance.

The copolymer segments include two or more kinds of different polymerizable unsaturated monomer units. The polymerizable unsaturated monomer units derive from polymerizable unsaturated monomers which are cited in the later-mentioned explanation of the production process. The two or more kinds of different polymerizable unsaturated monomer units include: a unit (a first monomer unit) deriving from a first polymerizable unsaturated monomer which is formable into a first polymer segment; and a unit (a second monomer unit) deriving from a second polymerizable unsaturated monomer which is formable into a second polymer segment having properties different from those of the first polymer segment.

In addition, the copolymer segments have compositions which continuously vary over the entire collective of macromolecules which constitute the thermoplastic addition polymer. It means that, over the entire collective of macromolecules, the copolymer segments do not only include the first and second polymer segments, but also have continuous compositions in which compositions of the first and second polymer segments are mixed in an optional ratio. The compositions of the polymerizable unsaturated monomer units are shown in the form averaged for the entire collective of macromolecules.

The thermoplastic addition polymer of the present invention is differentiated with respect to its properties from the following polymers: a polymer consisting of copolymer segments having monomer unit compositions in the averaged form as mentioned above; a mixture of copolymers which have continuous compositions, in which compositions of the first and second polymer segments are mixed in an optional ratio, but do not have a block structure; and what is called a block polymer or a graft polymer, which includes copolymer segments having a composition of the first polymer segment as well as copolymer segments having a composition of the second polymer segment.

The thermoplastic addition polymer of the present invention can have various functions because of inclusion of copolymer segments having many compositions over the entire collective of macromolecules which constitute the thermoplastic addition polymer, and the thermoplastic addition polymer has a form which does not easily cause a phase separation, because many compositions vary little by little over the entire collective of macromolecules. Such a form effectively serves to display new functions.

The term "many compositions" means that the copolymer segments have compositions including constituent monomer units which continuously vary over the entire collective of macromolecules; for example, the term means that, like a polymer having a wide width of glass transition temperature has a continuous range of glass transition temperature, the copolymer segments have compositions in a range from a composition of monomer units which constitute a polymer segment having a glass transition temperature of the lower limit of the aforementioned glass transition temperature peak to a composition of monomer units which constitute a polymer segment having a glass transition temperature of the upper limit of the aforementioned glass transition temperature peak.

That many compositions vary little by little mean that the ratio of some or all of the constituent monomer units of the copolymer segments continuously varies, and is obtained by gradually varying the composition of polymerizable unsaturated monomers in the polymerization system. To gradually vary the composition of polymerizable unsaturated monomers in the polymerization system, for example, can be accomplished by gradually adding the second polymerizable unsaturated monomer to the polymerization system containing the first polymerizable unsaturated monomer before or during the polymerization of the polymerization system while the monomer is polymerized.

The thermoplastic addition polymer of the present invention may be allowed to have more various performance by combining copolymer segments having three or more different compositions.

The thermoplastic addition polymer, according to the second embodiment of the present invention, includes the same features as of the thermoplastic addition polymer according to the first embodiment of the present invention, but is further defined by values of its properties.

The thermoplastic addition polymer, according to the second embodiment of the present invention, includes two or more kinds of different polymerizable unsaturated monomer units and has a number-average molecular weight of 4,000 to 1,000,000, only one glass transition temperature peak with a width of 50° C. or more, and a parallel-rays transmittance of 85% or more. The thermoplastic addition polymer, according to the second embodiment of the present invention, preferably has a number-average molecular weight of 20,000 to 200,000, only one glass transition temperature peak with a width of 80° C. or more, and a parallel-rays transmittance of 90% or more. An example of such a thermoplastic addition polymer is the thermoplastic addition polymer according to the first embodiment of the present invention.

Examples of the two or more kinds of different polymerizable unsaturated monomer units included in the thermoplastic addition polymer according to the second embodiment of the present invention are the first and second monomer units which are mentioned in the explanation of the first embodiment.

A thermoplastic addition polymer of the present invention has a number-average molecular weight of 4,000 to 1,000,000. In the case where the number-average molecular weight is less than this range, properties deriving from the composition of monomer units constituting the polymer is not easily displayed. On the other hand, in the case where the number-average molecular weight is more than the abovementioned range, the viscosity of the polymer is high, so the polymer is difficult to handle. In this respect, the number-average molecular weight is preferably in a range of 10,000 to 400,000, and more preferably in a range of 20,000 to 200,000.

A thermoplastic addition polymer of the present invention has only one glass transition temperature peak with a width of 50° C. or more, preferably 80° C. or more, and more preferably 100° C. or more. In the case where the width of the glass transition temperature peak is less than these ranges, the balance between the heat resistance and the toughness of the polymer is broken. With respect to the width of the glass transition temperature peak, the range of 80° C. or more is preferred to the range of 50° C. or more in an aspect of the balance between the heat resistance and the toughness, and in addition, the range of 100° C. or more is preferred to the range of 80° C. or more. The width of the glass transition temperature peak is defined as a peak width measured using a differential scanning calorimeter (DSC).

A thermoplastic addition polymer of the present invention has a parallel-rays transmittance of 85% or more. In the case where the parallel-rays transmittance is less than this range, the polymer is in a state of a large phase-separation. With respect to the parallel-rays transmittance, the range of 90% or more is preferred to the range of 85% or more in fields of utilization where the transparency is demanded. The parallel-rays transmittance is defined as a visible-rays transmittance which is measured using a turbidimeter in a direction of the thickness of a 3-mm-thick plain plate obtained by injection-molding the thermoplastic addition polymer.

In the case where the thermoplastic addition polymer of the present invention is produced by the later-mentioned production process, the polymer contains a sulfur atom in a range of 0.005 to 4% by weight. In the case where the amount of the sulfur atom is smaller than this range, the number-average molecular weight may be too high, or the thermoplastic addition polymer having an intended structure may not be obtained. On the other hand, in the case where the amount of the sulfur atom is larger than the abovementioned range, the number-average molecular weight may be too low, thus properties deriving from the composition of the copolymer segments may not easily be displayed. If it is considered that the preferable number-average molecular weight of the intended thermoplastic addition polymer is in a range of 10,000 to 400,000, the amount of the sulfur atom is preferably in a range of 0.01 to 2% by weight; and if it is considered that the more preferable number-average molecular weight of the intended thermoplastic addition polymer is in a range of 20,000 to 200,000, the amount of the sulfur atom is preferably in a range of 0.02 to 1% by weight.

(Process for producing thermoplastic addition polymer)

The process for producing a thermoplastic addition polymer, according to the present invention, includes a preparation step, an adding step, and a polymerization step.

The process for producing a thermoplastic addition polymer, according to the present invention, may further include a prepolymerization step of carrying out radical polymerization of a first polymerizable unsaturated monomer in between the preparation step and the adding step, the radical polymerization being initiated with a mercapto group of the polyvalent mercaptan.

In the case where the production process further includes the prepolymerization step, the adding step is preferably initiated before the polymerization conversion of the first polymerizable unsaturated monomer exceeds 50% by weight.

The preparation step includes a step of preparing a mixture including the first polymerizable unsaturated monomer and a polyvalent mercaptan.

The adding step includes a step of gradually adding a second polymerizable unsaturated monomer to the mixture obtained by the preparation step, wherein the second polymerizable unsaturated monomer has a composition different from that of the first polymerizable unsaturated monomer.

The polymerization step includes a step of carrying out radical polymerization of a mixture of the first polymerizable unsaturated monomer and the added second polymerizable unsaturated monomer during the adding step, the radical polymerization being initiated with a mercapto group of the polyvalent mercaptan.

The polyvalent mercaptan used in the present invention is the same as mentioned in the explanation of the process of the present invention for producing a block polymer.

The polyvalent mercaptan used in the present invention is preferably a compound having 2 to 10 mercapto groups, namely, a 2- to 10-valent mercaptan, and more preferably a compound having 3 to 6 mercapto groups, namely, a 3- to 6-valent mercaptan, for producing the thermoplastic addition polymer with good efficiency and for allowing the resultant polymer to have high performance by introducing into the polymer the structure in which polymer segments are radially extended from an identical center. A mercaptan having only one mercapto group does not give the structure in which polymer segments are radially extended. A mercaptan having 3 or more mercapto groups is preferable, because it allows a thermoplastic addition polymer having a high compatibility to be formed and thus makes the phase separation more difficult to occur. A mercaptan having more than 10 mercapto groups does not form the structure in which polymer segments are radially extended from an identical center, thus desired properties may not be displayed.

As to the first and second polymerizable unsaturated monomers used in the present invention, any monomer that forms a homopolymer or copolymer by radical polymerization can be used. Their examples are monomers which are exemplified in the explanation of the process of the present invention for producing a block polymer, and the monomers may be used either alone or in combinations with each other.

In the production process of the present invention, the mixture including the first polymerizable unsaturated monomer and the polyvalent mercaptan is first prepared. The first polymerizable unsaturated monomer may be either a single monomer or a mixture of two or more kinds of polymerizable unsaturated monomers.

The mixture including the first polymerizable unsaturated monomer and the polyvalent mercaptan may further include a medium in which the monomer and the mercaptan are dissolved and/or dispersed. Any medium into which the monomer and the resultant polymer can be dissolved may be used. The amount of the medium is, for example, in a range of 0 to 200% by weight, and preferably in a range of 0 to 100% by weight, based on the total amount of the first and second polymerizable unsaturated monomers. In the case where the amount of the medium is larger than these ranges, there are industrial disadvantages in that the polymerization rate is slow or that the cost calculated in terms of the solid content is high.

In the adding step, the second polymerizable unsaturated monomer is gradually added to the mixture obtained by the preparation step. The second polymerizable unsaturated monomer has a composition different from that of the first polymerizable unsaturated monomer, and may be either a single monomer or a mixture of two or more kinds of polymerizable unsaturated monomers.

Even if a polymer from the first polymerizable unsaturated monomer and a polymer from the second polymerizable unsaturated monomer are not compatible with each other, the thermoplastic addition polymer having a parallel-rays transmittance of, for example, 85% or more, preferably 90% or more, can be obtained by the production process of the present invention. That polymers are not compatible with each other means that a mixture of polymers are separated into phases of each polymer, for example, a sea-island structure is formed.

The radical polymerization of the mixture of the first and second polymerizable unsaturated monomers is carried out during the adding step, the radical polymerization being initiated with a mercapto group of the polyvalent mercaptan. This radical polymerization gives a product in which an end of a copolymer segment having a composition corresponding to a monomer composition of the polymerization system during the reaction is bonded to a sulfur residue of one or more mercapto groups in each molecule of the polyvalent mercaptan. As the second polymerizable unsaturated monomer is added, the monomer composition of the polymerization system varies, thus the composition of the copolymer segments continuously varies. In order to efficiently bond an end of the copolymer segment to the sulfur residue, it is preferable not to add to the polymerization system a polymerization initiator more than is needed.

In the present invention, radical polymerization of only the first polymerizable unsaturated monomer may be carried out as the prepolymerization step in between the preparation step and the adding step, the radical polymerization being initiated with a mercapto group of the polyvalent mercaptan. This radical polymerization gives a product in which an end of a copolymer segment having one composition is bonded to a sulfur residue of one or more mercapto groups in each molecule of the polyvalent mercaptan.

In the present invention, the radical polymerization may be carried out by any addition-polymerization method such as bulk polymerization, solution polymerization, suspension polymerization, and emulsion polymerization, which are conventional radical polymerization methods.

The polymerization temperature is preferably in a range of 30° to 200° C., and more preferably in a range of 100° to 150° C. where the polymerization can stably be carried out without a polymerization initiator.

In the present invention, when the polymerization is carried out, there may be used conventional polymerization initiators, for example: azo-based polymerization initiators such as 2,2'-azobisisobutyronitrile and 2,2'-azobiscyclohexanecarbonitrile; peroxide-based polymerization initiators such as benzoyl peroxide; and the like. However, the polymerization initiator is used in a ratio by weight of usually 1/3 or less, preferably 1/10 or less, to the polyvalent mercaptan, and more preferably is not used at all. The reasons are as follows. In the case where the polymerization initiator is used in an amount larger than the above-mentioned range, not only the copolymer segments, which are extended from the polyvalent mercaptan giving the thermoplastic addition polymer, but also a large amount of copolymers, which are extended from the polymerization initiator, are formed, thus lowering the production efficiency of the thermoplastic addition polymer. In addition, in the case where the bulk polymerization which is an industrially inexpensive production process is carried out, the polymerization stability is poor, an uncontrollable reaction occurs, and at worst a danger of explosion is involved.

An example of the production procedure is as follows: the radical polymerization of the first polymerizable unsaturated monomer is carried out, or not carried out, in the presence of the polyvalent mercaptan, and when the polymerization conversion reaches 0 to 50%, preferably 10 to 30%, the second polymerizable unsaturated monomer is gradually added.

It is preferable that the polymerization conversion of the first polymerizable unsaturated monomer at the initiation of adding the second polymerizable unsaturated monomer and the timing for adding the second polymerizable unsaturated monomer are appropriately varied dependently upon the composition of copolymer segments of the intended thermoplastic addition polymer. For example, if a copolymer segment deriving from the first polymerizable unsaturated monomer is needed, the adding of the second polymerizable unsaturated monomer is preferably initiated when the polymerization conversion of the first polymerizable unsaturated monomer is high. Or if a copolymer segment deriving from the first polymerizable unsaturated monomer is not very much needed, the adding of the second polymerizable unsaturated monomer is preferably initiated at the same time as the initiation of the polymerization of the first monomer. Or if a copolymer segment deriving from the second polymerizable unsaturated monomer is needed, the second polymerizable unsaturated monomer is preferably added at a rate slower than the polymerization rate. Or if a copolymer segment deriving from the second polymerizable unsaturated monomer is not needed, the second polymerizable unsaturated monomer is preferably added at a rate faster than the polymerization rate.

The second polymerizable unsaturated monomer may gradually be added, for example, dropwise. The adding rate may be either constant or variable, but the rate is preferably constant. In the case where the second polymerizable unsaturated monomer is added after the polymerization conversion has exceeded the aforementioned range, a thermoplastic addition polymer which easily causes the phase separation which makes the polymer opaque may be formed, because the proportion of copolymer segments produced from the first polymerizable unsaturated monomer becomes too high. In the case where a copolymer segment corresponding to the first polymerizable unsaturated monomer is needed, it is unfavorable that the second polymerizable unsaturated monomer is added before the polymerization conversion reaches the aforementioned range, because almost no copolymer segment corresponding to the first polymerizable unsaturated monomer may be formed.

In the production process of the present invention, the composition of monomers in the polymerization system gradually varies as the second polymerizable unsaturated monomer is gradually added. Thereby, the composition of the resultant copolymer segments also gradually varies, thus a thermoplastic addition polymer having many compositions which are different from each other by degrees (gradient compositions) is obtained. In addition, the radical polymerization is initiated with a mercapto group of the polyvalent mercaptan, thus producing a thermoplastic addition polymer in which a mercapto group valence number of copolymer segments having optional compositions are bonded to the polyvalent mercaptan segment.

After the adding of the second polymerizable unsaturated monomer has finished, radical polymerization for ageing may be carried out, if necessary.

By the production process of the present invention, the thermoplastic addition polymer having a parallel-rays transmittance of 85 % or more, preferably 90% or more, is obtained. In addition, by the production process of the present invention, the thermoplastic addition polymer according to the first or second embodiment of the present invention is obtained.

(Hot-melt resin composition according to the first embodiment)

The hot-melt resin composition, according to the first embodiment of the present invention, includes a block polymer having a polyvalent mercaptan segment and two or more polymer segments and further having a number-average molecular weight of 10,000 to 200,000, wherein the two or more polymer segments are radially extended from the polyvalent mercaptan segment and have two or more different compositions. The block polymer has a lower viscosity than linear-chain polymers having the same molecular weight and further has intermolecular complicated tangles at a temperature in use (for example, normal temperature to about 80° C., hereinafter the same) and larger cohesion than linear-chain polymers, because the block polymer has a branched structure in which the two or more polymer segments are radially extended from the polyvalent mercaptan segment.

The block polymer included in the hot-melt resin composition according to the first embodiment of the present invention is, except having a number-average molecular weight of 10,000 to 200,000, the same as the block polymer of the present invention. In the case where the number-average molecular weight of the block polymer is less than the above-mentioned range, the polymer is deteriorated due to heating when used, because its heat resistance is poor. Or otherwise in the case where the number-average molecular weight of the block polymer is more than the above-mentioned range, the melt-viscosity is so high that the handling is bad. If the balance, in which the heat resistance is sufficiently high and the melt-viscosity is sufficiently low, is considered, the number-average molecular weight of the block polymer is preferably in a range of 30,000 to 150,000.

The block polymer preferably has a molecular weight distribution (Mw/Mn) of 4 or less. In the case where the molecular weight distribution is more than 4, the hot-melt workability may be poor when the amount of high molecular weight components is large, because the viscosity becomes high due to ionic crosslinking, or the heat resistance may be low even if the polymer is ionically crosslinked when the amount of low molecular weight components is large.

The polyvalent mercaptan segment is such as explained with regard to the aforementioned block polymer of the present invention. Particularly, the polyvalent mercaptan segment is a residue formed by eliminating protons of two or more mercapto groups preferably from a 3- to 6-functional mercaptan, or more preferably from a 4- to 6-functional mercaptan. The reason for this is that there is an advantage in that effects due to tangles between polymer segments (for example, high cohesion) or the form change of the phase-separated structure can be expected because the block polymer has a star-shaped block structure in which segments are radially extended from an identical center.

The polymer segment is such as explained with regard to the aforementioned block polymer of the present invention. However, the polymer segment usually has a number-average molecular weight of 1,000 to 150,000, preferably 3,000 to 100,000. In the case where the number-average molecular weight of the polymer segment is less than the above-mentioned range, there is a possibility that properties due to the polymer segment may not be introduced into the block polymer. Or otherwise in the case where the number-average molecular weight of the polymer segment is more than the above-mentioned range, there is a possibility that the productivity may be poor, not only because the melt-viscosity is high, but also because the viscosity during the production process is high.

The combination of polymer segments having different compositions is basically the combination of polymer segments deriving from polymers having different glass transition temperatures (Tg)as explained with regard to the aforementioned block polymer of the present invention. An example thereof is a combination of polymethyl methacrylate (PMMA) as a polymer having a high Tg with polybutyl acrylate (PBA) as a polymer having a low Tg. In the case of this combination, the number-average molecular weight of PMMA is preferably in a range of 5,000 to 100,000, the number-average molecular weight of PBA is preferably in a range of 10,000 to 100,000, and the weight ratio of PMMA/PBA is preferably in a range of 10/90 to 90/10. In the case where the combination deviates from these ranges, sufficient performance cannot be obtained.

In the hot-melt resin composition according to the first embodiment of the present invention, a block polymer can be used, in which the polyvalent mercaptan segment includes a 3- to 6-valent mercaptan residue and in which the two or more polymer segments have two different compositions, the block polymer being shown by the following general formula (III):

(III)

wherein:
PA and PB denote the above-mentioned polymer segments having different compositions;

denotes the above-mentioned polyvalent mercaptan residue;
n+m is a number in a range of 3 to 6;
n is a number in a range of 1 to 5; and
m is a number in a range of 1 to 5.

In the above-mentioned formula (III), PA and PB denote polymer segments having different compositions, for example, there can be a combination in which PA is a polymer segment having a glass transition temperature of 20° C. or higher, and PB is a polymer segment having a glass transition temperature of 0° C. or lower; preferably, PA is a polymer segment having a glass transition temperature of 50° C. or higher, and PB is a polymer segment having a glass transition temperature of −20° C. or lower; more preferably, PA is a polymer segment having a glass transition temperature of 70° C.; or higher, and PB is a polymer segment having a glass transition temperature of −40° C. or lower.

In the case where n or m in the above-mentioned formula (III) is smaller than the above-mentioned range, desirable sufficient performance may not be obtained.

When the hot-melt resin composition is used as a pressure sensitive adhesive, the block polymer is designed in such a manner that polymer segments with a lower Tg have a larger proportion than polymer segments with a higher Tg.

When the hot-melt resin composition is used as a hot-melt adhesive, the block polymer is designed in such a manner that polymer segments with a higher Tg have a larger proportion than polymer segments with a lower Tg.

The block polymer included in the hot-melt resin composition according to the first embodiment of the present invention is, for example, produced by the production process for the block polymer included in the hot-melt resin composition according to the second embodiment of the present invention.

(Hot-melt resin composition according to the second embodiment)

The hot-melt resin composition, according to the second embodiment of the present invention, includes a block polymer obtainable by a production process including a preparation step, a first polymerization step, an adding step, and a second polymerization step, wherein: the preparation step includes a step of preparing a first mixture including a first polymerizable unsaturated monomer and a polyvalent mercaptan; the first polymerization step includes a step of carrying out radical polymerization of the first polymerizable unsaturated monomer, the radical polymerization being initiated with a mercapto group of the polyvalent mercaptan; the adding step includes a step of adding a second polymerizable unsaturated monomer to a reaction mixture obtained by the first polymerization step, thus producing a second mixture, wherein the second polymerizable unsaturated monomer has a composition different from that of the first polymerizable unsaturated monomer; the second polymerization step includes a step of carrying out radical polymerization of the polymerizable unsaturated monomers which are contained in the second mixture. The block polymer has a lower viscosity than linear-chain polymers having the same molecular weight and further has intermolecular complicated tangles at a temperature in use and larger cohesion than linear-chain polymers, because the block polymer has a branched structure.

The production process is such as explained with regard to the production process of the present invention for the block polymer. However, the first mixture contains the polyvalent mercaptan, for example, in a ratio of 0.01 to 10 parts by weight per 100 parts by weight of the first polymerizable unsaturated monomer. In the case where the amount of the polyvalent mercaptan deviates from this range, the number-average molecular weight of the polymer segments may deviate from the range of 1,000 to 150,000, or that of the thermoplastic addition polymer may deviate from the range of 10,000 to 200,000. If this is considered, the amount of the polyvalent mercaptan is preferably in a range of 0.05 to 5 parts by weight.

When the hot-melt resin composition is used as a pressure sensitive adhesive, the block polymer is designed in such a manner that polymer segments with a lower Tg have a larger proportion than polymer segments with a higher Tg.

When the hot-melt resin composition is used as a hot-melt adhesive, the block polymer is designed in such a manner that polymer segments with a higher Tg have a larger proportion than polymer segments with a lower Tg.

The combination of the first and second polymerizable unsaturated monomers is determined from a viewpoint that the cohesion of the block polymer is enhanced by introducing a block structure having polymer segments with different Tg's. An example thereof is a combination of: a polymerizable unsaturated monomer which is formable into a thermoplastic polymer having a glass transition temperature of 0° C.; or lower; and a polymerizable unsaturated monomer which is formable into a thermoplastic polymer having a glass transition temperature of 20° C. or higher. From a viewpoint that the cohesion of the block polymer is improved to a higher level, a preferable combination is a combination of: a polymerizable unsaturated monomer which is formable into a thermoplastic polymer having a glass transition temperature of −20° C. or lower; and a polymerizable unsaturated monomer which is formable into a thermoplastic polymer having a glass transition temperature of 50° C. or higher; more preferably a combination of: a polymerizable unsaturated monomer which is formable into a thermoplastic polymer having a glass transition temperature of −40° C. or lower; and a polymerizable unsaturated monomer which is formable into a thermoplastic polymer having a glass transition temperature of 70° C. or higher.

Examples of the polymerizable unsaturated monomer which is formable into the thermoplastic polymer having a glass transition temperature of 0° C. or lower, preferably −20° C. or lower, more preferably −40° C. or lower, are alkyl (with 4 to 16 carbon atoms) acrylates used alone or their mixture, butadiene used alone, and the like.

Examples of the polymerizable unsaturated monomer which is formable into the thermoplastic polymer having a glass transition temperature of 20° C. or higher, preferably 50° C. or higher, more preferably 70° C. or higher are methyl methacrylate used alone, styrene used alone, a monomer mixture of acrylonitrile and styrene, and the like.

There is no especial limitation in the composition if one of the first and second polymerizable unsaturated monomers is a monomer which is formable into a thermoplastic polymer having a lower glass transition temperature and if the other monomer is a monomer which is formable into a thermoplastic polymer having a higher glass transition temperature. Preferably, the thermoplastic polymer which is formable from the first polymerizable unsaturated monomer has a higher glass transition temperature, because in the case where it is otherwise intended to obtain a polymer having a higher glass transition temperature in the second polymerization step, the process must further include a step of removing the first polymerizable unsaturated monomer which remains after the first polymerization step.

If the reaction mixture obtained from the second polymerization step does not contain a volatile component such as a solvent and a residual monomer, the mixture itself can be used as the hot-melt resin composition. If the reaction mixture contains the volatile component, the hot-melt resin composition can be obtained by removing the volatile component using an apparatus such as a twin-screw extruder and a thin-membrane evaporator.

(Hot-melt resin composition according to the third embodiment)

The hot-melt resin composition, according to the third embodiment of the present invention, includes a block polymer having a polyvalent mercaptan segment and two or more polymer segments and further having a number-average molecular weight of 10,000 to 200,000, wherein the two or more polymer segments have two or more different compositions including a carboxyl group-containing polymerizable unsaturated monomer unit and a (meth)acrylic acid ester monomer unit and are radially extended from the polyvalent mercaptan segment. The block polymer has: a lower viscosity than linear-chain polymers having the same molecular weight; intermolecular complicated tangles at a temperature in use; larger cohesion than linear-chain polymers; and the resistance to heat and weather; because the block polymer has a branched structure in which the two or more polymer segments are radially extended from the polyvalent mercaptan segment.

The hot-melt resin composition according to the third embodiment is the same as the hot-melt resin composition according to the first embodiment, except that the two or more polymer segments of the block polymer in the composition according to the third embodiment include a carboxyl group-containing polymerizable unsaturated monomer unit and a (meth)acrylic acid ester monomer unit.

Each polymer segment, for example, includes 0.5 to 25% by weight of the carboxyl group-containing polymerizable unsaturated monomer unit, 50 to 99.5% by weight of the (meth)acrylic acid ester monomer unit, and 0 to 25% by weight of a unit of another polymerizable unsaturated monomer which is copolymerizable, or each polymer segment preferably includes 1 to 10% by weight of the carboxyl group-containing polymerizable unsaturated monomer unit and 90 to 99% by weight of the (meth)acrylic acid ester monomer unit.

The carboxyl group-containing polymerizable unsaturated monomer unit is, for example, a monomer unit which derives from a carboxyl group-containing polymerizable unsaturated monomer as explained with regard to the later-mentioned hot-melt resin composition according to the fourth embodiment. The amount of the carboxyl group-containing polymerizable unsaturated monomer unit is defined within the above-mentioned range in order to introduce a carboxyl group into the thermoplastic addition polymer. In the case where the amount is smaller than the range, the heat resistance of the hot-melt resin composition may be insufficient. On the other hand, in the case where the amount is larger than the range, properties such as water resistance of the hot-melt resin composition may be influenced for the worse.

The (meth)acrylic acid ester monomer unit is, for example, a monomer unit which derives from a (meth)acrylic acid ester monomer as explained with regard to the later-mentioned hot-melt resin composition according to the fourth embodiment. If the amount of the (meth)acrylic acid ester monomer unit is within the aforementioned range, the heat resistance and the weather resistance of the hot-melt resin composition are good. However, in the case where the amount is smaller than the range, the heat resistance or the weather resistance of the hot-melt resin composition may be insufficient.

The unit of another polymerizable unsaturated monomer which is copolymerizable is, for example, a monomer unit which derives from a polymerizable unsaturated monomer, which is copolymerizable, as explained with regard to the later-mentioned hot-melt resin composition according to the fourth embodiment. In the case where the amount of the unit of the polymerizable unsaturated monomer which is copolymerizable is larger than the aforementioned range, the sufficient weather resistance may not be obtained.

The block polymer included in the hot-melt resin composition according to the third embodiment is, for example, the block polymer which is shown by the aforementioned general formula (III).

The polymer segments, PA and PB in the formula (III), having different compositions, for example, can include the combination as explained with regard to the hot-melt resin composition according to the first embodiment.

The block polymer included in the hot-melt resin composition according to the third embodiment, for example, can be produced by the process for producing the block polymer included in the hot-melt resin composition according to the fourth embodiment.

(Hot-melt resin composition according to the fourth embodiment)

The hot-melt resin composition, according to the fourth embodiment of the present invention, includes a block polymer obtainable by a production process including a preparation step, a first polymerization step, an adding step, and a second polymerization step. The preparation step includes a step of preparing a first mixture including a first polymerizable unsaturated monomer and a polyvalent mercaptan, wherein the first polymerizable unsaturated monomer includes a carboxyl group-containing polymerizable unsaturated monomer and a (meth)acrylic acid ester monomer. The first polymerization step includes a step of carrying out radical polymerization of the first polymerizable unsaturated monomer, the radical polymerization being initiated with a mercapto group of the polyvalent mercaptan. The adding step includes a step of adding a second polymerizable unsaturated monomer to a reaction mixture obtained by the first polymerization step, thus producing a second mixture, wherein the second polymerizable unsaturated monomer includes a carboxyl group-containing polymerizable unsaturated monomer and a (meth)acrylic acid ester monomer and has a composition different from that of the first polymerizable unsaturated monomer. The second polymerization step includes a step of carrying out radical polymerization of the polymerizable unsaturated monomers which are contained in the second mixture. The block polymer has: a lower viscosity than linear-chain polymers having the same molecular weight; intermolecular complicated tangles at a temperature in use; larger cohesion than linear-chain polymers; and the resistance to heat and weather; because the block polymer has a branched structure.

In the process for producing the block polymer included in the hot-melt resin composition according to the fourth embodiment, the first polymerization step, for example, is not finished until the polymerization conversion of the first polymerizable unsaturated monomer reaches 50% by weight or more.

With regard to the hot-melt resin composition according to the fourth embodiment, an example of the first polymerizable unsaturated monomer is a monomer which is formable into a thermoplastic polymer having a glass transition temperature of 20° C. or higher, and an example of the second polymerizable unsaturated monomer is a monomer which is formable into a thermoplastic polymer having a glass transition temperature of 0° C. or lower.

The hot-melt resin composition according to the fourth embodiment is the same as the hot-melt resin composition according to the second embodiment, except that each of the first and second polymerizable unsaturated monomers in the hot-melt resin composition according to the fourth embodiment includes a carboxyl group-containing polymerizable unsaturated monomer and a (meth)acrylic acid ester monomer.

The first polymerizable unsaturated monomer, for example, includes 0.5 to 25% by weight of the carboxyl group-containing polymerizable unsaturated monomer, 50 to 99.5% by weight of the (meth)acrylic acid ester monomer, and 0 to 25% by weight of another polymerizable unsaturated monomer which is copolymerizable, or the first polymerizable unsaturated monomer preferably includes 1 to 10% by weight of the carboxyl group-containing polymerizable unsaturated monomer and 90 to 99% by weight of the (meth)acrylic acid ester monomer.

The second polymerizable unsaturated monomer, for example, includes 0.5 to 25% by weight of the carboxyl group-containing polymerizable unsaturated monomer, 50 to 99.5% by weight of the (meth)acrylic acid ester monomer, and 0 to 25% by weight of another polymerizable unsaturated monomer which is copolymerizable, or the first polymerizable unsaturated monomer preferably includes 1 to 10% by weight of the carboxyl group-containing polymerizable unsaturated monomer and 90 to 99% by weight of the (meth)acrylic acid ester monomer.

The carboxyl group-containing polymerizable unsaturated monomer is, for example, at least one monomer selected from the group consisting of: unsaturated monocarboxylic acids such as acrylic acid and methacrylic acid; unsaturated dicarboxylic acids such as itaconic acid, maleic acid and fumaric acid; monoalkyl esters of unsaturated dicarboxylic acids such as itaconic acid, maleic acid and fumaric acid; half esters of succinic or phthalic anhydride with hydroxylethyl (meth)acrylate. In the case where the amount of the carboxyl group-containing polymerizable unsaturated monomer is smaller than the aforementioned range, the heat resistance of the hot-melt resin composition may be insufficient. On the other hand, in the case where the amount is larger than the range, properties such as water resistance of the hot-melt resin composition may be influenced for the worse.

The (meth)acrylic acid ester monomer is, for example, at least one monomer selected from the group consisting of: (meth)acrylates such as alkyl (meth)acrylates having alkyl groups with 1 to 20 carbon atoms, hydroxyethyl (meth)acrylate, hydroxypropyl (meth)acrylate, glycidyl (meth)acrylate, methoxyethyl (meth)acrylate, ethoxyethyl (meth)acrylate, and ethoxyethoxyethyl (meth)acrylate. If the amount of the (meth)acrylic acid ester monomer is within the aforementioned range, the heat resistance and the weather resistance of the hot-melt resin composition are good. However, in the case where the amount is smaller than the range, the heat resistance or the weather resistance of the hot-melt resin composition may be insufficient.

The polymerizable unsaturated monomer which is copolymerizable is a monomer which is copolymerizable with the carboxyl group-containing polymerizable unsaturated monomer and the (meth)acrylic acid ester monomer: for example, the polymerizable unsaturated monomer as exemplified with regard to the second embodiment other than the carboxyl group-containing polymerizable unsaturated monomer and the (meth)acrylic acid ester monomer. In the case where the amount of the polymerizable unsaturated monomer which is copolymerizable is larger than the aforementioned range, sufficient weather-resistance may not be obtained.

The combination of the first and second polymerizable unsaturated monomers is selected from the standpoint that the cohesion of the block polymer can be enhanced by introducing a block structure having polymer segments with different Tg's. An example of the combination is a combination of a polymerizable unsaturated monomer which is formable into a thermoplastic polymer having a glass transition temperature of 0° C. or lower and a polymerizable unsaturated monomer which is formable into a thermoplastic polymer having a glass transition temperature of 20° C. or higher. For the purpose of more improving the cohesion of the thermoplastic addition polymer, the combination is preferably a combination of a polymerizable unsaturated monomer which is formable into a thermoplastic polymer having a glass transition temperature of −20° C. or lower and a polymerizable unsaturated monomer which is formable into a thermoplastic polymer having a glass transition temperature of 50° C. or higher, and more preferably a combination of a polymerizable unsaturated monomer which is formable into a thermoplastic polymer having a glass transition temperature of −40° C. or lower and a polymerizable unsaturated monomer which is formable into a thermoplastic polymer having a glass transition temperature of 70° C. or higher.

There is no especial limitation in the composition if one of the first and second polymerizable unsaturated monomers is a monomer which is formable into a thermoplastic polymer having a lower glass transition temperature and if the other monomer is a monomer which is formable into a thermoplastic polymer having a higher glass transition temperature. Preferably, the thermoplastic polymer which is formable from the first polymerizable unsaturated monomer has a higher glass transition temperature, because in the case where it is otherwise intended to obtain a polymer having a higher glass transition temperature in the second polymerization step, the process must further include a step of removing the first polymerizable unsaturated monomer which remains after the first polymerization step.

(Hot-melt resin composition according to the fifth embodiment)

The hot-melt resin composition, according to the fifth embodiment of the present invention, includes a thermoplastic addition polymer including a collective of macromolecules having a polyvalent mercaptan segment and two or more copolymer segments, wherein the two or more copolymer segments include two or more kinds of different polymerizable unsaturated monomer units, are radially extended from the polyvalent mercaptan segment, and have compositions which continuously vary over the entire collective of macromolecules. The thermoplastic addition polymer has: a lower viscosity than linear-chain polymers having the same molecular weight; intermolecular complicated tangles at a temperature in use; larger cohesion than linear-chain polymers, graft polymers, block polymers, and the like; and the transparency; because the thermoplastic addition polymer has a branched structure with gradient compositions in which the two or more copolymer segments are radially extended from the polyvalent mercaptan segment.

The respective meanings of "radially extended" and "polyvalent mercaptan segment" are such as explained with regard to the hot-melt resin composition according to the first embodiment.

The copolymer segments include two or more kinds of different polymerizable unsaturated monomer units. The polymerizable unsaturated monomer units derive from polymerizable unsaturated monomers which are cited in the later-mentioned explanation of the hot-melt resin composition according to the seventh embodiment. The two or more kinds of different polymerizable unsaturated monomer units include: a unit (a first monomer unit) deriving from a first polymerizable unsaturated monomer which is formable into a first polymer segment; and a unit (a second monomer unit) deriving from a second polymerizable unsaturated monomer which is formable into a second polymer segment having properties which are different from those of the first polymer segment. One of the first and second monomer units, for example, corresponds to PA, and the other corresponds to PB, wherein PA and PB are explained with regard to the hot-melt resin composition according to the first embodiment.

In addition, the copolymer segments have compositions which continuously vary over the entire collective of macromolecules which constitute the thermoplastic addition polymer. It means that, over the entire collective of macromolecules, the copolymer segments do not only include the first and second polymer segments, but also have continuous compositions in which compositions of the first and second polymer segments are mixed in an optional ratio. The compositions of the polymerizable unsaturated monomer units are shown in the form averaged for the entire collective of macromolecules.

The thermoplastic addition polymer included in the hot-melt resin composition according to the fifth embodiment is differentiated with respect to its properties from the following polymers: a polymer consisting of copolymer segments having monomer unit compositions in the averaged form as mentioned above; a mixture of copolymers which have the continuous compositions (in which the compositions of the first and second polymer segments are mixed in an optional ratio) but do not have a block structure; and what is called block polymer or graft polymer, which includes copolymer segments having a composition of the first polymer segment as well as copolymer segments having a composition of the second polymer segment.

The thermoplastic addition polymer included in the hot-melt resin composition according to the fifth embodiment can have various functions because of inclusion of copolymer segments having many compositions over the entire collective of macromolecules which constitute the thermoplastic addition polymer, and the thermoplastic addition polymer further has a form which does not easily cause a phase separation, because many compositions vary little by little over the entire collective of macromolecules. Such a form effectively serves to display new functions.

The term "many compositions" means that the copolymer segments have compositions including constituent monomer units which continuously vary over the entire collective of macromolecules: for example, the term means that, like a polymer with a wide width of glass transition temperature has a continuous range of glass transition temperature, the copolymer segments have a composition range from a composition of monomer units which constitute a polymer segment having a glass transition temperature of the lower limit of the aforementioned glass transition temperature peak to a composition of monomer units which constitute a polymer segment having a glass transition temperature of the upper limit of the aforementioned glass transition temperature peak.

That many compositions vary little by little mean that the ratio of some or all of the constituent monomer units of the copolymer segments continuously varies, and is obtained by gradually varying the composition of polymerizable unsaturated monomers in the polymerization system. To gradually vary the composition of polymerizable unsaturated monomers in the polymerization system, for example, can be accomplished by gradually adding the second polymerizable unsaturated monomer to the polymerization system containing the first polymerizable unsaturated monomer during the polymerization of the polymerization system while the monomers are polymerized.

The thermoplastic addition polymer included in the hot-melt resin composition according to the fifth embodiment can be allowed to have more various performance by combining copolymer segments having three or more different compositions.

The thermoplastic addition polymer included in the hot-melt resin composition according to the fifth embodiment, for example, can be produced by the process for producing the thermoplastic addition polymer included in the hot-melt resin composition according to the seventh embodiment. The thermoplastic addition polymer included in the hot-melt resin composition according to the fifth embodiment and produced by this process contains a sulfur atom in a range of 0.005 to 4% by weight. In the case where the amount of the sulfur atom is smaller than this range, the number-average molecular weight of the thermoplastic addition polymer may be too high or the thermoplastic addition polymer having the intended structure may not be obtained. On the other hand, in the case where the amount is larger than the above-mentioned range, properties due to the composition of copolymer segments may not be displayed, because the number-average molecular weight of the thermoplastic addition polymer may be too low. If it is considered that the number-average molecular weight of the intended thermoplastic addition polymer is in a range of 10,000 to 200,000, the amount of the sulfur atom is preferably in a range of 0.01 to 2% by weight. In addition, if it is considered that the number-average molecular weight of the intended thermoplastic addition polymer is preferably in a range of 30,000 to 150,000, the amount of the sulfur atom is more preferably in a range of 0.02 to 1% by weight.

(Hot-melt resin composition according to the sixth embodiment)

The hot-melt resin composition, according to the sixth embodiment of the present invention, includes a thermoplastic addition polymer which includes two or more kinds of different polymerizable unsaturated monomer units and has a number-average molecular weight of 10,000 to 200,000, only one glass transition temperature peak with a width of 50° C. or more, and a parallel-rays transmittance of 85% or more. The thermoplastic addition polymer has: a lower viscosity than linear-chain polymers having the same molecular weight; intermolecular complicated tangles at a temperature in use; larger cohesion than linear-chain polymers, graft polymers, block polymers, and the like; and the transparency; because the thermoplastic addition polymer has a branched structure.

The thermoplastic addition polymer included in the hot-melt resin composition according to the sixth embodiment is defined by limiting the aforementioned thermoplastic addition polymer included in the hot-melt resin composition according to the fifth embodiment, with its values of properties.

The thermoplastic addition polymer included in the hot-melt resin composition according to the sixth embodiment preferably has a glass transition temperature peak with a width of 80° C. or more.

The thermoplastic addition polymer included in the hot-melt resin composition according to the sixth embodiment preferably has a number-average molecular weight of 30,000 to 150,000, only one glass transition temperature peak with a width of 80° C. or more, and a parallel-rays transmittance of 90% or more. An example of such a thermoplastic addition polymer is the aforementioned thermoplastic addition polymer included in the hot-melt resin composition according to the fifth embodiment.

Examples of the two or more kinds of different polymerizable unsaturated monomer units of the thermoplastic addition polymer included in the hot-melt resin composition according to the sixth embodiment are the first and second monomer units as mentioned in the explanation of the hot-melt resin composition according to the fifth embodiment.

In the case where the number-average molecular weight of the thermoplastic addition polymer is smaller than the above-mentioned range, properties due to the composition of the monomer units constituting the polymer are difficult to display. On the other hand, in the case where the number-average molecular weight is larger than the above-mentioned range, the polymer is difficult to handle, because its viscosity is high.

The thermoplastic addition polymer has only one glass transition temperature peak with a width of 50° C. or more, preferably 80° C. or more. In the case where the width of the glass transition temperature peak is less than the above-mentioned range, the balance between the heat resistance and the toughness of the polymer is not good. The glass transition temperature peak width of 80° C. or more is preferable to that of 50° C. or more with respect to the balance between the heat resistance and the toughness. The glass transition temperature peak width is herein defined as a peak width measured using a differential scanning calorimeter (DSC).

The thermoplastic addition polymer has a parallel-rays transmittance of 85% or more. The parallel-rays transmittance less than this range shows that the degree of the phase separation is great. The parallel-rays transmittance of 90% or more is preferable to that of 85% or more for the use which demands the transparency. The parallel-rays transmittance is defined as a visible-rays transmittance which is measured using a turbidimeter in a direction of the thickness of a 3-mm-thick plain plate obtained by injection-molding the thermoplastic addition polymer.

The thermoplastic addition polymer included in the hot-melt resin composition according to the sixth embodiment, for example, can be produced by the process for producing the thermoplastic addition polymer included in the hot-melt resin composition according to the seventh embodiment. The thermoplastic addition polymer included in the hot-melt resin composition according to the sixth embodiment and produced by this process contains a sulfur atom in a range of 0.005 to 4% by weight. In the case where the amount of the sulfur atom is smaller than this range, the number-average molecular weight of the thermoplastic addition polymer may be too high or the thermoplastic addition polymer having the intended structure may not be obtained. On the other hand, in the case where the amount is larger than the above-mentioned range, properties due to the composition of copolymer segments may be difficult to display, because the number-average molecular weight of the thermoplastic addition polymer may be too low. If it is considered that the number-average molecular weight of the intended thermoplastic addition polymer is in a range of 10,000 to 200,000, the amount of the sulfur atom is preferably in a range of 0.01 to 2% by weight. In addition, if it is considered that the number-average molecular weight of the intended thermoplastic addition polymer is preferably in a range of 30,000 to 150,000, the amount of the sulfur atom is more preferably in a range of 0.02 to 1% by weight.

(Hot-melt resin composition according to the seventh embodiment)

The hot-melt resin composition, according to the seventh embodiment of the present invention, includes a thermoplastic addition polymer which is obtainable by a production process including a preparation step, an adding step, and a polymerization step. The preparation step includes a step of preparing a mixture including a first polymerizable unsaturated monomer and a polyvalent mercaptan. The adding step includes a step of gradually adding a second polymerizable unsaturated monomer to the mixture obtained by the preparation step, wherein the second polymerizable unsaturated monomer has a composition different from that of the first polymerizable unsaturated monomer. The polymerization step includes a step of carrying out radical polymerization of a mixture of the first polymerizable unsaturated monomer and the added second polymerizable unsaturated monomer during the adding step, the radical polymerization being initiated with a mercapto group of the polyvalent mercaptan. The thermoplastic addition polymer has: a lower viscosity than linear-chain polymers having the same molecular weight; intermolecular complicated tangles at a temperature in use; and larger cohesion than linear-chain polymers, graft polymers, block polymers, and the like; because the thermoplastic addition polymer has a branched structure.

As to the hot-melt resin composition according to the seventh embodiment, if the production process for the thermoplastic addition polymer further includes a prepolymerization step of carrying out radical polymerization of the first polymerizable unsaturated monomer in between the preparation step and the adding step, the radical polymerization being initiated with a mercapto group of the polyvalent mercaptan, there is also an advantage in that the thermoplastic addition polymer is transparent.

The preparation step includes a step of preparing a mixture including a first polymerizable unsaturated monomer and a polyvalent mercaptan, and its example is the preparation step as explained for the hot-melt resin composition according to the second embodiment. The mixture including a first polymerizable unsaturated monomer and a polyvalent mercaptan may further include a medium in which the monomer and the mercaptan are dissolved and/or dispersed. Any medium can be used so long as it can dissolve the monomer and the resultant polymer. The amount of the medium is, for example, in a range of 0 to 200% by weight, preferably 0 to 100% by weight, based on the total of the first and second polymerizable unsaturated monomers. The amount larger than the above-mentioned range is industrially unfavorable, because the polymerization rate is slow or the cost as calculated in terms of the solid content is high.

The adding step includes a step of gradually adding a second polymerizable unsaturated monomer to the mixture obtained by the preparation step, wherein the second polymerizable unsaturated monomer has a composition different from that of the first polymerizable unsaturated monomer, and an example of this adding step is the same adding step as explained for the hot-melt resin composition according to the second embodiment except that the second polymerizable unsaturated monomer is gradually added.

The second polymerizable unsaturated monomer may gradually be added, for example, dropwise. The adding rate may be either constant or variable, but the rate is preferably constant.

The polymerization step includes a step of carrying out radical polymerization of a mixture of the first polymerizable unsaturated monomer and the added second polymerizable unsaturated monomer during the adding step, the radical polymerization being initiated with a mercapto group of the polyvalent mercaptan.

The radical polymerization of the mixture of the first and second polymerizable unsaturated monomers is carried out during the adding step, the radical polymerization being initiated with a mercapto group of the polyvalent mercaptan. This radical polymerization gives a product in which an end of a copolymer segment having a composition corresponding to a monomer composition of the polymerization system during the reaction is bonded to a sulfur residue of one or more mercapto groups in each molecule of the polyvalent mercaptan. As the second polymerizable unsaturated monomer is added, the monomer composition of the polymerization system varies, thus the composition of the copolymer segments continuously varies. In order to efficiently bond an end of the copolymer segment to the sulfur residue, it is preferable not to add to the polymerization system a polymerization initiator more than is needed, similarly to the hot-melt resin composition according to the second embodiment.

The radical polymerization may be carried out by any addition-polymerization method such as bulk polymerization, solution polymerization, suspension polymerization, and emulsion polymerization, which are conventional radical polymerization methods.

The polymerization temperature is preferably in a range of 30° to 200° C., and more preferably in a range of 100° to 150° C. where the polymerization can stably be carried out without a polymerization initiator.

It is preferable that the polymerization conversion of the first polymerizable unsaturated monomer at the initiation of adding the second polymerizable unsaturated monomer and the timing for adding the second polymerizable unsaturated monomer are appropriately varied dependently upon the composition of copolymer segments of the intended thermoplastic addition polymer. For example, if a copolymer segment deriving from the first polymerizable unsaturated monomer is needed, the adding of the second polymerizable unsaturated monomer is preferably initiated when the polymerization conversion of the first polymerizable unsaturated monomer is high. Or if a copolymer segment deriving from the first polymerizable unsaturated monomer is not very much needed, the adding of the second polymerizable unsaturated monomer is preferably initiated at the same time as the initiation of polymerization. Or if a copolymer segment deriving from the second polymerizable unsaturated monomer is needed, the second polymerizable unsaturated monomer is preferably added at a rate slower than the polymerization rate. Or if a copolymer segment deriving from the second polymerizable unsaturated monomer is not needed, the second polymerizable unsaturated monomer is preferably added at a rate faster than the polymerization rate.

As to the hot-melt resin composition according to the seventh embodiment, radical polymerization of only the first polymerizable unsaturated monomer may be carried out as the prepolymerization step in between the preparation step and the adding step, the radical polymerization being initiated with a mercapto group of the polyvalent mercaptan. This radical polymerization gives a product in which an end of a copolymer segment having one composition is bonded to a sulfur residue of one or more mercapto groups in each molecule of the polyvalent mercaptan.

As to the hot-melt resin composition according to the seventh embodiment, while the radical polymerization of the first polymerizable unsaturated monomer is carried out or not carried out in the presence of the polyvalent mercaptan, and after the polymerization conversion reaches 0 to 50%, preferably 10 to 30%, the second polymerizable unsaturated monomer is gradually added.

In the case where the second polymerizable unsaturated monomer is added after the polymerization conversion has exceeded the aforementioned range, a thermoplastic addition polymer which easily causes the phase separation which makes the polymer opaque may be formed, because the proportion of copolymer segments produced from the first polymerizable unsaturated monomer becomes too high. In the case where a copolymer segment corresponding to the first polymerizable unsaturated monomer is needed, it is unfavorable that the second polymerizable unsaturated monomer is added before the polymerization conversion reaches the aforementioned range, because almost no copolymer segment corresponding to the first polymerizable unsaturated monomer may be formed.

After the adding of the second polymerizable unsaturated monomer has finished, radical polymerization for ageing may be carried out, if necessary.

As to the seventh embodiment, the composition of monomers in the polymerization system gradually varies as the second polymerizable unsaturated monomer is gradually added. Thereby, the composition of the resultant copolymer segments also gradually varies, thus a thermoplastic addition polymer having many compositions which are different from each other by degrees (gradient compositions) is obtained. In addition, the radical polymerization is initiated with a mercapto group of the polyvalent mercaptan, thus producing a thermoplastic addition polymer in which a mercapto group valence number of copolymer segments having optional compositions are bonded to the polyvalent mercaptan segment.

As to the seventh embodiment, even if a polymer which is formable from the first polymerizable unsaturated monomer and a polymer which is formable from the second polymerizable unsaturated monomer are not compatible with each other, the thermoplastic addition polymer having a parallel-rays transmittance of, for example, 85% or more, preferably 90% or more, can be obtained. Herein, that polymers are not compatible with each other means that a mixture of polymers are separated into respective phases of the polymers, for example, a sea-island structure is formed.

By the production process relating to the seventh embodiment, the thermoplastic addition polymer having a parallel-rays transmittance of, for example, 85% or more, preferably 90% or more, is obtained. In addition, by the production process relating to the seventh embodiment, the respective thermoplastic addition polymers included in the hot-melt resin compositions according to the fifth and sixth embodiment are obtained.

(Hot-melt resin composition according to the eighth embodiment)

The hot-melt resin composition, according to the eighth embodiment of the present invention, includes a thermoplastic addition polymer including a collective of macromolecules having a polyvalent mercaptan segment and two or more copolymer segments, wherein the two or more copolymer segments include polymerizable unsaturated monomer units including a carboxyl group-containing polymerizable unsaturated monomer unit and a (meth)acrylic acid ester monomer unit, are radially extended from the polyvalent mercaptan segment, and have compositions which continuously vary over the entire collective of macromolecules. The thermoplastic addition polymer has: a lower viscosity than linear-chain polymers having the same molecular weight; intermolecular complicated tangles at a temperature in use; larger cohesion than linear-chain polymers, graft polymers, block polymers, and the like; the resistance to heat and weather; and the transparency; because the thermoplastic addition polymer has a branched structure.

The features of the hot-melt resin composition according to the eighth embodiment are the same as those of the hot-melt resin composition according to the fifth embodiment, except that the two or more copolymer segments include polymerizable unsaturated monomer units including the carboxyl group-containing polymerizable unsaturated monomer unit and the (meth)acrylic acid ester monomer unit.

The carboxyl group-containing polymerizable unsaturated monomer unit, the (meth)acrylic acid ester monomer unit, and the unit of another polymerizable unsaturated monomer which is copolymerizable are such as explained for the hot-melt resin composition according to the third embodiment.

The thermoplastic addition polymer included in the hot-melt resin composition according to the eighth embodiment, for example, can be produced by the process for producing the thermoplastic addition polymer included in the hot-melt resin composition according to the tenth embodiment.

(Hot-melt resin composition according to the ninth embodiment)

The hot-melt resin composition, according to the ninth embodiment of the present invention, includes a thermoplastic addition polymer, wherein the thermoplastic addition polymer includes a carboxyl group-containing polymerizable unsaturated monomer unit and a (meth)acrylic acid ester monomer unit and has a number-average molecular weight of 10,000 to 200,000, only one glass transition temperature peak with a width of 50° C. or more, and a parallel-rays transmittance of 85% or more. The thermoplastic addition polymer has: a lower viscosity than linear-chain polymers having the same molecular weight; intermolecular complicated tangles at a temperature in use; larger cohesion than linear-chain polymers, graft polymers, block polymers, and the like; the resistance to heat and weather; and the transparency; because the thermoplastic addition polymer has a branched structure.

The features of the hot-melt resin composition according to the ninth embodiment are the same as those of the hot-melt resin composition according to the sixth embodiment, except that the thermoplastic addition polymer includes polymerizable unsaturated monomer units including the carboxyl group-containing polymerizable unsaturated monomer unit and the (meth)acrylic acid ester monomer unit.

The carboxyl group-containing polymerizable unsaturated monomer unit, the (meth)acrylic acid ester monomer unit, and the unit of another polymerizable unsaturated monomer which is copolymerizable are such as explained for the hot-melt resin composition according to the third embodiment.

The thermoplastic addition polymer included in the hot-melt resin composition according to the ninth embodiment, for example, can be produced by the process for producing the thermoplastic addition polymer included in the hot-melt resin composition according to the tenth embodiment.

(Hot-melt resin composition according to the tenth embodiment)

The hot-melt resin composition, according to the tenth embodiment of the present invention, includes a thermoplastic addition polymer which is obtainable by a production process including a preparation step, an adding step, and a polymerization step. The preparation step includes a step of preparing a mixture including a first polymerizable unsaturated monomer and a polyvalent mercaptan, wherein the first polymerizable unsaturated monomer includes a carboxyl group-containing polymerizable unsaturated monomer and a (meth)acrylic acid ester monomer. The adding step includes a step of gradually adding a second polymerizable unsaturated monomer to the mixture obtained by the preparation step, wherein the second polymerizable unsaturated monomer includes a carboxyl group-containing polymerizable unsaturated monomer and a (meth)acrylic acid ester monomer and has a composition different from that of the first polymerizable unsaturated monomer. The polymerization step includes a step of carrying out radical polymerization of a mixture of the first polymerizable unsaturated monomer and the second polymerizable unsaturated monomer during the adding step, the radical polymerization being initiated with a mercapto group of the polyvalent mercaptan. The thermoplastic addition polymer has: a lower viscosity than linear-chain polymers having the same molecular weight; intermolecular complicated tangles at a temperature in use; larger cohesion than linear-chain polymers, graft polymers, block polymers, and the like; and the resistance to heat and weather; because the thermoplastic addition polymer has a branched structure.

The features of the hot-melt resin composition according to the tenth embodiment are the same as those of the hot-melt resin composition according to the seventh embodiment, except that each of the first and second polymerizable unsaturated monomers includes the carboxyl group-containing polymerizable unsaturated monomer and the (meth)acrylic acid ester monomer.

The carboxyl group-containing polymerizable unsaturated monomer, the (meth)acrylic acid ester monomer, and another polymerizable unsaturated monomer which is copolymerizable are such as explained for the hot-melt resin composition according to the fourth embodiment.

(Hot-melt resin composition according to the eleventh embodiment)

The hot-melt resin composition, according to the eleventh embodiment of the present invention, includes a thermoplastic addition polymer of a branched structure which has two or more (meth)acrylic polymer segments including a carboxyl group-containing polymerizable unsaturated monomer unit and a (meth)acrylic acid ester monomer unit. The thermoplastic addition polymer has: a lower viscosity than linear-chain polymers having the same molecular weight; intermolecular complicated tangles at a temperature in use; larger cohesion than linear-chain polymers; and the resistance to heat and weather.

As to the eleventh embodiment, if the thermoplastic addition polymer further has a polyvalent mercaptan segment and if the (meth) acrylic polymer segments are radially extended from the polyvalent mercaptan segment, the viscosity is lower and the cohesion is greater. The (meth)acrylic polymer segments includes the carboxyl group-containing polymerizable unsaturated monomer unit and the (meth) acrylic acid ester monomer unit as constituents, and as needed the (meth)acrylic polymer segments may further include a unit of another polymerizable unsaturated monomer which is copolymerizable.

The carboxyl group-containing polymerizable unsaturated monomer unit, the (meth)acrylic acid ester monomer unit, and the unit of another polymerizable unsaturated monomer which is copolymerizable are such as explained for the hot-melt resin composition according to the third embodiment.

The number-average molecular weight of the thermoplastic addition polymer having a branched structure is, for example, the same as that of the thermoplastic addition polymer which is explained for the hot-melt resin composition according to the first embodiment.

The branched structure of the thermoplastic addition polymer has a principal chain framework formed from the radical polymerization of carbon-carbon double bonds and further has as a side chain a polymer which includes the carboxyl group-containing polymerizable unsaturated monomer unit and the (meth)acrylic acid ester monomer unit as constituents.

The thermoplastic addition polymer may further have a polyvalent mercaptan segment and the two or more (meth) acrylic polymer segments may be radially extended from the polyvalent mercaptan segment, The respective meanings of "radially extended" and "polyvalent mercaptan segment" are such as explained with regard to the hot-melt resin composition according to the first embodiment.

The thermoplastic addition polymer included in the hot-melt resin composition according to the eleventh embodiment, for example, can be produced by a process including carrying out radical polymerization of what is called a macromonomer in which a polymerizable unsaturated group is bonded to an end of a polymer including the carboxyl group-containing polymerizable unsaturated monomer and the (meth)acrylic acid ester monomer as constituents If the thermoplastic addition polymer relating to the eleventh embodiment further has a polyvalent mercaptan segment and if the two or more (meth)acrylic polymer segments are radially extended from the polyvalent mercaptan segment, the thermoplastic addition polymer can, for example, be produced by the process for producing the thermoplastic addition polymer included in the hot-melt resin composition according to the twelfth embodiment.

(Hot-melt resin composition according to the twelfth embodiment)

The hot-melt resin composition, according to the twelfth embodiment of the present invention, includes a thermoplastic addition polymer which has a branched structure and is obtainable by a production process including a preparation step and a polymerization step. The preparation step includes a step of preparing a mixture including a polymerizable unsaturated monomer and a polyvalent mercaptan, wherein the polymerizable unsaturated monomer includes a carboxyl group-containing polymerizable unsaturated monomer and a (meth) acrylic acid ester monomer. The polymerization step includes a step of carrying out radical polymerization of the polymerizable unsaturated monomer, the radical polymerization being initiated with a mercapto group of the polyvalent mercaptan. The thermoplastic addition polymer has: a lower viscosity than linear-chain polymers having the same molecular weight; intermolecular complicated tangles at a temperature in use; larger cohesion than linear-chain polymers; and the resistance to heat and weather.

The features of twelfth embodiment are such as explained for the hot-melt resin composition according to the tenth embodiment, except that the adding step is not carried out, but that the radical polymerization of the polymerizable unsaturated monomer included in the mixture obtained by the preparation step is carried out in the polymerization step.

In the polymerization step, the mixture obtained by the preparation step is added to the polymerization system at once or gradually, thus carrying out the radical polymerization. The meaning of "added gradually" is such as explained for the hot-melt resin composition according to the seventh embodiment. The polymerization is preferably bulk polymerization or solution polymerization. The polymerization temperature is, for example, in a range of 20° to 180° C., and more preferably in a range of 10° to 150° C. The polymerization initiator is most preferably not used at all. Even if the polymerization initiator is used, its amount is $\frac{1}{3}$ or less, preferably $\frac{1}{10}$ or less, of the weight of the polyvalent mercaptan. In the case where the amount of the polymerization initiator is larger than the above-mentioned range, the thermoplastic addition polymer having a branched structure may not be obtained, because a large amount of linear-chain polymers may be formed as by-products.

The carboxyl group-containing polymerizable unsaturated monomer, the (meth)acrylic acid ester monomer, and another polymerizable unsaturated monomer which is copolymerizable are the same as the first polymerizable unsaturated monomer as explained for the hot-melt resin composition according to the fourth embodiment.

(Hot-melt resin composition according to the thirteenth embodiment)

The hot-melt resin composition, according to the thirteenth embodiment of the present invention, has the same features as of any one of the hot-melt resin compositions according to the first to twelfth embodiments of the present invention, but further includes a metal ion source. The viscosity becomes lower and the cohesion becomes greater, because the block polymer or the thermoplastic addition polymer is crosslinked by a metal ion.

The metal ion source is, for example, included in the hot-melt resin composition by mixing the metal ion source with the reaction mixture including the block polymer or thermoplastic addition polymer obtained by the polymerization. The mixing can be carried out using direct heating and mixing apparatuses such as twin-screw extruders, kneaders, and heating rollers. The hot-melt resin composition may be obtained by mixing the metal ion source before or after the reaction mixture is devolatilized.

Examples of the metal ion source are oxides, hydroxides, alcoholates, and organic carboxylic acid salts of metals such as sodium, potassium, lithium, magnesium, calcium, and zinc, from which at least one compound may be selected. In order to keep the viscosity low during the hot-melt working, the metal ion is preferably added in a ratio of 0.1 to 0.9 equivalents, more preferably 0.2 to 0.6 equivalents, to the carboxyl group of the block polymer or thermoplastic addition polymer. In the case where the amount of the metal ion is smaller than the above-mentioned range, the heat resistance during use is poor, and on the other hand, in the case where the amount of the metal ion is larger than the above-mentioned range, the viscosity during the hot-melt working is high, thus the balance of the performance of the hot-melt resin composition is difficult to keep.

If the hot-melt resin composition further includes the metal ion source, the composition may still further include a phosphoric acid ester. If the composition further includes the phosphoric acid ester, the bonding force between the carboxyl group and the metal ion is weakened, because the phosphoric acid ester is coordinated to the metal ion, thus the hot-melt workability of the hot-melt resin composition is improved.

The phosphoric acid ester is, for example, included in the hot-melt resin composition by mixing the phosphoric acid ester with the reaction mixture including the block polymer or thermoplastic addition polymer obtained by the polymerization. The hot-melt resin composition may be obtained by mixing the phosphoric acid ester before or after the reaction mixture is devolatilized.

The phosphoric acid ester is, for example, at least one compound selected from the group consisting of mono-, di-, and triesters of alkyl groups with 1 to 18 carbon atoms, or preferably 4 to 8 carbon atoms. The amount of the phosphoric acid ester is, for example, in a range of 0.1 to 100 parts by weight, preferably 1 to 50 parts by weight, per 100 parts by weight of the block polymer or the thermoplastic addition polymer. In the case where the amount of the phosphoric acid ester is smaller than the above-mentioned range, the hot-melt workability of the hot-melt resin composition may not be improved, and on the other hand, in the case where the amount of the phosphoric acid ester is larger than the above-mentioned range, the heat resistance may be insufficient.

(Hot-melt resin composition according to the fourteenth embodiment)

The hot-melt resin composition, according to the fourteenth embodiment of the present invention, includes a (meth)acrylic thermoplastic addition polymer, a metal ion source, and a phosphoric acid ester, wherein the (meth)acrylic thermoplastic addition polymer includes a carboxyl group-containing polymerizable unsaturated monomer unit and a (meth)acrylic acid ester monomer unit. The viscosity is lower and the cohesion is greater, because the thermoplastic addition polymer is crosslinked by a metal ion, and in addition, the bonding force between the carboxyl group and the metal ion is weakened, because the phosphoric acid ester is coordinated to the metal ion, thus the hot-melt workability of the hot-melt resin composition is improved.

The (meth)acrylic thermoplastic addition polymer includes the carboxyl group-containing polymerizable unsaturated monomer unit and the (meth)acrylic acid ester monomer unit as constituents, and as needed, may further include a unit of another polymerizable unsaturated monomer which is copolymerizable.

The number-average molecular weight of the (meth) acrylic thermoplastic addition polymer is the same as that of the thermoplastic addition polymer as explained for the hot-melt resin composition according to the first embodiment.

The carboxyl group-containing polymerizable unsaturated monomer unit, the (meth)acrylic acid ester monomer unit, and the unit of another polymerizable unsaturated monomer which is copolymerizable are the same as explained for the hot-melt resin composition according to the third embodiment.

The (meth)acrylic thermoplastic addition polymer is, for example, produced by a process including carrying out the radical polymerization of the first or second polymerizable unsaturated monomer, as explained for the hot-melt resin composition according to the fourth embodiment, in the presence of a polymerization initiator without a polyvalent mercaptan. The type of the polymerization initiator is, for example, such as explained for the hot-melt resin composition according to the second embodiment. The amount of the polymerization initiator is not especially limited. The polymerization temperature is such as explained for the hot-melt resin composition according to the second embodiment. Examples of the method for the polymerization are solution polymerization, bulk polymerization, emulsion polymerization, suspension polymerization, and the like.

The metal ion source and the phosphoric acid ester are such as explained for the hot-melt resin composition according to the thirteenth embodiment.

(Hot-melt resin composition according to the fifteenth embodiment)

The hot-melt resin composition, according to the fifteenth embodiment of the present invention, has the same features as of any one of the hot-melt resin compositions according to the first to fourteenth embodiments of the present invention, but further includes a tackifier resin. The inclusion of the tackifier resin makes the viscosity lower and the cohesion higher.

Examples of the tackifier resin are rosin resin, terpene resin, aliphatic petroleum resin, aromatic petroleum resin, coumarone-indene resin, alkylphenol resin, xylene resin, and the like, from which at least one may be selected. The tackifier resin serves to reduce the viscosity during the hot-melt operation and to improve the cohesion during the use. The amount of the tackifier resin used is, for example, in a range of 1 to 200 parts by weight, preferably 10 to 100 parts by weight, per 100 parts by weight of any one of the hot-melt resin compositions according to the first to fourteenth embodiments. In the case where the amount of the tackifier resin is smaller than the above-mentioned range, the viscosity may not be reduced or the cohesion may not be improved. On the other hand, in the case where the amount of the tackifier resin is larger than the above-mentioned range, the tack may be poor when the hot-melt resin composition is used as a pressure sensitive adhesive.

The tackifier resin, for example, can be included in the hot-melt resin composition by mixing the tackifier resin with the reaction mixture including the block polymer or thermoplastic addition polymer obtained by the polymerization. The hot-melt resin composition may be obtained by mixing the tackifier resin before or after the reaction mixture is devolatilized.

(Hot-melt resin composition according to the sixteenth embodiment)

The hot-melt resin composition, according to the sixteenth embodiment of the present invention, has the same features as of any one of the hot-melt resin compositions according to the first to fifteenth embodiments of the present invention, but further includes wax. The inclusion of wax makes the viscosity of the hot-melt resin composition lower.

Examples of the wax are natural wax, paraffin wax, polypropylene wax, polyethylene wax, polymers of (meth) acrylates having saturated alkyl groups with 18 or more carbon atoms, and the like, from which at least one may be selected. The wax is effective for reducing the viscosity during the hot-melt operation. The amount of the wax used is, for example, in a range of 1 to 100 parts by weight, preferably 10 to 50 parts by weight, per 100 parts by weight of any one of the hot-melt resin compositions according to the first to fifteenth embodiments. In the case where the amount of the wax is smaller than the above-mentioned range, the viscosity may not be reduced. On the other hand, in the case where the amount of the wax is larger than the above-mentioned range, the adhesion or the pressure sensitive adhesion tends to be reduced.

The wax, for example, can be included in the hot-melt resin composition by mixing the wax with the reaction mixture including the block polymer or thermoplastic addition polymer obtained by the polymerization. The hot-melt resin composition may be obtained by mixing the wax before or after the reaction mixture is devolatilized.

(Hot-melt resin compositions according to the first to sixteenth embodiments)

The hot-melt resin compositions according to the first to sixteenth embodiments may further include another additive, if necessary. The additive is, for example, at least one compound selected from the group consisting of: compounds which can be used as plasticizers for polymers of (meth)acrylic acid esters such as phthalic acid esters and adipic acid esters; fillers such as silica powder and titanium oxide; and antioxidants such as dithiocarbamic acid salts and phenol compounds. The amount of these additives is, for example, that used for conventional hot-melt resin compositions.

The additive, for example, can be included in the hot-melt resin composition by mixing the additive with the reaction mixture including the block polymer or thermoplastic addition polymer obtained by the polymerization. The hot-melt resin composition may be obtained by mixing the additive before or after the reaction mixture is devolatilized.

(Pressure sensitive adhesive composition)

The pressure sensitive adhesive composition of the present invention is a pressure sensitive adhesive composition for producing a pressure sensitive adhesive for soft vinyl chloride, the pressure sensitive adhesive being applicable to a soft polyvinyl chloride molding, and includes an acrylic block polymer and an organic solvent.

The organic solvent is included in the pressure sensitive adhesive composition under conditions where the acrylic block polymer is dissolved and/or dispersed in the organic solvent.

The acrylic block polymer is a polymer obtainable by a production process including a preparation step, a first polymerization step, an adding step, and a second polymerization step. The production process for the acrylic block polymer is the same as the process of the present invention for producing a block polymer, except that a monomer which is formable into a high glass transition temperature type polymer having a glass transition temperature of 273 K. or higher is used as the first polymerizable unsaturated monomer, and that a monomer mixture, which is formable into a polymer having no compatibility with the high glass transition temperature type polymer and includes an alkyl (meth) acrylate monomer, is used as the second polymerizable unsaturated monomer.

The first polymerizable unsaturated monomer is at least one monomer which is formable into at least one high glass transition temperature type polymer selected from the group consisting of homopolymers and copolymers having a glass transition temperature of 273 K. or higher, preferably 300 K. or higher. In the case where the glass transition temperature of the high glass transition temperature type polymer is lower than the above-mentioned range, the resultant pressure sensitive adhesive does not have sufficient cohesion, and the cohesion is greatly reduced because of transfer of a plasticizer to the pressure sensitive adhesive. The first polymerizable unsaturated monomer, for example, includes 40 to 100% by weight, preferably 60 to 100% by weight, of at least one selected from the group consisting of styrene, vinyl acetate, acrylonitrile, methacrylonitrile and methyl methacrylate and the balance of at least one selected from the group consisting of the later-mentioned, alkyl (meth) acrylate monomers, reactive functional group-containing polymerizable unsaturated monomers, and other polymerizable unsaturated monomers which are copolymerizable.

The monomer mixture to be added in the adding step is formable into a polymer having no compatibility with the high glass transition temperature type polymer and includes an alkyl (meth)acrylate monomer. The high glass transition temperature type polymer and the polymer which is formable from the monomer mixture including an alkyl (meth) acrylate monomer are not compatible with each other. The meaning of "polymers are not compatible with each other" herein is that when the dynamic elasticoviscosities of the polymers are measured, two curve peaks of a tangent loss (tan δ; a ratio of a loss elasticity modulus G" to a storage elasticity modulus G': tan δ=G"/G') appears. That is to say, a peak due to the polymer which is formable from the monomer mixture including an alkyl (meth)acrylate monomer appears on the lower temperature side, and a peak due to the high glass transition temperature type polymer having a glass transition temperature of 273 K. or higher appears on the higher temperature side. On the other hand, the meaning of "polymers are compatible with each other" is that the curve peak of the tangent loss does not separate into two, but is unified.

The monomer mixture used in the adding step may further include a reactive functional group-containing polymerizable unsaturated monomer, if necessary. Whether the monomer mixture further includes the reactive functional group-containing polymerizable unsaturated monomer or not, the monomer mixture can further include another polymerizable unsaturated monomer which is copolymerizable with the monomers.

The alkyl (meth)acrylate monomer is not especially limited if it is an alkyl (meth)acrylate conventionally used for pressure sensitive adhesives. However, its example is at least one which has an alkyl group with 4 to 18 carbon atoms and is selected from the group consisting of butyl (meth) acrylate, isobutyl (meth)acrylate, cyclohexyl (meth)acrylate, 2-ethylhexyl (meth)acrylate, n-octyl (meth)acrylate, isooctyl (meth)acrylate, lauryl (meth)acrylate, and stearyl (meth) acrylate.

The amount of the alkyl (meth)acrylate monomer used for producing the acrylic block polymer is, for example, in a range of 68 to 99.89% by weight based on the total of the monomer mixture which is used. In the case where the amount deviates from this range, the softness and tack as a pressure sensitive adhesive may not be obtained.

The monomer mixture used for producing the acrylic block polymer may further include a reactive functional group-containing polymerizable unsaturated monomer, if necessary. The reactive functional group-containing polymerizable unsaturated monomer is, for example, at least one selected from the group consisting of carboxyl group-containing polymerizable unsaturated monomers and hydroxyl group-containing polymerizable unsaturated monomers.

The carboxyl group-containing polymerizable unsaturated monomer is not especially limited so long as it is a polymerizable unsaturated monomer which has a carboxyl group. Such a monomer is, for example, at least one selected from the group consisting of unsaturated carboxylic acids such as acrylic acid, methacrylic acid, itaconic acid, crotonic acid, maleic anhydride, and maleic acid. In the case where the carboxyl group-containing polymerizable unsaturated monomer is used for producing the acrylic block polymer, the amount of the carboxyl group-containing polymerizable unsaturated monomer is, for example, in a range of 0.1 to 10% by weight, preferably 2 to 8% by weight, based on the total of the monomer mixture which is used. In the case where the amount of the carboxyl group-containing polymerizable unsaturated monomer is smaller than 0.1% by weight, the cohesion of the pressure sensitive adhesive may be poor. On the other hand, in the case where the amount is larger than 10% by weight, the pressure sensitive adhesion may be reduced, because the cohesion may be too high.

The hydroxyl group-containing polymerizable unsaturated monomer is not especially limited so long as it is a polymerizable unsaturated monomer which has a hydroxyl group. Such a monomer is, for example, at least one selected from the group consisting of hydroxyl group-containing polymerizable monomers such as 2-hydroxyethyl (meth) acrylate, 2-hydroxypropyl (meth)acrylate, and polycaprolactone-modified 2-hydroxyethyl (meth)acrylate (trade name: PLACCEL F, made by Daisel Chemical Industries, Ltd.). In the case where the hydroxyl group-containing polymerizable unsaturated monomer is used for producing the acrylic block polymer, the amount of the hydroxyl group-containing polymerizable unsaturated monomer is, for example, in a range of 0.01 to 2% by weight, preferably 0.1 to 1% by weight, based on the total of the monomer mixture which is used. In the case where the amount of the hydroxyl group-containing polymerizable unsaturated monomer is smaller than 0.01% by weight, the crosslinking density may not be sufficient, because the number of the crosslinking sites may be insufficient, thus the cohesion may be poor. On the other hand, in the case where the amount is larger than 2% by weight, the pressure sensitive adhesion may be poor, because the crosslinking density may be high, or because the cohesion may be too high.

The monomer mixture used for producing the acrylic block polymer includes the alkyl (meth)acrylate monomer as a constituent, and whether the monomer mixture further includes the reactive functional group-containing polymerizable unsaturated monomer or not, the monomer mixture can further include another polymerizable unsaturated monomer which is copolymerizable with these monomers.

The above-mentioned other polymerizable unsaturated monomer which is copolymerizable is not especially limited, but its example is at least one selected from the group consisting of: aromatic polymerizable unsaturated monomers such as styrene and α-methylstyrene; vinyl esters such as vinyl acetate and vinyl propionate; N-group-containing polymerizable unsaturated monomers such as N-vinylpyrrolidone and acryloylmorpholine; α,β-unsaturated nitriles such as (meth) acrylonitrile; and unsaturated amides such as (meth)acrylamide and N-methylolacrylamide. The amount of the other polymerizable unsaturated monomer which is copolymerizable and used for producing the acrylic block polymer is, for example, in a range of 0 to 20% by weight, based on the total of the monomer mixture which is used, if the balance of the tack, the pressure sensitive adhesion and the cohesion is considered. In the case where the amount of the other polymerizable unsaturated monomer which is copolymerizable is larger than 20% by weight, the pressure sensitive adhesion may be low, because the resultant acrylic block polymer may be hard.

The composition of the monomer mixture used for producing the acrylic block polymer is preferably a composition from which a polymer having a Tg of 200 to 240 K. is formable, if the balance between the tack and the pressure sensitive adhesion is considered.

The amount of the monomer mixture used for producing the acrylic block polymer is, for example, in a range of 60 to 95 parts by weight, preferably 70 to 90 parts by weight, per 100 parts by weight of the total of the monomer mixture and the high glass transition temperature type polymer. In the case where the amount of the monomer mixture is larger than 95 parts by weight, in other words, in the case where the amount of the high glass transition temperature type polymer is smaller than 5 parts by weight, the cohesion may greatly be reduced because of the transfer of a plasticizer. On the other hand, in the case where the amount of the monomer mixture is smaller than 60 parts by weight, in other words, in the case where the amount of the high glass transition temperature type polymer is larger than 40 parts by weight, properties as a pressure sensitive adhesive may greatly be deteriorated.

The number-average molecular weight of the acrylic block polymer is, for example, in a range of 2,000 to 1,000,000, preferably 10,000 to 400,000, more preferably 20,000 to 200,000. In the case where the number-average molecular weight is lower than the range, the performance as a block polymer may not be displayed. On the other hand, in the case where the number-average molecular weight is higher than the range, handling may be difficult, because the viscosity may be high.

With regard to the acrylic block polymer, the two or more polymer segments which are radially extended have two or more different compositions. If the polymer segments derive from homopolymers, the differences between the compositions are obtained due to the differences between the types of monomer units constituting the polymers or between the number-average molecular weights of the polymers. On the other hand, if the polymer segments derive from copolymers, the differences between the compositions are obtained due to the differences between the types of monomer units constituting the polymers, between the number-average molecular weights of the polymers, or between ratios of the monomer units. The polymer segments usually have a number-average molecular weight in a range of 1,000 to 500,000, preferably 5,000 to 200,000, more preferably 10,000 to 100,000. In the case where the number-average molecular weight of the polymer segment is lower than the range, properties deriving from the polymer segments may not be given to the block polymer. On the other hand, the number-average molecular weight higher than the range is unfavorable with respect to the productivity, because it makes the viscosity during the production process high.

If the acrylic block polymer is used for a pressure sensitive adhesive composition or product, the combination of the polymer segments having different compositions is a combination of polymer segments deriving from polymers having different glass transition temperatures (Tg's).

The combination of the first and second polymerizable unsaturated monomers for combining the polymer segments deriving from polymers having different Tg's is, for example, such as herein exemplified for explaining the production process of the present invention for a block polymer.

The organic solvent used for the pressure sensitive adhesive composition is not especially limited so long as it is a liquid substance which can dissolve and/or disperse the acrylic block polymer. The usable organic solvent is, for example, a single solvent or a mixed solvent of two or more, as selected from the group consisting of: aromatic hydrocarbons such as toluene and xylene; esters such as ethyl acetate and butyl acetate; alicyclic hydrocarbons such as cyclohexane; ketones such as acetone and methyl ethyl ketone; and aliphatic hydrocarbons such as hexane and pentane. The amount of the organic solvent is, for example, in range of 100 to 400 parts by weight, preferably 150 to 350 parts by weight, per 100 parts by weight of the acrylic polymer. In the case where the amount of the organic solvent is smaller than the range, the composition may be difficult to coat, because its viscosity may be too high. On the other hand, in the case where the amount is larger than the range, the composition may be impossible to coat, because its viscosity may be too low.

The pressure sensitive adhesive composition of the present invention can further include a crosslinking agent if the acrylic block polymer is such as produced from the monomer mixture which further includes the reactive functional group-containing polymerizable unsaturated monomer. The crosslinking agent has at least two functional groups per molecule, the functional groups being reactive upon a reactive functional group of the acrylic block polymer. Examples of the crosslinking agent used in the present invention are polyfunctional epoxy compounds, polyfunctional melamine compounds, polyfunctional isocyanate compounds, metal-based crosslinking agents, aziridine compounds, and the like. Particularly, polyfunctional isocyanate compounds are preferable for a reaction upon a hydroxyl or carboxyl group.

The polyfunctional epoxy compound is not especially limited so long as it has two or more epoxy groups per molecule. Its example are ethylene glycol diglycidyl ether, polyethylene glycol diglycidyl ether, 1,6-hexanediol diglycidyl ether, bisphenol A-epichlorohydrin type epoxy resin, N,N,N',N'-tetraglycidyl-m-xylenediamine, 1,3-bis(N,N-diglycidylaminomethyl)cyclohexane, N,N-diglycidylaniline, N,N-diglycidyltoluidine, and the like. These compounds may be either alone or in combinations with each other.

The polyfunctional melamine compound is not especially limited so long as it has two or more of any one of a methylol group, an alkoxymethyl group and an imino group, per molecule. Its example are hexamethoxygmethylmelamine, hexaethoxymethylmelamine, hexapropoxymethylmelamine, hexabutoxymethylmelamine, hexapentyloxymethylmelamine, and the like. These compounds may be either alone or in combinations with each other.

The polyfunctional isocyanate compound is not especially limited so long as it has two or more isocyanate groups per molecule. Its example are as follows: isocyanate compounds such as tolylene diisocyanate (TDI), 4,4'-diphenylmethane diisocyanate (MDI), hexamethylene diisocyanate, xylylene diisocyanate, meta-xylylene diisocyanate, 1,5-naphthalene diisocyanate, hydrogenated diphenylmethane diisocyanate, hydrogenated tolylene diisocyanate, hydrogenated xylylene diisocyanate, and isophorone diisocyanate; buret polyisocyanate compounds such as Sumidur N (made by Sumitomo-Bayer Urethane Co., Ltd.); polyisocyanate compounds having an isocyanurate ring, such as Desmodur IL, HL (made by Bayer A. G.) and Colonate EH (made by Nippon Polyurethane Kogyo Co., Ltd.); and adduct polyisocyanate compounds such as Sumidur L (made by Sumitomo-Bayer Urethane Co., Ltd.) and Colonate L (made by Nippon Polyurethane Kogyo Co., Ltd.). These compounds may be either alone or in combinations with each other. In addition, a blocked isocyanate may also be used, which is deactivated by reacting an isocyanate group of the above-mentioned polyisocyanate compounds with a masking agent having an active hydrogen atom.

Examples of the metal-based crosslinking agent are metal chelate compounds formed by coordinating acetylacetone, methyl acetoacetate, ethyl acetoacetate, ethyl lactate, methyl salicylate, or the like to metals such as aluminum, zinc, cadmium, nickel, cobalt, copper, calcium, barium, titanium, manganese, iron, lead, zirconium, chromium, and tin. These compounds may be either alone or in combinations with each other.

Examples of the aziridine compound are N,N'-hexamethylene-1,6-bis(1-aziridinecarboxyamide), trimethylolpropane-tri- β-aziridinyl propionate, bisisophthaloyl-1-(2-methylaziridine), tri-1-aziridinylphosphone oxide, N,N'-diphenylethane-4,4'-bis(1-aziridinecarboxyamide), and the like. These compounds may be either alone or in combinations with each other.

The amount of the crosslinking agent which is used is, for example, in a range of 0.1 to 10 by weight, preferably 0.5 to 5 parts by weight, per 100 parts by weight of the acrylic block polymer. In the case where the amount of the crosslinking agent is smaller than 0.1 parts by weight, the crosslinking density may not be sufficient, because the number of the crosslinking sites may be insufficient, thus the cohesion may be poor. On the other hand, in the case where the amount is larger than 10 by weight, the pressure sensitive adhesion may be poor, because the crosslinking density may be too high.

The pressure sensitive adhesive composition of the present invention can further include a tackifier as conventionally used for pressure sensitive adhesives, if necessary. Examples of the tackifier are the following types: (polymerized) rosin, (polymerized) rosin esters, terpene, terpene phenol, coumarone, coumarone-indene, styrene resin, xylene resin, phenol resin, petroleum resin, and the like. These tackifiers may be either alone or in combinations with each other. The amount of the tackifier is, for example, in a range of 5 to 100 parts by weight, preferably 10 to 50 parts by weight, per 100 parts by weight of the acrylic block polymer. In the case where the amount of the tackifier is smaller than the above-mentioned range, the pressure sensitive adhesion to adherends may not be improved. On the other hand, in the case where the amount is larger than the above-mentioned range, the pressure sensitive adhesion may be weakened, because the tack may be reduced.

Whether the pressure sensitive adhesive composition of the present invention further includes a tackifier or not, the pressure sensitive adhesive composition can, if necessary, further include at least one additive selected from the group consisting of fillers, pigments, diluents, antioxidants, ultraviolet absorbents, and ultraviolet stabilizers, which are conventionally used for pressure sensitive adhesives.

The pressure sensitive adhesive composition of the present invention is, for example, used for producing a pressure sensitive adhesive product by the later-mentioned process.

(Pressure sensitive adhesive product)

A pressure sensitive adhesive product, according to an embodiment of the present invention, has a pressure sensitive adhesive layer for soft vinyl chloride, the pressure sensitive adhesive layer being formed using the above-mentioned pressure sensitive adhesive composition of the present invention, and is applicable to a soft polyvinyl chloride molding.

A pressure sensitive adhesive product, according to another embodiment of the present invention, has a pressure sensitive adhesive layer for soft vinyl chloride and further has a base material made of soft polyvinyl chloride, wherein the pressure sensitive adhesive layer is formed using the above-mentioned pressure sensitive adhesive composition of the present invention, and wherein the base material is attached to one or both faces of the pressure sensitive adhesive layer.

The pressure sensitive adhesive layer for soft vinyl chloride is, for example, formed as follows.

The pressure sensitive adhesive layer for soft vinyl chloride is formed by a production process including a crosslinking step of coating the pressure sensitive adhesive composition of the present invention onto an object to be coated, and drying and crosslinking the composition, wherein the pressure sensitive adhesive composition includes an acrylic block polymer and an organic solvent in which the acrylic block polymer is dissolved and/or dispersed.

Each monomer mixture used in the polymerization step for producing the acrylic block polymer may further include a reactive functional group-containing polymerizable unsaturated monomer.

In the case where the monomer mixture further includes the reactive functional group-containing polymerizable unsaturated monomer, the pressure sensitive adhesive composition may further include a crosslinking agent having at least two functional groups which are reactive to a reactive functional group of the reactive functional group-containing polymerizable unsaturated monomer.

In the crosslinking step, the pressure sensitive adhesive composition is coated onto the object to be coated, and dried to remove the organic solvent from the pressure sensitive adhesive composition, and the acrylic block polymer is crosslinked.

As to the object to be coated, for example, the later-mentioned, separators, carriers, base materials, and the like are appropriately used.

The crosslinking of the acrylic block polymer is, for example, carried out by normal-temperature crosslinking in which the materials are left at room temperature for a week or longer, or by high-temperature accelerated crosslinking in which the crosslinking reaction is accelerated in an isothermal room of 4° to 50° C.;

In the case where the acrylic block polymer is such as produced from the monomer mixture which further includes the reactive functional group-containing polymerizable unsaturated monomer, the acrylic block polymer is crosslinked by a reaction with a crosslinking agent having at least two functional groups which are reactive to a reactive functional group of the acrylic block polymer. The crosslinking agent used in this reaction is the same as that used for the pressure sensitive adhesive composition. The conditions for crosslinking may appropriately be selected, depending upon the crosslinking agent which is used.

The pressure sensitive adhesive product of the present invention may further have a separator which is attached to one or both faces of the pressure sensitive adhesive layer for soft vinyl chloride.

The pressure sensitive adhesive product of the present invention may have two pressure sensitive adhesive layers for soft vinyl chloride and further have a carrier and a separator, wherein the carrier is sandwiched between the pressure sensitive adhesive layers, and wherein the separator is attached to one face of one or both of the pressure sensitive adhesive layers, the face being opposite to the carrier.

The pressure sensitive adhesive product of the present invention may further have a separator and a base material, wherein the separator is attached to one face of the pressure sensitive adhesive layer for soft vinyl chloride, and wherein the base material is attached to the other face of the pressure sensitive adhesive layer for soft vinyl chloride.

The base material is, for example, a base material made of soft polyvinyl chloride.

Examples of the separator used in the present invention are as follows: paper base materials having a surface directly subjected to release treatment with release agents such as silicone; laminated films made by laminating polyethylene films onto reverse faces of the above-mentioned paper base materials subjected to the release treatment; and plastic films of polyester, polyethylene, polypropylene, and the like.

Examples of the pressure sensitive adhesive product of the present invention are as follows: pressure sensitive adhesive sheets, pressure sensitive adhesive tapes, pressure sensitive adhesive labels, pressure sensitive adhesive double coated tapes, and the like, which are used for soft vinyl chloride; or pressure sensitive adhesive sheets of soft vinyl chloride, pressure sensitive adhesive tapes of soft vinyl chloride, pressure sensitive adhesive labels of soft vinyl chloride, and the like.

The pressure sensitive adhesive product of the present invention is, for example, produced in the following ways, but the process for producing the pressure sensitive adhesive product is not limited to those mentioned below.

(1) The pressure sensitive adhesive composition of the present invention, which at least includes the acrylic block polymer, the crosslinking agent, and the organic solvent, is coated on one face of a separator and dried, and then the resultant pressure sensitive adhesive layer formed on a surface of the separator is laminated on one face of another separator or on that of the later-mentioned base material or carrier, and transferred and attached to this face by pressing (for example, by a pressure of 1 to 5 kg/cm$^2$). Or pressure sensitive adhesive layers formed on respective surfaces of two separators may be laminated on both faces of the later-mentioned carrier, and transferred and attached to these faces by pressing in the same way.

(2) The pressure sensitive adhesive composition of the present invention, which at least includes the acrylic block polymer, the crosslinking agent, and the organic solvent, is coated on one or both faces of a carrier and dried, and then a separator is attached to the resultant pressure sensitive adhesive layer to cover the layer with the separator.

The dried thickness of the pressure sensitive adhesive layer is, for example, in a range of 10 to 100 µm. The drying of the pressure sensitive adhesive layer is, for example, carried out by leaving the pressure sensitive adhesive layer in a hot-air oven at 7° to 100° C. for 2 to 10 minutes.

The pressure sensitive adhesive composition or product of the present invention is applicable to a soft polyvinyl chloride molding. The soft polyvinyl chloride molding is an adherend to which a pressure sensitive adhesive layer is attached, and examples of the molding are a sheet, a tape, wallpaper, a foam (a foamed matter), and the like.

The soft polyvinyl chloride molding can also be used as the carrier of the pressure sensitive adhesive product of the present invention.

In the acrylic block polymer included in the pressure sensitive adhesive composition of the present invention, the high glass transition temperature type polymer segment is dispersed in a polymer segment formed from a monomer mixture including an alkyl (meth)acrylate monomer, and the high glass transition temperature type polymer segment and the polymer segment formed from the monomer mixture are chemically bonded to each other. This can be proved from that a system formed by simply blending the high glass transition temperature type polymer and the polymer formed from the monomer mixture including an alkyl (meth) acrylate monomer shows a tendency to separate under solution conditions, but that a system according to the present invention does not show such a tendency. Even if the pressure sensitive adhesive composition of the present invention is applied to a soft polyvinyl chloride molding, the composition can form a pressure sensitive adhesive which displays high cohesion without losing the pressure sensitive adhesion, because the high glass transition temperature type polymer segment has a microdomain structure in the polymer segment formed from the monomer mixture including an alkyl (meth)acrylate monomer and because the high glass transition temperature type polymer segment serves as a physical crosslinking agent for the polymer segment formed from the monomer mixture including an alkyl (meth) acrylate monomer.

(Resin composition for a carrier)

A resin composition for a carrier, according to an embodiment of the present invention, is a resin composition which is formable into a carrier for a pressure sensitive adhesive product and includes an acrylic block polymer. A carrier for a pressure sensitive adhesive product can be formed from this composition, wherein the tensile stress of the carrier does not change very much in a range of a low elongated state to a high elongated state, the carrier has heat resistance (the change of the stress of the carrier, depending on the temperature, is small), the stress of the carrier can be dispersed in a wide range of temperature, and the change of the cohesion of the carrier, depending on the temperature, is small, because the resin composition for a carrier includes the acrylic block polymer.

The acrylic block polymer is a polymer obtainable by a production process including a preparation step, a first polymerization step, an adding step, and a second polymerization step. This process is the same as the process of the present invention for producing a block polymer, except that a monomer, which is formable into a high glass transition temperature type polymer having a glass transition temperature of 273 K. or higher, is used as the first polymerizable unsaturated monomer, and that a monomer mixture, which is formable into a polymer having no compatibility with the high glass transition temperature type polymer and includes an alkyl (meth)acrylate monomer, is used as the second polymerizable unsaturated monomer.

The monomer mixture may further include a reactive functional group-containing polymerizable unsaturated monomer and/or another polymerizable unsaturated monomer which is copolymerizable, if necessary.

The high glass transition temperature type polymer and the polymer which is formed from the monomer mixture are not compatible with each other. The meaning of the phrase "not compatible with" referred to herein is the same as that explained for the pressure sensitive adhesive composition of the present invention.

In the case where the glass transition temperature of the high glass transition temperature type polymer is lower than the above-mentioned range, the stress-dispersibility may be low, because the sufficient balance between the cohesion and the softness may not be obtained. The first polymerizable unsaturated monomer is preferably that which is formable into a high glass transition temperature type polymer having a glass transition temperature of 300 K. or higher in order to obtain an acrylic block polymer which is formable into a carrier having more excellent stress-dispersibility. The first polymerizable unsaturated monomer, for example, includes 40 to 100% by weight, preferably 60 to 100% by weight, of at least one selected from the group consisting of styrene, vinyl acetate, acrylonitrile, methacrylonitrile and methyl methacrylate and the balance of at least one selected from the group consisting of the later-mentioned, alkyl (meth) acrylate monomers, reactive functional group-containing polymerizable unsaturated monomers, and other polymerizable unsaturated monomers which are copolymerizable.

The monomer mixture (second polymerizable unsaturated monomer) used in the adding step, for example, includes 68 to 99.89% by weight of at least one alkyl (meth)acrylate monomer as a constituent and, as needed, may further include a reactive functional group-containing polymerizable unsaturated monomer and/or another polymerizable unsaturated monomer which is copolymerizable.

The alkyl (meth)acrylate monomer is not especially limited if it is an alkyl (meth)acrylate which has an alkyl group with 4 to 8 carbon atoms and is conventionally used for pressure sensitive adhesives. It is, for example, at least one selected from the group consisting of butyl (meth) acrylate, isobutyl (meth)acrylate, cyclohexyl (meth)acrylate, 2-ethylhexyl (meth)acrylate, n-octyl (meth)acrylate, and isooctyl (meth)acrylate.

The amount of the alkyl (meth)acrylate monomer is, for example, in a range of 40.1 to 89.99% by weight based on the total of the monomer mixture and the high glass transition temperature type polymer. In the case where the amount of the alkyl (meth)acrylate monomer is smaller than the range, the stress-dispersibility of the carrier may be low, because the resultant acrylic block polymer may be too hard. On the other hand, in the case where the amount is larger than the range, the creep property may be low, because sufficient cohesion may not be obtained. The amount of the alkyl (meth)acrylate monomer is preferably in a range of 50.1 to 64.9% by weight in order to obtain an acrylic block polymer which is formable into a carrier having more excellent stress-dispersibility and creep property.

The reactive functional group-containing polymerizable unsaturated monomer is, for example, at least one selected from the group consisting of carboxyl group-containing polymerizable unsaturated monomers and hydroxyl group-containing polymerizable unsaturated monomers.

The carboxyl group-containing polymerizable unsaturated monomers, the hydroxyl group-containing polymerizable unsaturated monomers, and other polymerizable unsaturated monomers which are copolymerizable are those explained for the pressure sensitive adhesive composition.

In the case where the reactive functional group-containing polymerizable unsaturated monomer is used, its amount is, for example, in a range of 0.01 to 10.0% by weight based on the total of the monomer mixture and the high glass transition temperature type polymer. In the case where the amount is smaller than the range, sufficient cohesion may not be obtained, because the crosslinking density may be low. On the other hand, in the case where the amount is larger than the range, the stress-dispersibility may be low, because the crosslinking density may be too high. The amount of the reactive functional group-containing polymerizable unsaturated monomer is preferably in a range of 0.1 to 5.0% by weight in order to obtain an acrylic block polymer having higher cohesion and stress-dispersibility.

If the balance between the tack and pressure sensitive adhesion and the cohesion is considered, the amount of the other polymerizable unsaturated monomer which is copolymerizable and used for producing an acrylic block polymer is, for example, in a range of 0 to 20% by weight based on the total of the monomer mixture which is used. In the case where the amount is larger than 20% by weight, the stress-dispersibility may be low, because the balance between the cohesion and the softness may be lost.

The composition of the monomer mixture used for producing an acrylic block polymer is determined by considering the balance between the resistance to the shear strength and the resistance to the release strength.

The number-average molecular weight of the acrylic block polymer is, for example, in a range of 2,000 to 1,000,000, preferably 10,000 to 400,000, more preferably 20,000 to 200,000. In the case where the number-average molecular weight is lower than the range, the performance as a block polymer may not be displayed. On the other hand, in the case where the number-average molecular weight is higher than the range, handling may be difficult, because the viscosity may be high.

With regard to the acrylic block polymer, the two or more polymer segments which are radially extended have two or more different compositions. If the polymer segments derive from homopolymers, the differences between the compositions are obtained due to the differences between the types of monomer units constituting the polymers. On the other hand, if the polymer segments derive from copolymers, the differences between the compositions are obtained due to the differences between the types or ratios of monomer units constituting the polymers, or due to other factors. The polymer segments usually have a number-average molecular weight in a range of 1,000 to 500,000, preferably 5,000 to 200,000, more preferably 10,000 to 100,000. In the case where the number-average molecular weight of the polymer segment is lower than the range, properties deriving from the polymer segments may not be given to the block polymer. On the other hand, the number-average molecular weight higher than the range may be unfavorable with respect to the productivity, because the viscosity during the production process may be high.

If the acrylic block polymer is used for a resin composition for a carrier and used for a pressure sensitive adhesive product, the combination of the polymer segments having different compositions is a combination of polymer segments deriving from polymers having different glass transition temperatures (Tg's).

The combination of the first polymerizable unsaturated monomer and the second polymerizable unsaturated monomer (monomer mixture) for combining the polymer segments deriving from polymers having different Tg's is, for example, such as herein exemplified for explaining the production process of the present invention for a block polymer.

In a carrier for a pressure sensitive adhesive product, which is formed using the resin composition for a carrier, the acrylic block polymer may be crosslinked. The process for crosslinking the acrylic block polymer is not especially limited, but its example is a process including the steps of: producing an acrylic block polymer having a reactive functional group using the monomer mixture including an alkyl (meth)acrylate monomer and a reactive functional group-containing polymerizable unsaturated monomer in accordance with the aforementioned production process for an acrylic block polymers; and crosslinking the resultant acrylic block polymer by a reaction of its reactive functional group, for example, using a crosslinking agent.

In the case where the acrylic block polymer and the crosslinking agent are reacted, a resin composition for a carrier, which includes the acrylic block polymer and the crosslinking agent, is prepared.

The resin composition for a carrier is coated onto an object to be coated, and dried to remove the organic solvent from the pressure sensitive adhesive composition, and the acrylic block polymer is crosslinked.

The crosslinking agent has, per molecule, at least two functional groups which are reactive to a reactive functional group of the acrylic polymer. Examples of the crosslinking agent used in the present invention are polyvalent epoxy compounds, polyvalent melamine compounds, polyvalent isocyanate compounds, metal-based crosslinking agents, aziridine compounds, oxazoline compounds, and the like. Particularly, polyvalent isocyanate compounds and/or oxazoline compounds are preferable for reactions to hydroxyl and carboxyl groups.

The above-mentioned, polyvalent epoxy compounds, polyvalent melamine compounds, polyvalent isocyanate compounds, metal-based crosslinking agents, and aziridine compounds are the same as explained for the pressure sensitive adhesive composition of the present invention.

The oxazoline compound is not limited so long as it has at least two oxazoline groups per molecule, and its examples are a oxazoline macromolecule crosslinking agent RS-1200 (made by Nippon Shokubai Co., Ltd., solid content: 50%, oxazoline equivalent: 555) and the like. The oxazoline compound may be either alone or in combinations with each other.

The amount of the crosslinking agent which is used is, for example, in a range of 0.1 to 10 by weight, preferably 0.5 to 5 parts by weight, per 100 parts by weight of the acrylic block polymer. In the case where the amount is smaller than 0.1 parts by weight, sufficient cohesion may not be obtained, because the crosslinking density may be low. On the other hand, in the case where the amount is larger than 10 by weight, sufficient stress-dispersibility may not be obtained, because the crosslinking density may be too high.

The carrier for a pressure sensitive adhesive product is, for example, obtained in the form of a film, tape or sheet by a process including the steps of: coating the resin composition of the present invention for a carrier, which includes the acrylic block polymer, the crosslinking agent, and the organic solvent, onto the later-mentioned separator; and drying and crosslinking the composition; and as needed releasing the resultant carrier from the separator after the crosslinking step.

The thickness of the carrier is, for example, in a range of 10 to 1000 μm. m. The drying of the carrier is, for example, carried out by leaving the carrier in a hot-air oven at 70° to 100° C. for 2 to 10 minutes. The crosslinking of the carrier is, for example, carried out by normal-temperature crosslinking in which the carrier is left at room temperature for a week or longer, or by high-temperature accelerated crosslinking in which the crosslinking reaction is accelerated in an isothermal room of 40° to 50° C. or in which the carrier is cured by heating on a coating line simultaneously with drying.

The organic solvent which is used is not especially limited so long as it is a liquid substance which can dissolve and/or disperse the acrylic block polymer. The usable organic solvent is, for example, a single solvent or a mixed solvent of two or more, as selected from the group consisting of: aromatic hydrocarbons such as toluene and xylene; esters such as ethyl acetate and butyl acetate; alicyclic hydrocarbons such as cyclohexane; ketones such as acetone and methyl ethyl ketone; and aliphatic hydrocarbons such as hexane and pentane. The amount of the organic solvent is, for example, in range of 100 to 400 parts by weight, preferably 150 to 350 parts by weight, per 100 parts by weight of the acrylic polymer. In the case where the amount of the organic solvent is smaller than the range, the composition may be difficult to coat, because its viscosity may be too high. On the other hand, in the case where the amount is larger than the range, the composition may be impossible to coat, because its viscosity may be too low.

The resin composition for a carrier can, if necessary, further include a foaming agent which is conventionally used for carriers for pressure sensitive adhesive products.

In addition, the resin composition for a carrier can, if necessary, further include at least one additive selected from the group consisting of fillers, pigments, diluents, antioxidants, ultraviolet absorbents, and ultraviolet stabilizers, which are conventionally used for carriers for pressure sensitive adhesive products.

The carrier formed from the resin composition for a carrier according to the present invention is, for example, used as a base material for pressure sensitive adhesive products such as: pressure sensitive adhesive tapes, for example, pressure sensitive adhesive single coated tapes, pressure sensitive adhesive double coated tapes, and the like; pressure sensitive adhesive labels; and pressure sensitive adhesive sheets, for example, pressure sensitive adhesive sheets for printing.

(Pressure sensitive adhesive product)

A pressure sensitive adhesive product, according to another embodiment of the present invention, has a carrier for a pressure sensitive adhesive product and further has a pressure sensitive adhesive layer which is formed on one or both faces of the carrier, wherein the carrier is formed from the resin composition of the present invention for a carrier, which composition includes an acrylic block polymer.

As aforementioned, a monomer mixture which further includes a reactive functional group-containing polymerizable unsaturated monomer may be used in order to produce the acrylic block polymer. In the case where the acrylic block polymer is produced using this monomer mixture, the resin composition of the present invention for a carrier may further include a crosslinking agent, as aforementioned.

The pressure sensitive adhesive product of the present invention may further have a separator which is attached to a surface of the pressure sensitive adhesive layer, the surface being opposite to the carrier. As to the pressure sensitive adhesive product according to this embodiment, the pressure sensitive adhesion does not easily be reduced, because the pressure sensitive adhesive layer is protected from dust, refuse, dirt, and the like.

Examples of the separator used in the present invention are as follows: paper base materials having a surface directly subjected to release treatment with release agents such as silicone; laminated films made by laminating polyethylene films onto reverse faces of the above-mentioned paper base materials subjected to the release treatment; and plastic films of polyester, polyethylene, polypropylene, and the like.

The pressure sensitive adhesive product of the present invention is, for example, produced in the following ways, but the process for producing the pressure sensitive adhesive product is not limited to those mentioned below.

(1) A pressure sensitive adhesive is coated on one or both faces of a first separator, and dried and, if necessary, crosslinked, thus forming a pressure sensitive adhesive layer. The resin composition of the present invention for a carrier, which includes an acrylic block polymer, a crosslinking agent and, if necessary, an organic solvent, is coated on a second separator, and dried and crosslinked, thus forming a carrier. Then, the pressure sensitive adhesive layer formed on one or both faces of the first separator is laminated on one face of the carrier, and transferred and attached to this face by pressing (for example, by a pressure of 1 to 5 kg/cm$^2$). Or pressure sensitive adhesive layers formed on respective surfaces of two separators may be laminated on both faces of the carrier, and transferred and attached to these faces by pressing in the same way.

(2) The resin composition of the present invention for a carrier, which includes an acrylic block polymer, a crosslinking agent and, if necessary, an organic solvent, is coated on one face of a separator, and dried and crosslinked. Then, the resultant carrier is released from the separator, and a pressure sensitive adhesive is coated on one or both faces of this carrier, and dried and, if necessary, crosslinked, thus forming a pressure sensitive adhesive layer. As needed, a separator may be attached to a surface of the resultant pressure sensitive adhesive layer to cover the surface with the separator.

The dried thickness of the pressure sensitive adhesive layer is, for example, in a range of 10 to 100 μm. The drying of the pressure sensitive adhesive layer is, for example, carried out by leaving the pressure sensitive adhesive layer in a hot-air oven at 70° to 100° C. for 2 to 10 minutes.

Examples of the pressure sensitive adhesive products of the present invention are as follows: pressure sensitive adhesive tapes such as pressure sensitive adhesive single coated tapes and pressure sensitive adhesive double coated tapes; pressure sensitive adhesive labels; and pressure sensitive adhesive sheets such as pressure sensitive adhesive sheets for printing.

BEST MODE FOR CARRYING OUT THE INVENTION

Figure 1:
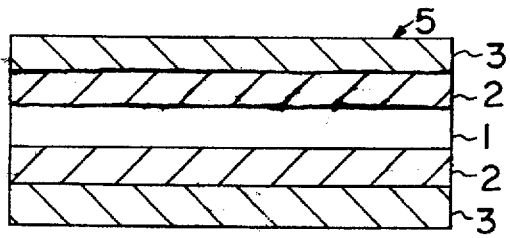
FIG. 1 is a sectional view showing an example of the pressure sensitive adhesive products of the present invention.

Hereinafter, this invention is illustrated by the following examples of some preferred embodiments in comparison with comparative examples not according to the invention. However, this invention is not limited to these examples. Hereinafter, the units "%" and "part(s)" denote "% by weight" and "part(s) by weight" respectively.

In addition, the number-average molecular weight (Mn) and the molecular weight distribution (Mw/Mn) were determined in terms of polystyrene by gel permeation chromatography (GPC).

The glass transition temperature (Tg) was determined using a differential scanning calorimeter "DSC-7" made by Perkin Elmer.

EXAMPLES (Example A1)

A mixture of 300 g of styrene and 1.8 g of pentaerythritol tetrakisthioglycolate was placed into a four-necked 1-liter flask equipped with a max blending wing (made by Sumitomo Heavy Industries, Ltd.) having a nitrogen-introducing tube, a dropping funnel, a thermometer and a condenser, and a polymerization reaction was carried out at 140° C. under nitrogen atmosphere. Two hours later, the polymerization conversion of styrene reached 95%, and the resultant polymer had a number-average molecular weight Mn of $2.1 \times 10^4$, a molecular weight distribution (Mw/Mn) of 9.3 and a glass transition temperature Tg of 93° C. The resultant reaction mixture contained 15 g of styrene and 285 g of polystyrene. The residual mercapto group content of the resultant polystyrene, which was measured by an Elleman method using a dimethylformamide solvent, was 15%. This measurement result shows that 3.4 in average number of mercapto groups disappeared from one molecule of pentaerythritol tetrakisthioglycolate which was used in the reaction. That is to say, the resultant polystyrene had a structure in which 3.4 in average number of polystyrene segments were radially extended from a pentaerythritol tetrakisthioglycolate segment as the center.

A mixture of 361 g of butyl acrylate and 19 g of acrylic acid was added from the dropping funnel to the reaction mixture at once. As the internal temperature of the flask rose after a while, the reaction mixture (polymerization system) got white turbidity, which showed that a second polymerization step had started. The reaction was carried out at the reflux temperature of the monomer mixture for 8 hours. Then, a solution which was prepared by dissolving 0.136 g of methoxyphenol as a polymerization inhibitor into 100 g of toluene was added to the reaction mixture, thus stopping the polymerization.

Toluene and residual monomers were removed by volatilization from the resultant reaction mixture using a twin-screw extruder, thus obtaining a milk-white solid polymer. The residual mercapto group content of the resultant polymer was 0.6%.

The resultant polymer was rubbery and had restorability, good stretchability, an Mn of $3.9 \times 10^4$, a molecular weight distribution of 8.1, and Tg's of −35° C. and 90° C.

Thus, it was guessed that the polymer obtained by the second polymerization step was a block polymer shown by PA (polystyrene), PB (poly(butyl acrylate/acrylic acid/styrene)), n=3.4 and m=0.6, from a fact that the polymer obtained by the second polymerization step had a larger molecular weight than the polymer obtained by the first polymerization step, and from the change of the amount of the residual mercapto group with regard to these polymers.

The Soxhlet's extraction was carried out using two solvents in sequence, the two solvents being as follows: acetonitrile which selectively dissolved the poly(butyl acrylate/acrylic acid/styrene) which was a random copolymer; and cyclohexane which selectively dissolved the polystyrene which was a homopolymer; and then the extraction using toluene was carried out, thus confirming that the polymer obtained by the second polymerization step had a block structure.

With regard to each of the extracted polymer portions, the weight ratio of the polystyrene segment to the poly(butyl acrylate/acrylic acid/styrene) random copolymer segment was calculated from FT-IR data of the characteristic absorption of styrene/butyl acrylate. In addition, as to each of the extracted polymer portions, the weight ratio (based on the total weight of the extracted polymer portions), the number-average molecular weight, and the molecular weight distribution were also measured. Their results are shown in Table A1.

TABLE A1

| | Polymer portion extracted Solvent of extracted layer | | |
|---|---|---|---|
| | Acetonitrile | Cyclohexane | Toluene |
| | | Weight ratio (wt %) | |
| | 7 | 5 | 88 |
| Composition (weight ratio of polystyrene segment to poly(butyl acrylate/ acrylic acid/styrene) random copolymer segment) | 12/88 | 90/10 | 42/58 |
| Number-average molecular weight (Mn/$10^4$) | 2.5 | 2.3 | 4.0 |
| Molecular weight distribution (Mw/Mn) | 4.9 | 9.8 | 7.8 |

As seen in Table A1, almost the entire polymer obtained in Example A1 (formed by the second polymerization step) was extracted into toluene.

It was confirmed that the polymer portion contained in the toluene-extracted layer was a block polymer having the poly(butyl acrylate/acrylic acid/styrene) random copolymer segment and the polystyrene segment in almost the same amount, because the polystyrene homopolymer and the poly(butyl acrylate/acrylic acid/styrene) random copolymer were removed.

As to the polymer portion contained in the acetonitrile-extracted layer, it was confirmed from the weight ratio between the polymer segments that this polymer portion was a mixture of the poly(butyl acrylate/acrylic acid/styrene) random copolymer and a block polymer which had the above-mentioned random copolymer segment and the polystyrene segment in which the ratio of the random copolymer segment was larger than that of the polystyrene segment. As to the polymer portion contained in the cyclohexane-extracted layer, it was confirmed from the weight ratio between the polymer segments that this polymer portion was a mixture of the polystyrene homopolymer and a block polymer which had the above-mentioned random copolymer segment and the polystyrene segment in which the ratio of the polystyrene segment was larger than that of the random copolymer segment.

It seems that the block polymer, in which one polymer segment had a much larger weight ratio than the other polymer segments, was subjected to the Soxhlet's extraction to which properties of the polymer segment having a much larger weight ratio than the other polymer segments (for example, properties of the polystyrene segment, as to the block polymer having a larger weight ratio of polystyrene segment) greatly contributed.

The above-mentioned analysis results proved that at least 88% portion of the polymer obtained in Example A1, namely the polymer portion extracted into toluene, was not a mixture of the poly(butyl acrylate/acrylic acid/styrene) random copolymer and the polystyrene homopolymer, but had a block structure.

From the results of the quantitative analysis of the residual mercapto group, the FT-IR analysis, the Soxhlet's extraction, and the GPC analysis with regard to the polymer obtained in Example A1, it was found that this polymer had a structure of the below-mentioned formula in which the polymer segments PA and PB having different compositions were radially extended from the pentaerythritol tetrakisthioglycolate segment as the center.

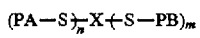

In this formula:

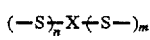

denotes a mercaptan residue which was formed by eliminating protons from four mercapto groups of pentaerythritol tetrakisthioglycolate; PA denotes a polystyrene segment having a number-average molecular weight of $0.6 \times 10^4$; PB denotes a copolymer segment having a number-average molecular weight of $3.0 \times 10^4$, in which styrene unit of 5.1%, butyl acrylate unit of 90.4% and acrylic acid unit of 4.1% were bonded to each other at random, thus forming a linear chain; n=3.4; and m=0.6; wherein the number-average molecular weight of PA was calculated by dividing $2.1 \times 10^4$, which was the number-average molecular weight of the polymer as formed from the first polymerization step, by 3.4 which was the number of the reacted mercapto groups per molecule of the mercaptan, and wherein the number-average molecular weight of PB was calculated by dividing $1.8 \times 10^4$, which was the difference between the number-average molecular weight $3.9 \times 10^4$ of the polymer as formed from the second polymerization step and the number-average molecular weight $2.1 \times 10^4$ of the polymer as formed from the first polymerization step, by 0.6 which was the number of the residual mercapto groups.

(Example A2)

A mixture of 200 g of methyl methacrylate, 1.0 g of trimethylolpropane trimercaptopropionate, 200 g of ethyl acetate and 0.05 g of azobiscyclohexanecarbonitrile was placed into the same polymerization vessel as used in Example A1, and a polymerization reaction was carried out at 82° C. under nitrogen atmosphere. Two hours later, the polymerization conversion of methyl methacrylate reached 95 %, and the resultant polymer had a number-average molecular weight Mn of $5.3 \times 10^4$, a molecular weight distribution of 2.1 and a glass transition temperature Tg of 95° C. The resultant reaction mixture contained 10 g of methyl methacrylate and 190 g of polymethyl methacrylate. The residual mercapto group content of the resultant polymethyl methacrylate, which was measured by an Elleman method using a dimethylformamide solvent, was 20%. This measurement result shows that 2.4 in average number of mercapto groups disappeared from one molecule of trimethylolpropane trimercaptopropionate which was used in the reaction. That is to say, the resultant polymethyl methacrylate had a structure in which 2.4 in average number of polymethyl methacrylate segments were radially extended from a trimethylolpropane trimercaptopropionate segment as the center.

A 60 g portion of a monomer mixture of 122 g of butyl acrylate, 60 g of ethyl acrylate, 12 g of styrene and 6 g of acrylonitrile was added from the dropping funnel to the reaction mixture, and then the rest of the monomer mixture was added dropwise over a 2-hour period, while the polymerization temperature was maintained at 85° C. Then, the polymerization was continued at the same temperature for 1 hour, and a solution which was prepared by dissolving 0.136 g of 6-t-butyl-2,4-xylenol as a polymerization inhibitor into 100 g of toluene was added to the reaction mixture, thus stopping the polymerization.

The resultant reaction mixture was devolatilized using a twin-screw extruder, thus obtaining a colorless transparent solid polymer. The residual mercapto group content of the resultant polymer was 0.8%.

The resultant polymer had good transparency, an Mn of $11.5 \times 10^4$, a molecular weight distribution of 3.5, and Tg's of −30° C. and 94° C.

Thus, it was guessed that the polymer obtained by the second polymerization step was a block polymer shown by PA (polymethyl methacrylate), PB (poly(butyl acrylate/ethyl acrylate/styrene/acrylonitrile/methyl methacrylate)), n=2.4 and m=0.6, from a fact that the polymer obtained by the second polymerization step had a larger molecular weight than the polymer obtained by the first polymerization step, and from the change of the amount of the residual mercapto group with regard to these polymers.

The Soxhlet's extraction was carried out using two solvents in sequence, the two solvents being as follows: ethanol which selectively dissolved the polymethyl methacrylate which was a homopolymer; and cyclohexyl acetate which selectively dissolved the poly(butyl acrylate/ethyl acrylate/ styrene/acrylonitrile/methyl methacrylate) which was a random copolymer; and then the extraction using toluene was carried out, thus confirming that the polymer obtained by the second polymerization step was a block polymer.

With regard to each of the extracted polymer portions, the weight ratio of the polymethyl methacrylate segment to the poly(butyl acrylate/ethyl acrylate/styrene/acrylonitrile/ methyl methacrylate) random copolymer segment was calculated from a styrene/methyl methacrylate ratio as determined by pyrolysis gas chromatography. In addition, as to each of the extracted polymer portions, the weight ratio (based on the total weight of the extracted polymer portions), the number-average molecular weight, and the molecular weight distribution were also measured. Their results are shown in Table A2.

TABLE A2

| | Polymer portion extracted Solvent of extracted layer | | |
|---|---|---|---|
| | Ethanol | Cyclohexyl acetate | Toluene |
| | Weight ratio (wt %) | | |
| | 32 | 18 | 50 |
| Composition (weight ratio of polymethyl methacrylate segment to poly(butyl acrylate/ethyl acrylate/styrene/acrylonitrile/methyl methacrylate) random copolymer segment) | 22/78 | 64/36 | 46/54 |
| Number-average molecular weight (Mn/10$^4$) | 6.1 | 5.8 | 13.5 |
| Molecular weight distribution(Mw/Mn) | 2.8 | 2.4 | 3.5 |

As seen in Table A2, a 50% portion of the polymer obtained in Example A2 (formed by the second polymerization step) was extracted into toluene.

It was confirmed that the polymer portion contained in the toluene-extracted layer was a block polymer having the polymethyl methacrylate segment and the poly(butyl acrylate/ethyl acrylate/styrene/acrylonitrile/methyl methacrylate) random copolymer segment in almost the same amount, because the polymethyl methacrylate homopolymer and the poly(butyl acrylate/ethyl acrylate/styrene/acrylonitrile/methyl methacrylate) random copolymer were removed.

In addition, from the results of the composition analysis by pyrolysis gas chromatography, it was confirmed that the ethanol-extracted layer included not only the polymethyl methacrylate homopolymer but also a block polymer which had the polymethyl methacrylate segment and the poly(butyl acrylate/ethyl acrylate/styrene/acrylonitrile/methyl methacrylate) random copolymer segment in which the ratio of the polymethyl methacrylate segment was larger than that of the random copolymer segment, and it was also confirmed that the cyclohexyl acetate-extracted layer included not only the poly(butyl acrylate/ethyl acrylate/styrene/acrylonitrile/methyl/methacrylate) random copolymer but also a block polymer which had the polymethyl methacrylate segment and the poly(butyl acrylate/ethyl acrylate/styrene/acrylonitrile/methyl methacrylate) random copolymer segment in which the ratio of the random copolymer segment was larger than that of the polymethyl methacrylate segment.

The above-mentioned analysis results proved that at least 50% by weight portion of the polymer obtained in Example A2, namely the polymer portion extracted into toluene, was not a mixture of the polymethyl methacrylate homopolymer and the poly(butyl acrylate/ethyl acrylate/styrene/acrylonitrile/methyl methacrylate) random copolymer, but had a block structure.

From the results of the quantitative analysis of the residual mercapto group, the FT-IR analysis, the Soxhlet's extraction, and the GPC analysis with regard to the polymer obtained in Example A2, it was found that this polymer had a structure of the below-mentioned formula in which the polymer segments PA and PB having different compositions were radially extended from the trimethylolpropane trimercaptopropionate segment as the center.

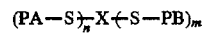

In this formula:

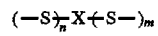

denotes a mercaptan residue which was formed by eliminating protons from three mercapto groups of trimethylolpropane trimercaptopropionate; PA denotes a polymethyl methacrylate segment having a number-average molecular weight of 2.2×10$^4$; PB denotes a copolymer segment having a number-average molecular weight of 10.3×10$^4$, in which methyl methacrylate unit of 4.8%, butyl acrylate unit of 58.0%, ethyl acrylate unit of 28.6%, styrene unit of 5.7% and acrylonitrile unit of 2.9% were bonded to each other at random, thus forming a linear chain; n=2.4; and m=0.6; wherein the number-average molecular weight of PA was calculated by dividing 5.3×10$^4$, which was the number-average molecular weight of the polymer as formed from the first polymerization step, by 2.4 which was the number of the reacted mercapto groups per molecule of the mercaptan, and wherein the number-average molecular weight of PB was calculated by dividing 6.2×10$^4$, which was the difference between the number-average molecular weight 11.5×10$^4$ of the polymer as formed from the second polymerization step and the number-average molecular weight 5.3×10$^4$ of the polymer as formed from the first polymerization step, by 0.6 which was the number of the residual mercapto groups.

(Comparative Example A1)

The polymerization procedure of Example A1 was repeated except that mercaptoethanol was substituted for pentaerythritol tetrakisthioglycolate. Two hours after the initiation of the polymerization, the polymerization conversion of styrene reached 96%, and the resultant polymer had an Mn of 1.5×10$^4$, a molecular weight distribution of 7.5 and a Tg of 92° C. A polymer, which was obtained by removing volatile components after the completion of the second polymerization step, had different properties from those of the block polymer of Example A1, namely, was not like rubber having a high elongation, but had a low elongation and was tacky, and had an Mn of 2.5×10$^4$, a molecular weight distribution of 6.5, and Tg's of −35° C. and 90° C.

In order to examine whether the resultant polymer was a block polymer or not, the Soxhlet's extraction was carried out in the same way as of Example A1, thus measuring the weight ratio and the composition of the polymer. Results are shown in Table A3.

TABLE A3

| | Polymer portion extracted Solvent of extracted layer | | |
|---|---|---|---|
| | Acetonitrile | Cyclohexane | Toluene |
| | Weight ratio (wt %) | | |
| | 49 | 51 | 0 |
| Composition (weight ratio of polystyrene segment to poly(butyl acrylate/ acrylic acid/styrene) random copolymer segment) | 2/98 | 100/0 | — |

As seen in Table A3, it was found that the polymer which was obtained in Comparative Example A1 did not include a block polymer as it had considerably different appearance from the polymer which was obtained by the second polymerization step in Example A1.

(Comparative Example A2)

The procedure of Example A2 was repeated except that trimethylolpropane trimercaptopropionate was not used and that the amount of azobiscyclohexanecarbonitrile was changed to 0.4 g. Two hours after the initiation of the polymerization, the polymerization conversion of methyl methacrylate reached 98%, and the resultant polymer had an Mn of $7.2 \times 10^4$, a molecular weight distribution of 2.8 and a Tg of 102° C. A polymer, which was obtained by removing volatile components after the completion of the second polymerization step, had different properties from those of the block polymer of Example A2, namely, was not transparent, but like frosted glass, and had an Mn of $8.5 \times 10^4$, a molecular weight distribution of 3.8, and Tg's of –0° C. and +101° C.

In order to examine whether the resultant polymer was a block polymer or not, the Soxhlet's extraction was carried out in the same way as of Example A2, thus measuring the weight ratio and the composition of the polymer. Results are shown in Table A4.

TABLE A4

| | Polymer portion extracted Solvent of extracted layer | | |
|---|---|---|---|
| | Ethanol | Cyclohexyl acetate | Toluene |
| | Weight ratio (wt %) | | |
| | 53 | 47 | 0 |
| Composition (weight ratio of polymethyl methacrylate segment to poly(butyl acrylate/ ethyl acrylate/styrene/ acrylonitrile/methyl methacrylate) random copolymer segment) | 100/0 | 0/100 | — |

As seen in Table A4, it was found that the polymer which was obtained in Comparative Example A2 did not include a block polymer as it had considerably different appearance from the polymer which was obtained by the second polymerization step in Example A2.

(Examples A3 to A8)

The procedure of Example A1 was repeated except that the first and second polymerizable monomer components, the polyvalent mercaptan, and the polymerization conditions were changed to those as shown in Tables A5 and A6, thus synthesizing a block polymer. The second polymerizable monomer components were those added to the reaction mixture (containing unreacted monomers) which was formed by the first polymerization step.

In any of these examples, it was confirmed that a block polymer was formed.

TABLE A5

| | | | Example A3 | Example A4 | Example A5 | Example A6 | Example A7 | Example A8 |
|---|---|---|---|---|---|---|---|---|
| First polymerization step | First polymerizable monomer components (parts) | Styrene | 270 | 240 | — | — | 240 | 240 |
| | | Acrylonitrile | 30 | — | — | — | — | — |
| | | Butyl acrylate | — | 60 | 150 | 285 | 60 | 60 |
| | | Octyl acrylate | — | — | 150 | — | — | — |
| | | Acrylic acid | — | — | — | 15 | — | — |
| | Polyvalent mercaptan (parts) | Trithioglycerol | 5.0 | — | — | — | — | — |
| | | PETG *1 | — | 9.0 | — | 1.8 | 9.0 | 9.0 |
| | | TMTP *2 | — | — | 1.5 | — | — | — |
| | Polymerization temperature (°C.) | | 110 | 140 | 110 | 100 | 140 | 140 |
| | Polymerization period (hr) | | 3 | 4 | 3 | 1.5 | 3 | 2 |
| | Polymerization conversion (%) | | 77 | 85 | 88 | 51 | 68 | 50 |
| | Product | Mn/$10^4$ | 1.1 | 0.7 | 5.5 | 5.3 | 0.6 | 0.5 |
| | | Mw/Mn | 9.8 | 12.3 | 3.4 | 2.9 | 10.8 | 8.9 |
| | | Tg(°C.) | 91 | 60 | –52 | –45 | 58 | 56 |
| | | Residual mercapto group (%) | 21 | 20 | 23 | 51 | 30 | 42 |

*1: Pentaerythritol tetrakisthioglycolate
*2: Trimethylolpropane tri(3-mercaptopropionate)

TABLE A6

|  |  |  | Example A3 | Example A4 | Example A5 | Example A6 | Example A7 | Example A8 |
|---|---|---|---|---|---|---|---|---|
| Second polymerization step | Second polymerizable monomer components (parts) | Styrene | — | — | — | 380 | — | — |
|  |  | Butadiene | 342 | — | — | — | — | — |
|  |  | Acrylonitrile | 38 | — | — | — | — | — |
|  |  | Stearyl acrylate | — | 90 | — | — | 90 | 90 |
|  |  | Acrylic acid | — | — | 50 | — | — | — |
|  |  | Blenmer PE200 *1 | — | — | 150 | — | — | — |
|  | Polymerization temperature (°C.) |  | 100 *2 | 150 | 130 | 145 | 150 | 150 |
|  | Polymerization period (hr) |  | 5 | 3 | 3 | 3 | 4 | 5 |
|  | Polymerization conversion (%) *3 |  | 65 | 95 | 89 | 66 | 96 | 96 |
|  | Product | $Mn/10^4$ | 3.2 | 1.0 | 7.4 | 9.2 | 1.1 | 1.0 |
|  |  | Mw/Mn | 8.8 | 10.5 | 3.1 | 3.4 | 11.3 | 12.1 |
|  |  | Tg(°C.) | −57, 91 | 45, 62 | −52, −30 | −45, 90 | 50, 61 | 57 |
|  |  | Residual mercapto group (%) | 0.8 | 0.7 | 0.8 | 0.8 | 0.7 | 0.8 |

*1: Polyethylene glycol monomethacrylate (average repetition number of polyethylene glycol: 4.5 made by NOF CORPORATION
*2: The reaction was carried out in an autoclave.
*3: Polymerization conversion based on the total of all polymerizable monomer components used in the first and second polymerization steps In addition, with regard to the block polymers obtained (by the second polymerization step) in Examples A3 to A8, the polymer segments (PA, PB), n and m were examined in the same way as of Examples A1 to A2, and their results are shown in Table A7.

TABLE A7

|  |  | Example A3 | Example A4 | Example A5 | Example A6 | Example A7 | Example A8 |
|---|---|---|---|---|---|---|---|
| Polymer segment of formed block polymer | PA $Mn/10^4$ | 0.46 | 0.21 | 2.4 | 2.7 | 0.21 | 0.22 |
|  | Composition (%): |  |  |  |  |  |  |
|  | Styrene unit | 83.0 | 81.0 | — | — | 81.0 | 81.0 |
|  | Acrylonitrile unit | 17.0 | — | — | — | — | — |
|  | Butyl acrylate unit | — | 19.0 | 50.0 | 95.2 | 19.0 | 19.0 |
|  | Octyl acrylate unit | — | — | 50.0 | — | — | — |
|  | Acrylic acid unit | — | — | — | 4.8 | — | — |
|  | PB $Mn/10^4$ | 3.5 | 0.38 | 2.7 | 2.0 | 0.42 | 0.29 |
|  | Composition (%): |  |  |  |  |  |  |
|  | Styrene unit | 13.0 | 26.7 | — | 72.0 | 41.3 | 50.0 |
|  | Butadiene unit | 74.9 | — | — | — | — | — |
|  | Acrylonitrile unit | 12.1 | — | — | — | — | — |
|  | Stearyl acrylate unit | — | 66.6 | — | — | 48.4 | 37.5 |
|  | Acrylic acid unit | — | — | 21.2 | 1.5 | — | — |
|  | Blenmer PE200 unit | — | — | 63.6 | — | — | — |
|  | Butyl acrylate unit | — | 6.7 | 7.6 | 26.5 | 10.3 | 12.5 |
|  | Octyl acrylate unit | — | — | 7.6 | — | — | — |
|  | n | 2.4 | 3.2 | 2.3 | 2.0 | 2.8 | 2.3 |
|  | m | 0.6 | 0.8 | 0.7 | 2.0 | 1.2 | 1.7 |
|  | n + m | 3 | 4 | 3 | 4 | 4 | 4 |

(Footnote)
PA: polymer segment formed by first polymerization step
PB: polymer segment formed by second polymerization step A molded matter having excellent impact resistance could be obtained by melt-kneading an AS resin (acrylonitrile-styrene copolymer) and the block polymer that was synthesized in Example A3, because this block polymer had rubber elasticity.

The block polymers which were synthesized in Examples A4, A7 and A8 were useful as a base resin for toners, because these block polymers had excellent fluidity at high temperature and blocking-resistance at low temperature. The block polymer which was synthesized in Example A4, the block polymer in Example A7 and the block polymer in Example A8 were excellent in this order with regard to the balance between the fluidity at high temperature and the blocking-resistance at low temperature.

The block polymer which was synthesized in Example A5 had tackiness and an appropriate level of cohesion, and was soluble in alkaline or warm water.

The block polymer which was synthesized in Example A6 had tackiness, an appropriate level of cohesion, and excellent thermofluidity.

The block polymers would not have displayed the above-mentioned properties if they had not been block polymers. Thus, the usefulness of both the block polymer and its production process according to the present invention could be confirmed.

The glass transition temperature peak width was measured as follows: a DSC chart was obtained using a differential scanning calorimeter "DSC-7" made by Perkin Elmer; a temperature $T_1$ (°C.) at which the DSC chart began rising from the background level and a temperature $T_2$ (°C.) at which the DSC chart then came back to the background level were examined; and the glass transition temperature peak width was expressed by $T_1$ and $T_2$ of a peak having a maximum temperature difference $|T_1-T_2|$.

The parallel-rays transmittance was determined by: interposing a 3-mm spacer between two polyethylene telephthalate (PET) films of 100 μm in thickness which were disposed oppositely to each other; filling the polymer into a space between the films using an injection molding machine; solidifying the polymer by cooling; irradiating visible rays to the polymer in a thickness direction to measure the transmittance using a turbidimeter ND-1001DP made by Nippon Denshoku Kogyo Co., Ltd.; and correcting the measured value by the parallel-rays transmittance of the two PET films themselves.

The amount of sulfur atom was determined by: allowing an iodine solution to absorb $SO_2$ that was formed by burning the polymer at high temperature; and carrying out the titration.

The amount of each monomer unit was determined by: measuring a value of the monomer composition in the polymerization system by gas chromatography; and subtracting this value from the total composition of the added monomers.

(Example B1)

A mixture of 285 parts of methyl methacrylate, 15 parts of acrylic acid, 300 parts of butyl acetate, 5 parts of pentaerythritol tetrakisthioglycolate and 0.1 part of azobisisobutyronitrile was placed into a four-necked 2-liter flask equipped with a nitrogen-introducing tube, a dropping funnel, a thermometer and a condenser. While stirred under nitrogen atmosphere, the mixture was heated to 80° C. to initiate a polymerization reaction. Thirty minutes after the initiation of the polymerization, the polymerization conversion reached 21%, and a monomer mixture of 665 parts of butyl acrylate and 35 parts of acrylic acid was dropwise added from the dropping funnel over a 4-hour period. After the completion of the dropwise addition, the contents of the flask were further stirred for 1 hour, and then the polymerization was stopped. Then, the reaction mixture was devolatilized by melting the resultant polymer using a twin-screw extruder. The change with time of the monomer composition of the polymerization system was measured by gas chromatography. The polymerization conversion was determined from the monomer composition of the polymerization system and from the total of the monomers which were added till the measurement. The number-average molecular weight (Mn), the glass transition temperature peak width, the parallel-rays transmittance, and the amount of each monomer unit were measured with regard to the resultant polymer. The amount of the residual mercapto groups was measured by a chromatic method (Ellman method). Their results are shown in Table B1.

TABLE B1

| | | Just before dropping start | 1 hour after dropping start | 2 hours after dropping start | 3 hours after dropping start | 4 hours after dropping start | Final product |
|---|---|---|---|---|---|---|---|
| Monomer composition (% by weight) | Methyl methacrylate | 95.5 | 52.0 | 26.3 | 7.7 | 2.8 | — |
| | Acrylic acid | 4.5 | 4.7 | 4.7 | 4.7 | 4.8 | — |
| | Butyl acrylate | 0.0 | 43.3 | 69.0 | 87.6 | 92.4 | — |
| Residual mercapto group (mmol) | | 37.1 | 24.7 | 18.0 | 8.9 | 3.7 | 2.3 |
| Polymer | Polymerization conversion (%) | 21.0 | 40.2 | 61.8 | 82.3 | 90.1 | 95.5 |
| | Number-average molecular weight (Mn/$10^4$) | 1.8 | 2.7 | 4.2 | 6.8 | 9.3 | 9.8 |
| | Glass transition temperature peak width (°C.) | 80 to 95 | 10 to 95 | −15 to 90 | −35 to 90 | −45 to 90 | −50 to 85 |
| | Parallel-rays transmittance (%) | — | — | — | — | — | 90.5 |
| | Amount of sulfur atom (% by weight) | — | — | — | — | — | 0.15 |

TABLE B1-continued

|  | Just before dropping start | 1 hour after dropping start | 2 hours after dropping start | 3 hours after dropping start | 4 hours after dropping start | Final product |
|---|---|---|---|---|---|---|
| Amount of monomer unit (% by weight) |  |  |  |  |  |  |
| Methyl methacrylate | 94.8 | 71.0 | 54.7 | 40.3 | 31.4 | 29.7 |
| Acrylic acid | 5.2 | 5.4 | 5.2 | 5.1 | 5.0 | 5.0 |
| Butyl acrylate | 0.0 | 23.6 | 40.1 | 54.6 | 63.6 | 65.3 |

From the decrease with time in the amount of the residual mercapto groups, the increase with time in the molecular weight of the polymer, the enlargement with time in the glass transition temperature peak width of the polymer, and the change with time in the composition of the residual monomers, it was confirmed that the resultant polymer was a block polymer which included about 6% of poly(methyl methacrylate/acrylic acid) (in which the weight ratio, methyl methacrylate/acrylic acid, was about 95/5) and about 5% of poly(butyl acrylate/acrylic acid) (in which the weight ratio, butyl acrylate/acrylic acid, was about 95/5), in which the rest of the copolymer segments had a gradient composition between both the copolymer compositions and were extended from the mercapto residue in the shape of a star.

(Example B2)

A mixture of 250 parts of styrene, 250 parts of methyl methacrylate, 300 parts of butyl acetate and 10 of dipentaerythritol hexakisthiopropionate was placed into the same apparatus as in Example B1. While stirred under nitrogen atmosphere, the mixture was heated to 105° C. to initiate a polymerization reaction. Twenty minutes after the initiation of the polymerization, the polymerization conversion reached 5.5%, and a monomer mixture of 475 parts of ethyl acrylate and 25 parts of methacrylic acid was dropwise added from the dropping funnel over a 3-hour period. After the completion of the dropwise addition, the reaction mixture was further stirred for 3 hours, and then the polymerization was stopped. Then, the reaction mixture was devolatilized by melting the resultant polymer using a twin-screw extruder. The change with time of the monomer composition of the polymerization system, the polymerization conversion, the amount of the residual mercapto groups, the number-average molecular weight (Mn), the glass transition temperature peak width, the parallel-rays transmittance, the amount of each monomer unit, and the amount of sulfur atom were measured with regard to the resultant polymer. Their results are shown in Table B2.

TABLE B2

|  |  | Just before dropping start | 1 hour after dropping start | 2 hours after dropping start | 3 hours after dropping start | 2 hours after dropping finish | Final product |
|---|---|---|---|---|---|---|---|
| Monomer composition (% by weight) | Styrene | 49.5 | 31.9 | 18.5 | 10.4 | 8.0 | — |
|  | Methyl methacrylate | 50.5 | 34.1 | 20.0 | 12.1 | 11.9 | — |
|  | Ethyl acrylate | 0.0 | 32.8 | 59.1 | 74.7 | 78.0 | — |
|  | Methacrylic acid | 0.0 | 1.2 | 2.4 | 2.8 | 2.1 | — |
| Residual mercapto group (mmol) |  | 65.6 | 37.8 | 22.9 | 12.7 | 4.2 | 2.7 |
| Polymer | Polymerization conversion (%) | 5.5 | 23.4 | 46.4 | 74.4 | 90.3 | 94.9 |

TABLE B2-continued

|  | Just before dropping start | 1 hour after dropping start | 2 hours after dropping start | 3 hours after dropping start | 2 hours after dropping finish | Final product |
|---|---|---|---|---|---|---|
| Number-average molecular weight ($Mn/10^4$) | 0.3 | 1.5 | 2.8 | 5.4 | 8.0 | 8.9 |
| Glass transition temperature peak width (°C.) | 75 to 85 | 50 to 90 | 25 to 90 | 5 to 90 | 0 to 85 | 0 to 85 |
| Parallel-rays transmittance (%) | — | — | — | — | — | 91.2 |
| Amount of sulfur atom (% by weight) | — | — | — | — | — | 0.29 |
| Amount of monomer unit (% by weight) | | | | | | |
| Styrene | 50.2 | 46.7 | 43.3 | 30.3 | 26.8 | 25.9 |
| Methyl methacrylate | 49.8 | 43.1 | 41.6 | 29.6 | 26.5 | 25.7 |
| Ethyl acrylate | — | 8.9 | 13.7 | 37.7 | 44.2 | 45.9 |
| Methacrylic acid | — | 1.3 | 1.4 | 2.4 | 2.5 | 2.5 |

From the decrease with time in the amount of the residual mercapto groups, the increase with time in the molecular weight of the polymer, the enlargement with time in the glass transition temperature peak width of the polymer, and the change with time in the composition of the residual monomers, it was confirmed that the resultant polymer was a block polymer which included about 3% of poly(methyl methacrylate/styrene) (in which the weight ratio, methyl methacrylate/styrene, was about 50/50) and about 20% of poly(methyl methacrylate/styrene/ethyl acrylate/methacrylic acid) (in which the weight ratio, methyl methacrylate/styrene/ethyl acrylate/methacrylic acid, was about 12/10/75/3), in which the polymer segments had a gradient composition between both the copolymer compositions and were extended from the mercapto residue in the shape of a star.

(Comparative Example B1)

Two hundred parts of butyl acetate and a 300-part portion of a monomer mixture of 285 parts of methyl methacrylate, 50 parts of acrylic acid, 665 parts of butyl acrylate and 2 parts of azobisisobutyronitrile were placed into the same apparatus as in Example B1. While stirred under nitrogen atmosphere, the contents of the apparatus was heated to 70° C. to initiate a polymerization reaction. Thirty minutes after the initiation of the polymerization, the polymerization conversion reached 21%, and the rest of the monomer mixture was dropwise added from the dropping funnel over a 3-hour period. Thirty minutes after the completion of the dropwise addition, 1 part of azobisisobutyronitrile was added. The reaction mixture was heated to 80° C. and further stirred for 1 hour, and then the polymerization was stopped. Then, the reaction mixture was devolatilized by melting the resultant polymer using a twin-screw extruder. The polymerization conversion, the number-average molecular weight (Mn), and the glass transition temperature peak width were measured with regard to the resultant polymer. Results of the measurement showed that the resultant polymer had a polymerization conversion of 95.1%, a number-average molecular weight Mn of $9.5 \times 10^4$, and an average composition of methyl methacrylate/acrylic acid/butyl acrylate =28.5/5.0/66.5, but had a glass transition temperature peak width of −2°0 to −5° C. and was entirely different in the finger touch from the block polymer as obtained in Example B1.

(Comparative Example B2)

The procedure of Example B1 was repeated except that pentaerythritol tetrakisthioglycolate was not used, that 2 parts of azobisisobutyronitrile was instead used, and that the polymerization temperature was set to 70° C., thus carrying out a polymerization reaction. After stopping the polymerization, the reaction mixture was devolatilized by melting the resultant polymer using a twin-screw extruder. The polymerization conversion, the number-average molecular weight (Mn), and the glass transition temperature peak width were measured with regard to the resultant polymer. Results of the measurement showed that the resultant polymer had a polymerization conversion of 94.6%, a number-average molecular weight Mn of $8.8 \times 10^4$, the same gradient composition as of the block polymer as obtained in Example B1, and a glass transition temperature peak width of −50° to 90° C. However, the polymer of this comparative example was opaque, because it did not have a block structure.

(Comparative Example B3)

The procedure of Example B2 was repeated except that after the polymerization period of the first polymerizable unsaturated monomer as charged into the flask had reached 3 hours (polymerization conversion: 80%), the second polymerizable unsaturated monomer was added from the dropping funnel at once and then the polymerization was further carried out for 3 hours, thus obtaining a comparative polymer. After stopping the polymerization, the reaction mixture was devolatilized by melting the resultant polymer using a twin-screw extruder. The resultant polymer had a polymerization conversion of 92.3%, a number-average molecular weight Mn of $8.3 \times 10^4$, the same average composition as of the block polymer as obtained in Example B2, and two narrow glass transition temperature peak widths of 5° to 15° C. and 75° to 90° C. However, the polymer of this comparative example was a block polymer in which polymer segments which were radially extended from a polyvalent mercaptan segment did not have a gradient composition, and the phase separation and the white turbidity occurred.

(Example B3)

A polymer solution was prepared by dissolving 100 parts of the polymer, as obtained in Example B1, into 150 parts of butyl acetate. This solution was coated on a 25-μm-thick PET (polyethylene telephthalate) film so as to form a coating film of 20 μm in thickness, and butyl acetate was then volatilized, thus obtaining a pressure sensitive adhesive tape. This tape was examined with regard to the appearance, the pressure sensitive adhesion, and the holding power. Their results are shown in Table B3.

(Comparative Example B4)

A polymer solution was prepared by dissolving 100 parts of the polymer, as obtained in Comparative Example B1, into 150 parts of butyl acetate. This solution was coated on a 25-μm-thick PET (polyethylene telephthalate) film so as to form a coating film of 20 μm in thickness, and butyl acetate was then volatilized, thus obtaining a pressure sensitive adhesive tape. This tape was examined with regard to the appearance, the pressure sensitive adhesion, and the holding power. Their results are shown in Table B3.

(Comparative Example B5)

A polymer solution was prepared by dissolving 100 parts of the polymer, as obtained in Comparative Example B2, into 150 parts of butyl acetate. This solution was coated on a 25-μm-thick PET (polyethylene telephthalate) film so as to form a coating film of 20 μm in thickness, and butyl acetate was then volatilized, thus obtaining a pressure sensitive adhesive tape. This tape was examined with regard to the appearance, the pressure sensitive adhesion, and the holding power. Their results are shown in Table B3.

The appearance was examined by observing by the naked eye whether the pressure sensitive adhesive face of the tape was transparent or white-turbid.

The pressure sensitive adhesion was evaluated by: attaching the 25-mm-wide tape onto a stainless steel (SUS) sheet; pressing the tape by running a 2-kg-heavy roller on it once back and forth; and 20 minutes later measuring the 180°-peel strength at a tensile rate of 300 mm/minute at 23° C.

The holding power was evaluated by: attaching the 25 mm×25 mm tape onto a SUS sheet at 23° C.; pressing the tape by running a 2-kg-heavy roller on it once back and forth; 20 minutes later, maintaining the temperature at 40° C. for 20 minutes; and measuring a time in minute which passed since the carrier of the tape was provided with a load of 1 kg and until the tape then peeled and fell off from the SUS sheet.

TABLE B3

|  | Final product of Example B1 | Final product of Comparative Example B1 | Final product of Comparative Example B2 |
|---|---|---|---|
| Appearance of tape | Transparent | Transparent | White-turbid |
| Pressure sensitive adhesion (kg/cm²) | 1,800 | 1,980 | 580 |
| Holding power (minute) | 60< | 2 | 1 |

(Example B4)

The vibration-controllabilities of the block polymers having the same average composition, as obtained in Example B2 and Comparative Example B3, were compared. The vibration-controllability is generally known to be presumable from data of the viscoelasticity, and is assumed to get better as tan δ becomes larger in a wide range of frequency and in a wide range of temperature. Thus, what temperature the polymers had a tan δ of 0.1 or more at was examined. As a result, the polymer of Example B2 had a tan δ of 0.3 or more in a temperature range of 5° to 90° C. and the polymer of Comparative Example B3 had a tan δ of 0.3 or more in temperature ranges of 10° to 20° C. and 80° to 90° C. The polymer of Example B2 can be expected to have the vibration-controllability in a wider temperature range than the polymer of Comparative Example B3, and the polymer of Example B2 is transparent, but the polymer of Comparative Example B3 is not. Thus, the polymer of Example B2 is usable in a wider utilization range than the polymer of Comparative Example B3.

(Example B5)

A mixture of 500 parts of styrene, 200 parts of butyl acetate and 10 parts of trimethylolpropane trithioglycolate was placed into the same apparatus as in Example B1. While stirred under nitrogen atmosphere, the mixture was heated to 110° C. to initiate a polymerization reaction. Sixty minutes after the initiation of the polymerization, the polymerization conversion reached 10%, and 500 parts of methyl methacrylate was dropwise added from the dropping funnel over a 3-hour period. After the completion of the dropwise addition, the reaction mixture was further stirred for 1 hour, and then the polymerization was stopped, when the polymerization conversion was 60%. Then, the reaction mixture was devolatilized by melting the resultant polymer using a twin-screw extruder. It was confirmed that the resultant polymer was a star-shaped block polymer which included about 7.6% of polystyrene and about 19% of poly(styrene/methyl methacrylate) (in which the weight ratio, styrene/methyl methacrylate, was about 40/60), in which the rest of the copolymer segments had a gradient composition between both the compositions. The change with time of the monomer composition of the polymerization system, the polymerization conversion, the amount of the residual mercapto groups, the number-average molecular weight (Mn), the parallel-rays transmittance, the amount of sulfur atom, and the amount of each monomer unit were measured with regard to the resultant polymer. Their results are shown in Table B4.

TABLE B4

|  |  | Just before dropping start | 1 hour after dropping start | 2 hours after dropping start | 3 hours after dropping start | Final product |
|---|---|---|---|---|---|---|
| Monomer composition | Styrene | 100.0 | 72.1 | 51.0 | 40.2 | — |
|  | Methyl | — | 27.9 | 49.0 | 59.8 | — |

TABLE B4-continued

|  |  | Just before dropping start | 1 hour after dropping start | 2 hours after dropping start | 3 hours after dropping start | Final product |
|---|---|---|---|---|---|---|
| (% by weight) | methacrylate |  |  |  |  |  |
|  | Residual mercapto group (mmol) | 67.4 | 42.5 | 27.3 | 18.6 | 9.8 |
| Polymer | Polymerization conversion (%) | 10.0 | 29.2 | 43.2 | 52.3 | 65.8 |
|  | Number-average molecular weight ($Mn/10^4$) | 0.3 | 0.8 | 2.3 | 4.8 | 7.8 |
|  | Parallel-rays transmittance (%) | — | — | — | — | 91.5 |
|  | Amount of sulfur atom (% by weight) Amount of monomer unit (% by weight) | — | — | — | — | 0.41 |
|  | Styrene | 100.0 | 75.5 | 71.7 | 59.0 | 55.2 |
|  | Methyl methacrylate | 0.0 | 24.5 | 28.3 | 41.0 | 44.8 |

As clearly seen in Table B4, the resultant polymer had a parallel-rays transmittance of 91.5% and was transparent.

(Comparative Example B6)

A polymer mixture was obtained by mixing 50 parts of polystyrene having a glass transition temperature of 100° C. and 50 parts of poly(styrene/methyl methacrylate) having a glass transition temperature of 150° C. and a weight ratio, styrene/methyl methacrylate, of about 40/60, under melted conditions. The resultant polymer mixture had a parallel-rays transmittance of 77% and was white-turbid.

As seen in Comparative Example B6, polystyrene and poly(styrene/methyl methacrylate) having near glass transition temperatures have difficult compatibility with each other. However, as seen in Example B5, a transparent polymer including polystyrene and poly(styrene/methyl methacrylate) is obtainable according to the present invention.

(Example C1)

A mixture of 196 parts of methyl methacrylate, 4 parts of acrylic acid, 0.2 parts of azobiscyciohexanecarbonitrile, 200 parts of methyl isobutyl ketone and 5.6, parts of pentaerythritol tetrakisthioglycolate was placed into a four-necked 1.5-liter flask equipped with a max blending wing (made by Sumitomo Heavy Industries, Ltd.) having a nitrogen-introducing tube, a dropping funnel, a thermometer and a condenser, and a polymerization reaction was carried out at 100° C. under nitrogen atmosphere. Two hours later, the polymerization conversion of methyl methacrylate reached 90%, and the resultant polymer had a number-average molecular weight Mn of $1.4 \times 10^4$, a molecular weight distribution (Mw/Mn) of 1.8 and a glass transition temperature Tg of 89° C. Next, 300 parts of butyl acrylate, 175 parts of 2-ethylhexyl acrylate and 25 parts of acrylic acid were added from the dropping funnel to the reaction mixture at once. As the internal temperature of the flask rose after a while, the reaction mixture got white turbidity, which showed that a second polymerization step had started. The reaction was carried out at the reflux temperature for 5 hours. Then, 0.14 parts of methoxyphenol as a polymerization inhibitor was added to the reaction mixture, thus stopping the polymerization. The volatile components such as methyl isobutyl ketone and residual monomers were removed by volatilization from the resultant reaction mixture using a twin-screw extruder, thus obtaining a milk-white polymer. The resultant polymer had a pressure sensitive adhesion, an Mn of $5.6 \times 10^4$, an Mw/Mn of 2.4, and Tg's of −51° C. and 90° C. This polymer was hereinafter referred to as hot-melt resin composition (1).

In Example C1, since the polymerization was initiated with a mercapto group and made progress, the resultant polymer was assumed to have a structure in which a poly(methyl methacrylate/acrylic acid) segment, deriving from a polymer as formed from the first polymerizable unsaturated monomer, and a poly(butyl acrylate/2-ethylhexyl acrylate/acrylic acid/methyl methacrylate) segment, deriving from a polymer as formed from a monomer mixture of the residual first polymerizable unsaturated monomer and the second polymerizable unsaturated monomer, were extended at maximum by the number of the mercapto groups from a polyvalent mercaptan segment as the center.

Properties of hot-melt resin composition (1) were measured by the following methods. Their results are shown in Table C1.

Viscosity at 180° C.: this was measured as to hot-melt resin composition (1), which was melted by heating to 180° C., using a flow tester (made by Shimadzu Corporation). In addition, as to the viscosity of 100 poise or less, results of measurement using a Brookfield type rotating viscometer are shown.

180°-peel strength: the hot-melt resin composition which was melted was coated on commercially available copy paper (weight: 60 g) so as to form a coating film of 25 to 30 μm in thickness; the coated paper was attached in a width of 25 mm onto a stainless steel (SUS) sheet as the adherend and pressed by running a 2-kg-heavy roller once back and forth; 20 minutes later the copy paper was peeled off at an angle of 180° from the stainless steel sheet at a tensile rate of 300 mm/minute, when the tensile strength as needed for peeling-off was measured as the 180°-peel strength.

Ball tack: this was shown by a value as measured by a test under conditions where the tilt angle was 30 degrees and the length of the approach run was 10 cm in accordance with a J. Dow method.

Holding power: the hot-melt resin composition which was melted was coated on commercially available copy paper (weight: 60 g) in an adhesive area of 25 mm×25 mm; the coated copy paper was attached onto a stainless steel (SUS) sheet; the resultant composite was pressed by running a 2-kg-heavy roller on it once back and forth; the temperature of the composite was maintained at a predetermined temperature of 40° C. or 80° C. for 20 minutes; and a time, which passed since the copy paper was provided with a load of 1 kg and until the paper then peeled and fell off from the SUS sheet, or a degree in mm, to which the copy paper was sheared off 1 hour after provided with a load of 1 kg, was measured as the holding power.

(Example C2)

Hot-melt resin composition (2) was prepared by adding 1.3 parts of zinc acetate to 100 parts of the polymer as obtained in Example C1 and kneading the resultant mixture at 180° C. under reduced pressure for 1 hour. Pressure sensitive adhesive properties of the resultant hot-melt resin composition (2) are shown in Table C1.

(Example C3)

Hot-melt resin composition (3) was prepared by adding 30 parts of a styrene-based petroleum resin (tackifier) FTE6100 (made by Mitsui Petrochemical Industries, Ltd.) to 100 parts of the polymer as obtained in Example C1 and kneading the resultant mixture at 180° C. for 1 hour. Pressure sensitive adhesive properties of the resultant hot-melt resin composition (3) are shown in Table C1.

(Example C4)

Hot-melt resin composition (4) was prepared by adding 2.0 parts of zinc acetate and 1.0 part of tributyl phosphate as a phosphoric acid ester to 100 parts of the polymer as obtained in Example C1 and kneading the resultant mixture at 180° C. under reduced pressure for 1 hour. Pressure sensitive adhesive properties of the resultant hot-melt resin composition (4) are shown in Table C1.

(Example C5)

A mixture of 200 parts of styrene and 3 parts of trimethylolpropane trithioglycolate was placed into an autoclave of which the internal atmosphere was replaced with a nitrogen gas, and the mixture was heated to 140° C. Two hours later, the polymerization conversion reached 91%, and the resultant polymer had an Mn of $1.5\times10^4$, an Mw/Mn of 8.6 and a Tg of 90° C. Next, 450 parts of butadiene, 25 parts of acrylic acid and 25 parts of acrylonitrile were added to the reaction mixture under increased pressure to further carry out the polymerization. The reaction was carried out at 140° C. for 5 hours. Then, 0.14 parts of methoxyphenol as a polymerization inhibitor was added to the reaction mixture, thus stopping the polymerization. The volatile components were removed by volatilization from the resultant reaction mixture using a twin-screw extruder, thus obtaining a milk-white polymer. The resultant polymer had a slight pressure sensitive adhesion, an Mn of $4.2\times10^4$, an Mw/Mn of 6.8, and Tg's of -55° C. and 90° C.

In Example C5, since the polymerization was initiated with a mercapto group and made progress in the same way as in Example C1, the resultant polymer was easily imagined to have a block structure in which a polystyrene segment, deriving from a polymer as formed from the first polymerizable unsaturated monomer, and a poly(butadiene/acrylic acid/acrylonitrile/styrene) segment, deriving from a polymer as formed from a monomer mixture of the residual first polymerizable unsaturated monomer and the second polymerizable unsaturated monomer, were radially extended from a polyvalent mercaptan segment as the center.

Hot-melt resin composition (5) was prepared by adding 50 parts of a tackifier (FTR6100 as above-mentioned) to 100 parts of the resultant polymer and kneading the resultant mixture at 180° C. for 1 hour. Pressure sensitive adhesive properties of the resultant hot-melt resin composition (5) are shown in Table C2.

(Example C6)

Hot-melt resin composition (6) was prepared by adding 0.5 parts of magnesium acetate to 100 parts of hot-melt resin composition (5) as obtained in Example C5 and kneading the resultant mixture at 180° C. for 2 hours. Pressure sensitive adhesive properties of the resultant hot-melt resin composition (6) are shown in Table C2.

(Example C7)

Hot-melt resin composition (7) was prepared by adding 1.0 part of magnesium acetate and 1.0 part of 2ethylhexyl acid phosphate to 100 parts of hot-melt resin composition (5) as obtained in Example C5 and kneading the resultant mixture at 180° C. under reduced pressure for 2 hours. Pressure sensitive adhesive properties of the resultant hot-melt resin composition (7) are shown in Table C2.

(Example C8)

A mixture of 196 parts of methyl methacrylate, 4 parts of acrylic acid, 200 parts of methyl isobutyl ketone and 5.5 parts of dipentaerythritol hexakisthiopropionate was placed into the same apparatus as in Example C1 and heated to 100° C. under nitrogen atmosphere. Thirty minutes later, the polymerization conversion reached 30%, when a mixture of 300 parts of butyl acrylate, 175 parts of ethyl acrylate and 25 parts of methacrylic acid was dropwise added from the dropping funnel over a 3 hour period. Then, the polymerization was further carried out for 1 hour, and then 0.14 parts of methoxyphenol as a polymerization inhibitor was added, thus stopping the polymerization. The volatile components were removed by volatilization from the resultant reaction mixture using a twin-screw extruder, thus obtaining a transparent polymer. The resultant polymer had a pressure sensitive adhesion, an Mn of $6.8\times10^4$, an Mw/Mn of 2.4, and Tg's in a wide range of -40° C. to 80° C. While the composition of a formed polymer, depending upon the polymerization method, gradually varied from a poly (methyl methacrylate/acrylic acid) (weight ratio of methyl methacrylate/acrylic acid: 98/2), which was a polymer formed from the first polymerizable unsaturated monomer, to a poly(butyl acrylate/ethyl acrylate/methacrylic acid) (weight ratio of butyl acrylate/ethyl acrylate/methacrylic acid: 60/35/5) which was a polymer formed from the second polymerizable unsaturated monomer, the polymerization as initiated with a mercapto group made progress, such that a polyvalent mercaptan-centered, star-shaped block polymer having a continuous variation of the composition was obtained.

The resultant polymer was referred to as hot-melt resin composition (8), and its pressure sensitive adhesive properties are shown in Table C3.

(Example C9)

Hot-melt resin composition (9) was prepared by adding 2.0 parts of sodium methoxide and 20 parts of a hydrogenated rosin-based tackifier Foral 105 (made by RIKA Hercules Inc.) to 100 parts of the polymer as obtained in Example C8 and kneading the resultant mixture at 180° C. under reduced pressure for 1 hour. Pressure sensitive adhesive properties of the resultant hot-melt resin composition (9) are shown in Table C3.

(Example C10)

Hot-melt resin composition (10) was prepared by adding 3.0 part of zinc acetate and 2.0 parts of 2-ethylhexyl acid phosphate to 100 parts of the polymer as obtained in Example C8 and kneading the resultant mixture at 180° C. under reduced pressure for 1 hour. Pressure sensitive adhesive properties of the resultant hot-melt resin composition (10) are shown in Table C3.

(Example C11)

A mixture of 200 parts of vinyl acetate, 150 parts of butyl acrylate, 300 parts of butyl acetate and 4.0 parts of pentaerythritol tetrakisthioglycolate was placed into the same apparatus as in Example C1 and heated to 100° C. under nitrogen atmosphere. When the polymerization conversion reached 10%, a mixture of 335 parts of styrene and 15 parts of acrylonitrile was dropwise added from the dropping funnel over a 3-hour period. Then, the polymerization was further carried out for 1 hour, and then 0.14 parts of methoxyphenol as a polymerization inhibitor was added, thus stopping the polymerization. Three parts of an antioxidant (Sumilizer BP101 made by Sumitomo Chemical Co., Ltd.) was added and mixed into the resultant reaction mixture, and then the volatile components were removed by volatilization from the resultant mixture using a twin-screw extruder, thus obtaining a polymer. The resultant polymer was fluorescence-colored and transparent, and had an Mn of $5.1 \times 10^4$, an Mw/Mn of 5.8, and Tg's in a wide range of $-10°$ C. to 90° C.

While the composition of a formed polymer, depending upon the polymerization method, gradually varied from a poly(vinyl acetate/butyl acrylate) (weight ratio of vinyl acetate/butyl acrylate: 57/43), which was a polymer formed from the first polymerizable unsaturated monomer, to a poly(styrene/acrylonitrile) (weight ratio of styrene/acrylonitrile: 96/4) which was a polymer formed from the second polymerizable unsaturated monomer, the polymerization as initiated with a mercapto group made progress, such that a polyvalent mercaptan-centered, star-shaped block polymer having a continuous variation of the composition was obtained.

The resultant polymer was referred to as hot-melt resin composition (11), and its viscosity at 180° C. and peel-strength are shown in Table C4. The viscosity at 180° C. was measured by the above-mentioned method, and the peel-strength was measured by the following method.

Peel-strength: the hot-melt resin composition which was melted by heating was coated on an SPCC steel sheet (0.5 mm×25 mm×150 mm) so as to form a coating film of 20 to 30 µm in thickness, the same steel sheet as mentioned above was immediately laminated on the formed film, the resultant composite was pressed by running a 2-kg-heavy roller on it once back and forth and maintained at a predetermined temperature of 0° C., 25° C. or 50° C., and then the lap shear strength was measured at a tensile rate of 50 mm/minute.

(Example C12)

A mixture of 200 parts of vinyl acetate, 136 parts of butyl acrylate, 14 parts of 2-methacryloyloxyethyl acid phosphate (made by Kyoeisya Chemical Co., Ltd.), 200 parts of butyl acetate and 5.6 parts of pentaerythritol tetrakisthioglycolate was placed into the same apparatus as in Example C1 and heated to 100° C. under nitrogen atmosphere. When the polymerization conversion reached 20%, a mixture of 335 parts of styrene and 15 parts of acrylonitrile was dropwise added from the dropping funnel over a 3-hour period.

Three parts of an antioxidant (Sumilizer BP101) and 7 parts of zinc acetate were added and mixed into the resultant reaction mixture, and then the volatile components were removed by volatilization from the resultant mixture using a twin-screw extruder. The resultant hot-melt resin composition (12) was fluorescence-colored and transparent, and the polymer, as obtained before adding zinc acetate, had an Mn of $4.0 \times 10^4$, an Mw/Mn of 4.8, and Tg's in a wide range of $-8°$ C. to 89° C.

Pressure sensitive adhesive properties of hot-melt resin composition (12) are shown in Table C4.

(Example C13)

Hot-melt resin composition (13) was prepared by adding 1.5 parts of 1-ethylhexyl acid phosphate to 100 parts of hot-melt resin composition (12) as obtained in Example C12 and kneading the resultant mixture at 180° C. for 1 hour. Pressure sensitive adhesive properties of the resultant hot-melt resin composition (13) are shown in Table C4.

(Example C14)

A mixture of 500 parts of a macromonomer of butyl acrylate/acrylic acid=95/5, Mn=10,000, Mw/Mn=1.9, having a methacryloyl group at one terminal, 500 parts of ethyl acetate and 5 parts of azobisisobutyronitrile was placed into the same flask as in Example C1 and heated to 70° C. under nitrogen atmosphere. The reaction mixture was stirred for 4 hours and then heated to 80° C. to mature the reaction mixture for 1 hour. Then, 0.14 parts of methoxyphenol as a polymerization inhibitor was added, thus stopping the polymerization.

The volatile components were removed by volatilization from the resultant reaction mixture using a twin-screw extruder, thus obtaining a transparent polymer. The resultant polymer had pressure sensitive adhesion, an Mn of $6.9 \times 10^4$, an Mw/Mn of 3.5, and a Tg of $-50°$ C.

It was understood that the resultant polymer was a polymer having a structure in which a carbon chain was branched to a high degree, because it was formed by the polymerization of only the macromonomer.

Hot-melt resin composition (14) was prepared by adding 1.3 parts of zinc acetate to 100 parts of the polymer as obtained above and kneading the resultant mixture at 180° C. under reduced pressure for 2 hours. Pressure sensitive adhesive properties of the resultant hot-melt resin composition (14) are shown in Table C5.

(Example C15)

Hot-melt resin composition (15) was prepared by adding 2.0 parts of zinc acetate and 2.0 parts of 2-ethylhexyl acid phosphate to 100 parts of the polymer as obtained in Example C14 and kneading the resultant mixture at 180° C. under reduced pressure for 2 hours. Pressure sensitive adhesive properties of the resultant hot-melt resin composition (15) are shown in Table C5.

(Example C16)

A 30-% portion of a monomer mixture of 4.25 parts of butyl acrylate, 50 parts of ethyl acrylate and 25 parts of acrylic acid was placed into the same apparatus as in Example C1, and then 250 parts of ethyl acetate, 250 parts of toluene and 2.5 parts of azobisisobutyronitrile were added. The contents of the apparatus was heated to 70° C. under nitrogen atmosphere to carry out a polymerization reaction.

Twenty minutes after the initiation of the polymerization, the dropwise addition of the rest of the above-mentioned monomer mixture was initiated and then finished in 3 hours. Then, 1 part of azobisisobutyronitrile was added to further carry out the polymerization for 1 hour, and then 0.14 parts of methoxyphenol as a polymerization inhibitor was added to stop the polymerization.

The volatile components were removed by volatilization from the resultant reaction mixture using a twin-screw extruder, thus obtaining a transparent polymer. The resultant polymer had pressure sensitive adhesion, an Mn of $3.9 \times 10^4$, an Mw/Mn of 7.9, and a Tg of −45° C.

Hot-melt resin composition (16) was prepared by adding 1.3 parts of zinc acetate and 1.3 parts of 2-ethylhexyl acid phosphate to 100 parts of the polymer as obtained above and kneading the resultant mixture at 180° C. under reduced pressure for 2 hours. Pressure sensitive adhesive properties of the resultant hot-melt resin composition (16) are shown in Table C5.

(Comparative Example C1)

A 50-% portion of a monomer mixture of 425 parts of butyl acrylate, 50 parts of ethyl acrylate and 25 parts of acrylic acid was placed into the same apparatus as in Example C1, and then 500 parts of ethyl acetate and 1.5 parts of azobisisobutyronitrile were added. The contents of the apparatus was heated to 70° C. under nitrogen atmosphere to carry out a polymerization reaction. Twenty minutes after the initiation of the polymerization, the dropwise addition of the rest of the above-mentioned monomer mixture was initiated and then finished in 2 hours. Then, 1 part of azobisisobutyronitrile was added to further carry out the polymerization for 1 hour, and then 0.14 parts of methoxyphenol as a polymerization inhibitor was added to stop the polymerization.

The volatile components were removed by volatilization from the resultant reaction mixture using a twin-screw extruder, thus obtaining a transparent polymer. The resultant polymer had pressure sensitive adhesion, an Mn of $7.8 \times 10^4$, an Mw/Mn of 3.5, and a Tg of −46° C.

This polymer was referred to as comparative hot-melt resin composition (1), and its pressure sensitive adhesive properties are shown in Table C5.

(Comparative Example C2)

The procedure of Comparative Example C1 was repeated except that the polymerization temperature was set to 60° C., thus obtaining a transparent polymer. The resultant polymer had pressure sensitive adhesion, an Mn of $9.5 \times 10^4$, an Mw/Mn of 3.3, and a Tg of −46° C.

This polymer was referred to as comparative hot-melt resin composition (2), and its pressure sensitive adhesive properties are shown in Table C5.

(Comparative Example C3)

Comparative hot-melt resin composition (3) was prepared by adding 1.0 Part of zinc acetate to 100 parts of the carboxyl group-containing polymer as obtained in Example C16 and kneading the resultant mixture at 180° C. under reduced pressure for 2 hours. Pressure sensitive adhesive properties of the resultant comparative hot-melt resin composition (3) are shown in Table C5.

(Comparative Example C4)

Comparative hot-melt resin composition (4) was prepared by adding 30 parts of a tackifier (FTR6100 as previously mentioned) to 100 parts of the polymer having a branched structure (free from zinc acetate) as obtained in Example C14 and kneading the resultant mixture at 180° C. for 1 hour. Pressure sensitive adhesive properties of the resultant comparative hot-melt resin composition (4) are shown in Table C5.

(Comparative Example C5)

A mixture of 196 parts of methyl methacrylate, 4 parts of acrylic acid, 200 parts of methyl isobutyl ketone and 2.0 parts of octyl thioglycolate was placed into the same apparatus as in Example C1 and heated to 100° C. under nitrogen atmosphere. Thirty minutes later, the polymerization conversion reached 3%, when a mixture of 300 parts of butyl acrylate, 175 parts of ethyl acrylate and 25 parts of methacrylic acid was dropwise added from the dropping funnel over a 3-hour period. Then, the polymerization was continued for 1 hour, and then 0.14 parts of methoxyphenol as a polymerization inhibitor was added to stop the polymerization.

The volatile components were removed by volatilization from the resultant reaction mixture using a twin-screw extruder, thus obtaining a milk-white polymer. The resultant polymer had pressure sensitive adhesion, an Mn of $6.5 \times 10^4$, an Mw/Mn of 2.6, and Tg's in a wide range of −40° C. to 80° C.

This polymer had a continuously varied composition and was referred to as comparative hot-melt resin composition (5), and its properties are shown in Table C3.

(Comparative Example C6)

Comparative hot-melt resin composition (6) was prepared by adding 2.0 parts of sodium methoxide and 20 parts of a hydrogenated rosin-based tackifier (Forall 105 as previously mentioned) to 100 parts of the polymer having a continuously varied composition as obtained in Comparative Example C5 and kneading the resultant mixture at 180° C. under reduced pressure for 1 hour. Properties of the resultant comparative hot-melt resin composition (6) are shown in Table C3.

(Comparative Example C7)

Three hundred parts of butyl acetate was placed into the same apparatus as in Example C1, and a mixture of 200 parts of vinyl acetate, 136 parts of butyl acrylate, 14 parts of 2-methacryloyloxyethyl acid phosphate, 335 parts of styrene, 15 parts of acrylonitrile and 2.0 parts of octyl thioglycolate was placed into the dropping funnel. A 200-part portion of the mixture was added into the flask from the dropping funnel, and the contents of the flask was heated to 100° C. under nitrogen atmosphere. Twenty minutes after the initiation of the polymerization, the rest of the mixture was dropwise added from the dropping funnel over a 3-hour period. After the completion of the dropwise addition, the polymerization was continued for 1 hour, and then 0.14 parts of methoxyphenol as a polymerization inhibitor was added to stop the polymerization.

Three parts of an antioxidant (Sumilizer BP101 as previously mentioned) and 7 parts of zinc acetate were added and mixed into the resultant reaction mixture, and then the volatile components were removed by volatilization from the resultant mixture using a twin-screw extruder. The resultant polymer was fluorescence-colored and transparent, and had an Mn of $4.5 \times 10^4$, an Mw/Mn of 6.5, and a Tg of 42° C.

This polymer was referred to as comparative hot-melt resin composition (7), and its adhesive strength is shown in Table C4.

(Comparative Example C8)

A 50-% portion of a monomer mixture of 300 parts of butyl acrylate, 175 parts of 2-ethylhexyl acrylate, 29 parts of acrylic acid and 196 parts of methyl methacrylate was placed into the same apparatus as in Example C1, and then 740 parts of ethyl acetate and 1.5 parts of azobisisobutyronitrile were added. The contents of the apparatus was heated to 70° C. under nitrogen atmosphere to initiate a polymerization reaction. Twenty minutes after the initiation of the polymerization, the dropwise addition of the rest of the above-mentioned monomer mixture was initiated and then finished in 2 hours. Then, 1 part of azobisisobutyronitrile was added to further carry out the polymerization for 1 hour, and then 0.14 parts of methoxyphenol as a polymerization inhibitor was added to stop the polymerization.

The volatile components were removed by volatilization from the resultant reaction mixture using a twin-screw extruder, thus obtaining a transparent polymer. The resultant polymer had weak pressure sensitive adhesion, an Mn of $6.2 \times 10^4$, an Mw/Mn of 4.5, and a Tg of $-11°$ C.

This polymer was referred to as comparative hot-melt resin composition (8), and its adhesive strength is shown in Table C1.

(Comparative Example C9)

A mixture of 200 parts of styrene, 450 parts of butadiene, 25 parts of acrylic acid, 25 parts of acrylonitrile and 1 part of octyl thioglycolate was placed into the same apparatus as in Example C5 and heated to 140° C. Under this condition, a polymerization reaction was carried out for 7 hours, and then the volatile components were removed in the same way as in Example C5. The resultant polymer had slight pressure sensitive adhesion, an Mn of $3.9 \times 10^4$, an Mw/Mn of 3.9, and a Tg of $-24°$ C.

Comparative hot-melt resin composition (9) was prepared by adding 50 parts of a tackifier (FTR6100) to 100 parts of the polymer as obtained above and kneading the resultant mixture at 180° C. for 1 hour. Pressure sensitive adhesive properties of the resultant comparative hot-melt resin composition (9) are shown in Table C2.

TABLE C1

| | | | Example | | | | Comparative Example |
|---|---|---|---|---|---|---|---|
| | | | C1 | C2 | C3 | C4 | C8 |
| Thermoplastic addition polymer | Monomer (parts) | Methyl methacrylate | 196 | 196 | 196 | 196 | 196 |
| | | Acrylic acid | 29 | 29 | 29 | 29 | 29 |
| | | Butyl acrylate | 300 | 300 | 300 | 300 | 300 |
| | | 2-Ethylhexyl acrylate | 175 | 175 | 175 | 175 | 175 |
| | Polyvalent mercaptan (parts) | | PETG[1] 5.6 | PETG[1] 5.6 | PETG[1] 5.6 | PETG[1] 5.6 | — |
| | Number-average molecular weight (Mn/$10^4$) | | 5.6 | 5.6 | 5.6 | 5.6 | 6.2 |
| | Molecular weight distribution (Mw/Mn) | | 2.4 | 2.4 | 2.4 | 2.4 | 4.5 |
| | Tg/°C. (by DSC) | | −51, 90 | −51, 90 | −51, 90 | −51, 90 | −11 |
| Metal ion source[2] | Zinc acetate | | — | 1.3 | — | 2.0 | — |
| Phosphoric acid ester[2] | Tributyl phosphate | | — | — | — | 1.0 | — |
| Tackifier[2] | FTR6100[3] | | — | — | 30 | — | — |
| Melt-viscosity at 180° C. (ps) | | | 140 | 580 | 82 | 295 | 820 |
| 180°-peel strength (kg/cm²) | | | 1600 | 1100 | 1200 | 1200 | 750 |
| Ball tack | | | 8 | 6 | 6 | 7 | 2 |
| Holding power[4] (mm, minutes) | 40° C. | | (31) | 0.1 | 3.2 | 0.1 | (15) |
| | 80° C. | | (0) | 0.9 | (0) | 0.3 | (0) |

[1]PETG: pentaerythritol tetrakisthioglycolate
[2]Additive: amount added in part per 100 parts of polymer
[3]FTR6100: styrene-based petroleum resin, made by Mitsui Petrochemical Industries, Ltd.
[4]Holding power: the numerical values in parenthesis show a falling-off time, and the others show a degree of shear.

TABLE C2

| | | | Example | | | Comparative Example |
|---|---|---|---|---|---|---|
| | | | C5 | C6 | C7 | C9 |
| Thermoplastic | Monomer | Styrene | 200 | 200 | 200 | 200 |
| | | Acrylonitrile | 25 | 25 | 25 | 25 |

TABLE C2-continued

|  |  |  | Example | | | Comparative Example |
|---|---|---|---|---|---|---|
|  |  |  | C5 | C6 | C7 | C9 |
| tic addition polymer | (parts) | Acrylic acid | 25 | 25 | 25 | 25 |
|  |  | Butadiene | 450 | 450 | 450 | 450 |
|  | Polyvalent mercaptan (parts) |  | TMTG[1] 3.0 | TMTG[1] 3.0 | TMTG[1] 3.0 | — |
|  | Number-average molecular weight (Mn/$10^4$) |  | 4.2 | 4.2 | 4.2 | 3.9 |
|  | Molecular weight distribution (Mw/Mn) |  | 6.8 | 6.8 | 6.8 | 3.9 |
|  | Tg/°C. (by DSC) |  | −55, 90 | −55, 90 | −55, 90 | −24 |
| Metal ion source[2] | Magnesium acetate |  | — | 0.75 | 0.75 | — |
| Phosphoric acid ester[2] | 2-Ethylhexyl acid phosphate |  | — | — | 1.5 | — |
| Tackifier[2] | FTR6100[3] |  | 50 | 50 | 50 | 50 |
| Melt-viscosity at 180° C. (ps) |  |  | 79 | 305 | 210 | 310 |
| 180°-peel strength (kg/cm$^2$) |  |  | 1800 | 1300 | 1200 | 880 |
| Ball tack |  |  | 10 | 7 | 8 | 3 |
| Holding power[4] (mm, minutes) | 40° C. |  | (30) | 0.3 | 0.1 | (13) |
|  | 80° C. |  | (0) | 1.5 | 0.8 | (0) |

[1] TMTG: trimethylolpropane trithioglycolate
[2] Additive: amount added in part per 100 parts of polymer
[3] FTR6100: styrene-based petroleum resin, made by Mitsui Petrochemical Industries, Ltd.
[4] Holding power: the numerical values in parentheses show a falling-off time, and the others show a degree of shear.

TABLE C3

|  |  |  | Example | | | Comparative Example | |
|---|---|---|---|---|---|---|---|
|  |  |  | C8 | C9 | C10 | C5 | C6 |
| Thermoplastic addition polymer | Monomer (parts) | Methyl methacrylate | 196 | 196 | 196 | 196 | 196 |
|  |  | Acrylic acid | 4 | 4 | 4 | 4 | 4 |
|  |  | Methacrylic acid | 25 | 25 | 25 | 25 | 25 |
|  |  | Ethyl acrylate | 175 | 175 | 175 | 175 | 175 |
|  |  | Butyl acrylate | 300 | 300 | 300 | 300 | 300 |
|  | Polyvalent mercaptan[1] (parts) |  | DPEHG 5.5 | DPEHG 5.5 | DPEHG 5.5 | TGO 2.0 | TGO 2.0 |
|  | Number-average molecular weight (Mn/$10^4$) |  | 6.8 | 6.8 | 6.8 | 6.5 | 6.5 |
|  | Molecular weight distribution (Mw/Mn) |  | 2.4 | 2.4 | 2.4 | 2.6 | 2.6 |
|  | Tg/°C. (by DSC) |  | −40 to 80 | −40 to 80 | −40 to 80 | −40 to 80 | −40 to 80 |
| Metal ion source[2] | Zinc acetate |  | — | — | 3.0 | — | — |
|  | Sodium methoxide |  | — | 2.0 | — | — | 2.0 |
| Phosphoric acid ester[2] | 2-Ethylhexyl acid phosphate |  | — | — | 2.0 | — | — |
| Tackifier[2] | Foral 105[3] |  | — | 20 | — | — | 20 |
| Melt-viscosity at 180° C. (ps) |  |  | 130 | 150 | 245 | 180 | 240 |
| 180°-peel strength (kg/cm$^2$) |  |  | 1400 | 1100 | 1150 | 540 | 830 |
| Ball tack |  |  | 6 | 6 | 6 | 4 | 5 |
| Holding power[4] (mm, minutes) | 40° C. |  | (59) | 1.6 | 0.0 | (4) | (19) |
|  | 80° C. |  | (0) | (29) | 0.2 | (0) | (0) |

[1] DPEHG: dipentaerythritol hexakisthiopropionate
TGO: octyl thioglycolate
[2] Additive: amount added in part per 100 parts of polymer
[3] Foral 105: hydrogenated rosin-based tackifier, made by RIKA Hercules Inc.
[4] Holding power: the numerical values in parentheses show a falling-off time, and the others show a degree of shear.

TABLE C4

| | | | Example | | | Comparative Example |
|---|---|---|---|---|---|---|
| | | | C11 | C12 | C13 | C7 |
| Thermoplastic addition polymer | Monomer (parts) | Vinyl acetate | 200 | 200 | 200 | 200 |
| | | Butyl acrylate | 150 | 136 | 150 | 136 |
| | | 2-methacryloyloxy-ethyl acid phosphate | — | 14 | — | 14 |
| | | Styrene | 335 | 335 | 335 | 335 |
| | | Acrylonitrile | 15 | 15 | 15 | 15 |
| | Polyvalent mercaptan[1] (parts) | | PETG 4.0 | PETG 5.6 | PETG 5.6 | TGO 2.0 |
| | Number-average molecular weight (Mn/$10^4$) | | 5.1 | 4.0 | 4.0 | 4.5 |
| | Molecular weight distribution (Mw/Mn) | | 5.8 | 4.8 | 4.8 | 6.5 |
| | Tg/°C. (by DSC) | | −10 to 90 | −8 to 89 | −8 to 89 | 42 |
| Metal ion source[2] | Zinc acetate | | — | 1.0 | 1.0 | 1.0 |
| Phosphoric acid ester[2] | 2-Ethylhexyl acid phosphate | | — | — | 1.5 | — |
| Additive[2] | Sumilizer BP101[3] | | 0.4 | 0.4 | 0.4 | 0.4 |
| Melt-viscosity at 180° C. (ps) | | | 89 | 190 | 110 | 320 |
| Peel Strength (kg/25 mm) | 0° C. | | 7.8 | 8.4 | 7.8 | 1.9 |
| | 25° C. | | 12.5 | 13.5 | 13.2 | 3.3 |
| | 50° C. | | 8.4 | 10.9 | 10.5 | 8.9 |

[1]PETG: pentaerythritol tetrakisthioglycolate
TGO: octyl thioglycolate
[2]Amount added in part per 100 parts of polymer
[3]Sumilizer BP101: antioxidant, made by Sumitomo Chemical Co., Ltd.

TABLE C5

| | | | Example | | | Comparative Example | | | |
|---|---|---|---|---|---|---|---|---|---|
| | | | C14 | C15 | C16 | C1 | C2 | C3 | C4 |
| Thermoplastic addition polymer | Monomer (parts) | Acrylic acid | — | — | 25 | 25 | 25 | 25 | — |
| | | Ethyl acrylate | — | — | 50 | 50 | 50 | 50 | — |
| | | Butyl acrylate | — | — | 425 | 425 | 425 | 425 | — |
| | | Macromonomer[1] | 500 | 500 | — | — | — | — | 500 |
| | Number-average molecular weight (Mn/$10^4$) | | 6.9 | 6.9 | 3.9 | 7.8 | 9.5 | 3.9 | 6.9 |
| | Molecular weight distribution (Mw/Mn) | | 3.5 | 3.5 | 7.9 | 3.5 | 3.3 | 7.9 | 3.5 |
| | Tg/°C. (by DSC) | | −50 | −50 | −45 | −46 | −46 | −45 | −50 |
| Metal ion source[2] | Zinc acetate | | 1.3 | 2.0 | 1.3 | — | — | 1.0 | — |
| | Sodium methoxide | | — | — | — | — | — | — | — |
| Phosphoric acid ester[2] | 2-Ethylhexyl acid phosphate | | — | 2.0 | 1.3 | — | — | — | — |
| Tackifier[2] | FTR6100[3] | | — | — | — | — | — | — | 30 |
| Melt-viscosity at 180° C. (ps) | | | 780 | 550 | 675 | 315 | 890 | 1100 | 225 |
| 180°-peel strength (kg/cm$^2$) | | | 1650 | 1500 | 1450 | 2800 | 2300 | 1250 | 2100 |
| Ball tack | | | 8 | 7 | 8 | 9 | 9 | 7 | 8 |
| Holding power[4] (mm, minutes) | 40° C. | | 0.3 | 0.3 | 0.9 | (7) | (12) | 1.0 | (14) |
| | 80° C. | | 3.2 | 1.7 | (58) | (0) | (0) | (48) | (0) |

[1]Macromonomer of butyl acrylate/acrylic acid = 95/5, Mn = 10,000, Mw/Mn = 1.9, having a methacryloyl group at one terminal
[2]Amount added in part per 100 parts of polymer
[3]FTR6100: styrene-based petroleum resin, made by Mitsui Petrochemical Industries, Ltd.
[4]Holding power: the numerical values in parentheses show a falling-off time, and the others show a degree of shear.

FIG. 1 is a sectional view showing an example of the pressure sensitive adhesive products of the present invention. The pressure sensitive adhesive product of this example is a pressure sensitive adhesive double coated tape 5, and has a carrier 1, pressure sensitive adhesive layers 2 for soft vinyl chloride, and separators 3.

The pressure sensitive adhesive layers 2 include as a main component an acrylic crosslinked copolymer (a crosslinked product from an acrylic block polymer) which is produced by a production process including a step of drying and crosslinking a pressure sensitive adhesive composition of the present invention, and the pressure sensitive adhesive layers are formed on both faces of the carrier 1. Each separator 3 is, for example, release paper, and attached onto one face of each pressure sensitive adhesive layer 2 so as to cover the face with the separator, and the other face of each pressure sensitive adhesive layer 2 is attached onto the carrier 1.

The carrier is, for example, paper, a plastic film, a foamed sheet, nonwoven fabric, or the like, as conventionally used. In the pressure sensitive adhesive product of the present invention, the carrier can be a soft polyvinyl chloride molding, for example, of the shape of a film, a sheet, a tape, or wallpaper.

Figure 2:
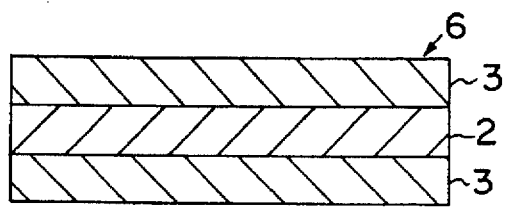
FIG. 2 is a sectional view showing an example of the pressure sensitive adhesive products of the present invention.

FIG. 2 is a sectional view showing another example of the pressure sensitive adhesive products of the present invention. The pressure sensitive adhesive product of this example is a pressure sensitive adhesive double coated tape 6 free from a core (carrier), and has a pressure sensitive adhesive layer 2 for soft vinyl chloride, and separators 3.

The pressure sensitive adhesive layer 2 includes as a main component an acrylic crosslinked copolymer (a crosslinked product from an acrylic block polymer) which is produced by a production process including a step of drying and crosslinking a pressure sensitive adhesive composition of the present invention. The separators 3 are, for example, release paper, and attached onto both faces of the pressure sensitive adhesive layer 2 so as to cover these faces with the separators.

Figure 3:
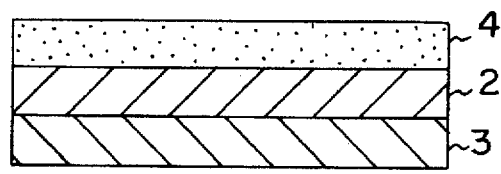
FIG. 3 is a sectional view showing an example of the pressure sensitive adhesive products of the present invention.

FIG. 3 is a sectional view showing another example of the pressure sensitive adhesive products of the present invention. The pressure sensitive adhesive product of this example has a pressure sensitive adhesive layer 2 for soft vinyl chloride, a separator 3 and a base material 4.

The pressure sensitive adhesive layer 2 includes as a main component an acrylic crosslinked copolymer (a crosslinked product from an acrylic block polymer) which is produced by a production process including a step of drying and crosslinking a pressure sensitive adhesive composition of the present invention. The separator 3 is, for example, release paper, and attached onto one face of the pressure sensitive adhesive layer 2 so as to cover this face with the separator. The base material 4 is, for example, a film, a sheet, a tape, or wallpaper, as made of soft polyvinyl chloride.

Figure 4:
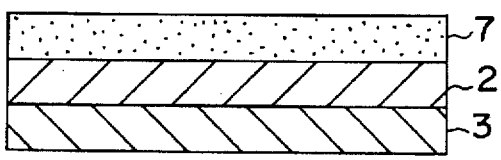
FIG. 4 is a sectional view showing an example of the pressure sensitive adhesive products of the present invention.

FIG. 4 is a sectional view showing another example of the pressure sensitive adhesive products of the present invention. The pressure sensitive adhesive product of this example has a pressure sensitive adhesive layer 2 for soft vinyl chloride, a separator 3 and a base material 7.

The pressure sensitive adhesive layer 2 includes as a main component an acrylic crosslinked copolymer (a crosslinked product from an acrylic block polymer) which is produced by a production process including a step of drying and crosslinking a pressure sensitive adhesive composition of the present invention. The separator 3 is, for example, release paper, and attached onto one face of the pressure sensitive adhesive layer 2 so as to cover this face with the separator. The base material 7 is, for example, aluminum foil; a sheet of polyolefin such as polyethylene and polypropylene; or the like.

(Production of pressure sensitive adhesive composition)

Example D1

A mixture of 200 parts of styrene and 1.0 part of pentaerythritol tetrakisthioglycolate (PETG) was placed into a four-necked 2-liter flask equipped with a thermometer, a stirrer, a max blending wing (made by Sumitomo Heavy Industries, Ltd.), an inert gas-introducing tube, a reflux condenser and a dropping funnel, and a polymerization reaction was carried out at 140° C. under nitrogen atmosphere. Three hours later, 760 parts of butyl acrylate and 40 parts of acrylic acid were added at once. As the internal temperature of the flask rose after a while, the reaction mixture got white turbidity, which showed that a second polymerization step had started. The reaction was carried out at the reflux temperature of the monomer mixture for 5 hours. As a result, the polymerization conversion reached 99.4%. The residual monomers were removed under reduced pressure, and 1300 parts of toluene was then added into the reaction mixture to dissolve it, thus obtaining an acrylic copolymer solution having a solid content of 36.4% and a viscosity of 17,200 cps.

Examples D2 to D4 and Comparative Example D1

The procedure of Example D1 was repeated except that the reaction starting materials and/or the reaction conditions were changed to those shown in Table D1, thus obtaining an acrylic copolymer solution having a solid content, a viscosity, and a weight-average molecular weight, as shown in Table D1.

TABLE D1

| | First polymerization step *1 | | | | Second polymerization step *2 | | | Solution of resultant acrylic copolymer | | |
|---|---|---|---|---|---|---|---|---|---|---|
| | Amount charged /parts by weight | | Polymerization conversion (CONV. /wt %) | Mw/10⁴ *3 | Polymerization period /h | Type and amount of monomer added /parts by weight | Polymerization conversion (CONV. /wt %) | Polymerization period /h | Mw/10⁴ *4 | Viscosity /cps | Solid content /wt % |
| | Monomer | PETG | | | | | | | | | |
| Example D1 | St 200 | 1.00 | 82.1 | 18.1 | 3.0 | BA 760, AA 40 | 99.4 | 5.0 | 51.5 | 17,200 | 36.4 |
| Example D2 | St 100 | 1.00 | 81.3 | 15.4 | 3.0 | BA 855, AA 45 | 99.2 | 5.0 | 71.2 | 18,260 | 36.4 |
| Example D3 | St 75 | 1.00 | 80.8 | 12.7 | 3.0 | BA 878.8, AA 46.2 | 97.8 | 5.0 | 46.2 | 8,450 | 36.1 |

TABLE D1-continued

| | First polymerization step *1 | | | | Second polymerization step *2 | | | | | |
|---|---|---|---|---|---|---|---|---|---|---|
| | Amount charged /parts by weight | | Polymerization conversion (CONV.) /wt % | Mw/10⁴ *3 | Polymerization period /h | Type and amount of monomer added /parts by weight | Polymerization conversion (CONV.) /wt % | Polymerization period /h | Solution of resultant acrylic copolymer | | |
| | Monomer | PETG | | | | | | | Mw/10⁴ *4 | Viscosity /cps | Solid content /wt % |
| Example D4 | St 50 | 2.00 | 80.0 | 10.4 | 3.0 | BA 902.5, AA 47.5 | 96.2 | 5.0 | 87.5 | 22,400 | 35.7 |
| Comparative Example D1 | St 0 | 1.00 | — | — | — | BA 950, AA 50 | 91.6 | 6.0 | 117.9 | 43,100 | 34.6 |

*1: St: styrene, PETG: pentaerythritol tetrakisthioglycolate, glass transition temperature of polymer of monomer: 373 K. in Examples D1 to D4
*2: BA: butyl acrylate, AA: acrylic acid, calculated value of glass transition temperature of polymer of monomer mixture: 224 K. in Examples D1 to D4
*3: Weight-average molecular weight after completion of first polymerization step (value measured by GPC; standard polystyrene was used as standard)
*4: Weight-average molecular weight after completion of second polymerization step (value measured by GPC; standard polystyrene was used as standard)

Example D11

A pressure sensitive adhesive composition was prepared by mixing 0.21 parts of Colonate L55E (a polyisocyanate compound made by Nippon Polyurethane Co., Ltd., having a solid content of 11%) into 100 parts, as solid content, of the acrylic copolymer solution as obtained in Example D1.

Examples D12 to D18

The procedure of Example D11 was repeated except that the type and the amount of the acrylic copolymer solution and those of the crosslinking agent were respectively changed to those shown in Table D2, thus preparing a pressure sensitive adhesive composition.

Example D21

The pressure sensitive adhesive composition as obtained in Example D11 as coated onto one face of release paper 70K-818T/EF made by Fujimori Kogyo Co., Ltd.) so as to form a 50-μm-thick dried film, dried at 100° C. for 2 minutes, and matured at 23° C. for 7 days. Then, the resultant pressure sensitive adhesive layer on the paper was laminated and pressed on one face of a 50-μm-thick soft polyvinyl chloride sheet (made by Okamoto Industries, Inc.) to transfer and attach the pressure sensitive adhesive layer onto the soft polyvinyl chloride sheet, thus obtaining a soft vinyl chloride pressure sensitive adhesive sheet having release paper.

Examples D22 to D28

The procedure of Example D21 was repeated except that the pressure sensitive adhesive composition was changed to that shown in Table D2, thus preparing a soft vinyl chloride pressure sensitive adhesive sheet.

Example D31

The pressure sensitive adhesive composition as obtained in Example D11 was coated onto one face of each of two sheets of release paper (70K-818T/EF made by Fujimori Kogyo Co., Ltd.) so as to form a 75-μ-m-thick dried film, and then dried at 100° C. for 3 minutes Then, the respective faces of the two sheets of release paper, as coated with the pressure sensitive adhesive composition, were laminated and pressed on both faces of nonwoven fabric to transfer and attach the pressure sensitive adhesive composition onto both faces of nonwoven fabric, thus preparing a 150-μm-thick double coated tape having release paper on both faces.

Examples D22 to D28

The procedure of Example D31 was repeated except that the pressure sensitive adhesive composition was changed to that shown in Table D2, thus preparing a double coated tape.

Comparative Example D21

A commercially available double coated tape for soft vinyl chloride (trade name: Double Tack Tape #577, made by Sekisui Chemical Co., Ltd.) was prepared for comparison.

Comparative Example D22

A commercially available double coated tape for soft vinyl chloride (trade name: Adhesive Double Coated Tape No. 501M, made by Nitto Electric Industrial Co., Ltd.) was prepared for comparison.

Comparative Example D23

A commercially available double coated tape for soft vinyl chloride (trade name: Adhesive Double Coated Tape No. 5000CX, made by Nitto Electric Industrial Co., Ltd.) was prepared for comparison.

In Tables, TETRAD-C is 1,3-bis(N,N-diglycidylaminomethyl) cyclohexane made by Mitsubishi Gas Chemical Co., Inc.

With regard to the soft vinyl chloride pressure sensitive adhesive sheets and the double coated tapes as obtained in Examples and Comparative Examples, the holding power and the pressure sensitive adhesion were measured in accordance with JIS-Z0237 (1991), their results are shown in Tables D2 and D3.

The holding power was measured as follows: the 20 mm×20 mm pressure sensitive adhesive sheet was attached onto a stainless steel sheet (SUS304); 20 minutes later the sheets was maintained at 80° C.; and further 20 minutes later, a time, which passed since the pressure sensitive adhesive sheet was provided with a load of 1 kg and until the pressure sensitive adhesive sheet fell off from the stainless steel sheet, or a degree of the shear of the pressure sensitive adhesive sheet as measured 24 hours after provided with a load of 1 kg, was shown as the holding power.

The pressure sensitive adhesion of the pressure sensitive adhesive sheet was shown by its initial value and value after acceleration by heating. The initial value was measured as follows: the pressure sensitive adhesive sheet of 25 mm in width was attached onto an aluminum sheet (according to JIS-A1050P, thickness: 1 mm) under atmosphere of 23° C. and 65% RH by running a 2-kg-heavy rubber roller on the sheet once back and forth; and 25 minutes later, the strength, as needed for peeling off the pressure sensitive adhesive sheet from the aluminum sheet at a peeling angle of 180 degrees at a rate of 300 mm/minute, was measured. The value after acceleration by heating was measured as follows: the pressure sensitive adhesive sheet was left under atmosphere of 80° C. for 3 days and then under atmosphere of 23° C. and 65% RH for 2 hours, and then cut into 20 mm width and attached onto the same aluminum sheet as mentioned above by running a 2-kg-heavy rubber roller on the sheet thrice back and forth; and 24 minutes later, the strength, as needed for peeling off the pressure sensitive adhesive sheet from the aluminum sheet at a peeling angle of 180 degrees at a rate of 300 mm/minute, was measured.

The pressure sensitive adhesion of the double coated tape was shown by its initial value and value after acceleration by heating. The initial value was measured as follows: one face of the double coated tape was lined with a PET film, as treated with corona discharge, under atmosphere of 23° C. and 65% RH, cut into 20 mm width, and then attached onto a 2-mm-thick soft vinyl chloride sheet (#480; made by Okamoto Industries, Inc.; plasticizer 50 phr; as lined with an aluminum sheet using a commercially available adhesive double coated tape) by running a 2-kg-heavy rubber roller thrice back and forth; and 25 minutes later, the strength, as needed for peeling off the double coated tape from the soft vinyl chloride sheet at a peeling angle of 180 degrees at a rate of 300 mm/minute, was measured. The value after acceleration by heating was measured as follows: the double coated tape was lined with a PET film, as treated with corona discharge, and cut into 20 mm width, attached onto a 2-mm-thick soft vinyl chloride sheet (#480; made by Okamoto Industries, Inc.; plasticizer 50 phr; as lined with an aluminum sheet using a commercially available adhesive double coated tape) by running a 2-kg-heavy rubber roller thrice back and forth, and left under atmosphere of 80° C. for 3 days and then under atmosphere of 23° C. and 65% RH for 2 hours; and then the strength, as needed for peeling off the double coated tape from the soft vinyl chloride sheet at a peeling angle of 180 degrees at a rate of 300 mm/minute, was measured.

TABLE D2

| | No. of polymer used | Type and amount of crosslinking agent (appearance wt %/polymer solution) | Example No. of pressure sensitive adhesive composition | Holding power Pressure sensitive adhesive single coated sheet Initial | Pressure sensitive adhesion (g/20 mm) Pressure sensitive adhesive single coated sheet | |
|---|---|---|---|---|---|---|
| | | | | | Initial | 80° C. × 3 days |
| Example D21 | D1 | Colonate L55E *1 0.21 | Example D11 | 0.30 mm | 990 | 1280 |
| Example D22 | D2 | Colonate L55E *1 0.22 | Example D12 | 0.30 mm | 1110 | 1260 |
| Example D23 | D3 | Colonate L55E *1 0.28 | Example D13 | 0.30 mm | 1290 | 960 |
| Example D24 | D4 | Colonate L55E *1 0.26 | Example D14 | 0.30 mm | 1150 | 720 |
| Example D25 | D1 | TETRAD-C *2 0.56 | Example D15 | 0.25 mm | 1690 | 1660 |
| Example D26 | D2 | TETRAD-C *2 0.63 | Example D16 | 0.30 mm | 1470 | 1230 |
| Example D27 | D3 | TETRAD-C *2 0.65 | Example D17 | 0.30 mm | 1190 | 960 |
| Example D28 | D4 | TETRAD-C *2 1.05 | Example D18 | 0.35 mm | 1060 | 710 |

*1 wt % of 11% solution per 100% polymer
*2 wt % of 5% solution per 100% polymer

TABLE D3

| | Type and amount of crosslinking agent (appearance wt %/ polymer solution) | Comparative Example No. of pressure sensitive adhesive composition | Holding power Pressure sensitive adhesive single coated sheet Initial | Pressure sensitive adhesion (g/20 mm) | | | |
|---|---|---|---|---|---|---|---|
| | | | | Pressure sensitive adhesive single coated sheet | | Pressure sensitive adhesive double coated tape | |
| No. of polymer used | | | | Initial | 80° C. × 3 days | Initial | 80° C. × 3 days |
| Comparative Example D21 | Commercially available double coated tape A for soft vinyl chloride | | 0.6 mm | — | — | 1930 | 800 |
| Comparative Example D22 | Commercially available double coated tape B for soft vinyl chloride | | Fell off-after 0.2 hours | — | — | 1760 | 940 |
| Comparative Example D23 | Commercially available double coated tape C for soft vinyl chloride | | Fell off-after 15.7 hours | — | — | 2030 | 940 |

As seen in Tables D1 to D3, it is understood that the pressure sensitive adhesive products of examples according to the present invention are suitable for pressure sensitive adhesive single coated sheets or pressure sensitive adhesive double coated tapes, depending upon the molecular weights of the resultant polymers (acrylic graft polymers or acrylic block polymers), but that they have excellent, initial pressure sensitive adhesion, prevent the cohesion of the pressure sensitive adhesive layers from being decreased by the migration of plasticizer from soft vinyl chloride due to the acceleration by heating, and maintain its pressure sensitive adhesion at higher dimensions than those of comparative examples not according to the present invention.

Herein, the glass transition temperatures (Tg: K) of the resultant acrylic copolymers were determined from the following data in accordance with the following formula.

| Acrylic acid | 379 (K) |
|---|---|
| Methyl acrylate | 281 (K) |
| Ethyl acrylate | 251 (K) |
| Butyl acrylate | 219 (K) |
| 2-Ethylhexyl acrylate | 203 (K) |
| 2-Hydroxyethyl acrylate | 258 (K) |
| Methyl methacrylate | 378 (K) |
| Vinyl acetate | 305 (K) |
| Acrylonitrile | 398 (K) |
| Styrene | 373 (K) |

$$\frac{1}{Tg} = \frac{W_1}{Tg_1} + \frac{W_2}{Tg_2} + \ldots \frac{W_n}{Tg_n}$$

wherein $W_n$ denotes the proportion by weight of a monomer, and $Tg_n$ denotes Tg (K) of a homopolymer of each monomer.

Figure 5:
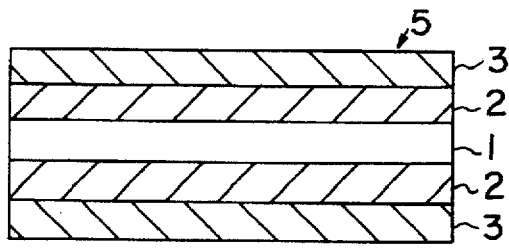
FIG. 5 is a sectional view showing an example of the pressure sensitive adhesive tapes of the present invention.

FIG. 5 is a sectional view showing an example of the pressure sensitive adhesive products of the present invention. The pressure sensitive adhesive product of this example is a pressure sensitive adhesive double coated tape 5, and has a carrier 1, pressure sensitive adhesive layers 2, and separators 3. The pressure sensitive adhesive layers 2 are formed on both faces of the carrier 1. Each of the separators 3 is attached onto one face of each of the pressure sensitive adhesive layers 2 so as to cover this face with the separator, and the other face of each of the pressure sensitive adhesive layers 2 is attached onto the carrier 1.

Figure 6:
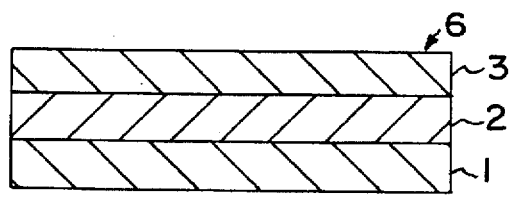
FIG. 6 is a sectional view showing an example of the pressure sensitive adhesive tapes of the present invention.

FIG. 6 is a sectional view showing another example of the pressure sensitive adhesive products of the present invention. The pressure sensitive adhesive product of this example is a pressure sensitive adhesive single coated tape 6, and has a carrier 1, a pressure sensitive adhesive layer 2, and a separator 3. The pressure sensitive adhesive layer 2 is formed on one face of the carrier 1. The separator 3 is attached onto one face of the pressure sensitive adhesive layer 2 so as to cover this face with the separator, and the other face of the pressure sensitive adhesive layer 2 is attached onto the carrier 1.

The carrier 1 is formed from a pressure sensitive adhesive composition of the present invention including an acrylic block polymer. As mentioned above, a monomer mixture further including a reactive functional group-containing polymerizable unsaturated monomer may be used in order to produce the acrylic polymer. In the case where the acrylic polymer is produced using this monomer mixture, the resin composition of the present invention for a carrier may further include a crosslinking agent, as mentioned above.

The pressure sensitive adhesive layer 2 is, for example, formed by conventional methods using conventional acrylic pressure sensitive adhesives, natural rubber-based pressure sensitive adhesives, synthetic rubber-based pressure sensitive adhesives, or the like.

The separator 3 is, for example, release paper.

The pressure sensitive adhesive tapes as shown in FIGS. 5 and 6 are, for example, attached onto base materials such as: polyvinyl chloride moldings; aluminum foil; and sheets of polyolefins such as polyethylene and polypropylene; after the separators 3 have been released from the tapes.

(Production examples of acrylic block polymer)

Example E1

A mixture of 400 parts of styrene and 5.0 parts of pentaerythritol tetrakisthioglycolate was placed into a four-necked 3-liter flask equipped with a thermometer, a stirrer, a max blending wing (made by Sumitomo Heavy Industries, Ltd.), an inert gas-introducing tube, a reflux condenser and a dropping funnel, and a polymerization reaction was carried out at 140° C. under nitrogen atmosphere. Three hours later, 570 parts of butyl acrylate and 30 parts of acrylic acid were added at once. As the internal temperature of the flask rose after a while, the reaction mixture got white turbidity, which showed that a second polymerization step had started. The reaction was carried out at the reflux temperature of the monomer mixture for 6 hours. As a result, the polymerization conversion reached 98.5%. The residual monomers were removed under reduced pressure, and 1,000 parts of toluene and 800parts of ethyl acetate were then added into the reaction mixture to dissolve it, thus obtaining an acrylic copolymer (E1) solution having a solid content of 35.3% and a viscosity of 16,000 cps (this viscosity and the following viscosities were measured using a Brookfield type rotating viscometer).

Examples E2 to E5

The procedure of Example E1 was repeated except that the reaction starting materials and/or the reaction conditions were changed to those shown in Table E1, thus obtaining an acrylic copolymer solution having a solid content, a viscosity, and a weight-average molecular weight, as shown in Table E1.

Comparative Examples E1 to E6

The procedure of Example E1 was repeated except that the reaction starting materials and/or the reaction conditions were changed to those shown in Table E1, thus obtaining an acrylic copolymer solution having a solid content, a viscosity, and a weight-average molecular weight, as shown in Table E1.

TABLE E1

| | First polymerization step *1 | | | | | Second polymerization step *2 | | | Solution of resultant acrylic copolymer *4 | | | |
|---|---|---|---|---|---|---|---|---|---|---|---|---|
| | Amount charged /parts by weight | | Polymerization conversion (CONV. /wt %) | Mw /10⁴ *3 | Mn /10⁴ *3 | Type and amount of monomer added /parts by weight | Polymerization conversion (CONV. /wt %) | Polymerization period /h | Mw /10⁴ | Mn /10⁴ | Viscosity /cps | Solid content /wt % |
| | Monomer | PETG | | | | | | | | | | |
| Example E1 | St 400 | 5.0 | 77.0 | 13.2 | 1.6 | BA 570, AA 30 | 98.5 | 6.0 | 27.0 | 2.5 | 16,000 | 35.3 |
| Example E2 | St 400 | 10.0 | 81.5 | 10.8 | 0.7 | BA 570, AA 30 | 98.2 | 6.0 | 18.0 | 1.3 | 13,200 | 35.3 |
| Example E3 | St 400 | 15.0 | 81.5 | 8.8 | 0.5 | BA 570, AA 30 | 97.7 | 6.0 | 15.7 | 1.0 | 11,400 | 35.2 |
| Example E4 | St 400 | 2.0 | 92.0 | 17.3 | 4.0 | BA 570, AA 30 | 98.1 | 7.0 | 35.2 | 9.3 | 23,000 | 35.3 |
| Example E5 | St 400 | 0.5 | 83.5 | 17.1 | 9.8 | BA 570, AA 30 | 97.9 | 7.0 | 40.5 | 6.5 | 28,600 | 35.2 |
| Comparative Example E1 | St 500 | 9.6 | 93.1 | 11.4 | 2.9 | BA 475, AA 25 | 98.5 | 7.0 | 13.7 | 3.1 | 14,300 | 35.3 |
| Comparative Example E2 | St 450 | 1.0 | 87.2 | 12.9 | 7.3 | BA 520, AA 30 | 98.5 | 7.0 | 28.9 | 6.6 | 15,500 | 35.2 |
| Comparative Example E3 | ST 450 | 1.0 | 83.1 | 12.8 | 9.1 | BA 490, AA 60 | 97.9 | 8.0 | 24.9 | 7.5 | 22,000 | 35.5 |
| Comparative Example E4 | St 300 | 1.0 | 85.1 | 17.0 | 5.5 | BA 665, AA 35 | 99.2 | 6.0 | 42.1 | 6.0 | 25,200 | 35.6 |
| Comparative Example E5 | St 200 | 1.0 | 82.1 | 18.1 | 4.8 | BA 760, AA 40 | 94.0 | 5.0 | 51.5 | 7.2 | 17,400 | 35.4 |
| Comparative Example E6 | PETG 0.5, St 400, BA 570, AA 30 random copolymer | | | | | | 99.0 | 5.0 | 19.0 | 5.4 | 13,500 | 34.8 |

*1 St: styrene, PETG: pentaerythritol tetrakisthioglycolate, glass transition temperature of polymer of monomer: 373 K. in Examples E1 to E5 and Comparative Examples E1 to E5, polymerization period: all 3 hours
*2 BA: butyl acrylate, AA: acrylic acid, calculated value of glass transition temperature of polymer of monomer mixture: 224 K. in Examples E1 to E5 and Comparative Examples E1, E2, E4 and E5, 230 K. in Comparative Example B, 266 K. in Comparative Example E6
*3 Weight-average molecular weight (Mw) and number-average molecular weight (Mn) after completion of first polymerization step (value measured by GPC; standard polystyrene was used as standard)
*4 Weight-average molecular weight (Mw) and number-average molecular weight (Mn) after completion of second polymerization step (value measured by GPC; standard polystyrene was used as standard) Brookfield type viscometer of 25° C. and 12 rpm; nonvolatile content was determined by removing volatile components at 150° C. for 20 minutes.

(Resin composition for carrier)

Example E11

A resin composition for a carrier was prepared by mixing 0.92 parts (as diluted to a solid content of 10%) of an oxazoline-macromolecular crosslinking agent RS-1200 (made by Nippon Shokubai Co., Ltd., solid content: 50%, oxazoline equivalent: 555) into 100 parts (as calculated in terms of nonvolatile content) of the acrylic copolymer (E1) as obtained in Example E1.

Comparative Example E11

A resin composition for a carrier was prepared by mixing 0.80 parts (as diluted to a solid content of 10%) of an oxazoline-macromolecular crosslinking agent RS-1200 (made by Nippon Shokubai Co., Ltd., solid content: 50%, oxazoline equivalent: 555) into 100 parts (as calculated in terms of nonvolatile content) of the acrylic copolymer (E1) as obtained in Comparative Example E1.

Examples E12 to E15 and Comparative Examples E12 to E16

The procedure of Example E11 was repeated except that the acrylic copolymer solution and the amount of the crosslinking agent were changed to those shown in Table E2, thus obtaining a resin composition for a carrier.

TABLE E2

| | Type and amount (as diluted to solid content of 10%) (parts) of crosslinking agent | Example No. and Comparative Example No. and amount (parts) as calculated in terms of nonvolatile content of acrylic copolymer solution |
|---|---|---|
| Example E11 | RS-1200 (0.92) | Example E1 (100) |
| Example E12 | RS-1200 (0.92) | Example E2 (100) |
| Example E13 | RS-1200 (0.92) | Example E3 (100) |
| Example E14 | RS-1200 (0.80) | Example E4 (100) |
| Example E15 | RS-1200 (0.75) | Example E5 (100) |
| Comparative Example E11 | RS-1200 (0.80) | Comparative Example E1 (100) |
| Comparative Example E12 | RS-1200 (0.80) | Comparative Example E2 (100) |
| Comparative Example E13 | RS-1200 (0.50) | Comparative Example E3 (100) |
| Comparative Example E14 | RS-1200 (0.92) | Comparative Example E4 (100) |
| Comparative Example E15 | RS-1200 (0.92) | Comparative Example E5 (100) |
| Comparative Example E16 | RS-1200 (0.60) | Comparative Example E6 (100) |

The resin composition for a carrier, as obtained in Example E11, was coated on both faces of release paper (70K-818T/EF made by Fujimori Kogyo Co., Ltd.) so as to form a 300-μm-thick dried film, dried at 50° C. for 10 minutes and then at 80° C. for 10 minutes, and matured at 23° C. for 7 days, thus obtaining a carrier of a pressure sensitive adhesive double coated tape.

Examples E22 to E25 and Comparative Examples E21 to E26

The procedure of Example E21 was repeated except that the resin composition for a carrier was changed to that shown in Table E3, thus preparing a carrier of a pressure sensitive adhesive double coated tape.

The dynamic viscoelasticity and the tensile stress of the resultant carriers were measured in the following way, and their results are shown in Table E3.

The dynamic viscoelasticity was measured as follows: the temperature dependence of the storage elasticity modulus and of the loss elasticity modulus was measured, using a dynamic-viscoelasticity measurement device (RDA-2) available from Rheometrics, Inc., under conditions where the frequency was 10 Hz and the measurement temperature was in a range of −70° to 100° C. The glass transition temperature was determined as a peak temperature of a loss coefficient (tan δ=storage elasticity modulus/loss elasticity modulus).

The tensile stress was measured as follows: the sheets of the carriers as obtained in Examples E21 to E25 and Comparative Examples E21 to E26 were cut into a dumbbell mold (#2 according to JIS-K6301); and the tensile stress of the carriers as elongated by 10% or 400% was measured using a desktop type precise almighty test machine (Autograph AGS-D Type 3 made by Shimadzu Corporation) under conditions where the measurement temperatures were 23° C. and 80° C. and the tensile rate was 200 mm/minute.

TABLE E3

| Example No. and Comparative Example No. | Example No. of resin composition for carrier | Carrier for pressure sensitive adhesive tape | | | | | | |
|---|---|---|---|---|---|---|---|---|
| | | Storage elasticity modulus (dyne/cm²) | | Glass transition temperature | Tensile stress (kg/cm²) | | | |
| | | /10⁹ | /10⁶ | | 23° C. | | 80° C. | |
| | | at −20° C. | at 80° C. | Tg (°C.) | 10% | 400% | 10% | 400% |
| Example E21 | Example E11 | 4.0 | 2.1 | 3 | 3.0 | 10.2 | 3.0 | 4.0 |
| Example E22 | Example E12 | 3.8 | 1.9 | 3 | 3.0 | 11.0 | 3.0 | 6.0 |
| Example E23 | Example E13 | 3.8 | 1.9 | 5 | 2.9 | 10.5 | 2.9 | 5.0 |
| Example 24 | Example E14 | 3.9 | 2.2 | 5 | 2.8 | 13.0 | 2.8 | 5.5 |
| Example 25 | Example E15 | 4.1 | 2.3 | 5 | 2.7 | 13.9 | 2.7 | 5.6 |
| Comparative Example E21 | Comparative Example E11 | 5.5 | 2.5 | 21 | 4.5 | 34.8 | 4.2 | 18.0 |
| Comparative Example E22 | Comparative Example E12 | 5.2 | 2.4 | 15 | 4.0 | 28.2 | 3.8 | 13.2 |
| Comparative Example E23 | Comparative Example E13 | 6.8 | 3.9 | 20 | 6.8 | 41.9 | 6.5 | 29.7 |
| Comparative Example E24 | Comparative Example E14 | 3.7 | 1.3 | 2 | 3.0 | 17.7 | 2.2 | 5.8 |
| Comparative Example E25 | Comparative Example E15 | 2.1 | 1.1 | −5 | 2.5 | 4.5 | 2.0 | 2.3 |
| Comparative Example E26 | Comparative Example E16 | 2.1 | 1.0 | 18 | 8.3 | 51.1 | 0.3 | 0.5 |

(Pressure sensitive adhesive product)

Example E31

A pressure sensitive adhesive double coated tape was obtained by attaching a pressure sensitive adhesive (as prepared by adding and mixing 1.4 parts of Colonate L55E as a crosslinking agent into 100 parts of a 45% solution of a pressure sensitive adhesive, Aroset 8580, made by Nippon Shokubai Co., Ltd.) onto both faces of the carrier as obtained in Example E21 so as to form a 25-μm-thick dried film on the faces.

Examples E32 to E35 and Comparative Examples E31 to E36

The procedure of Example E31 was repeated except that the carrier was changed to that shown in Table E4, thus preparing a pressure sensitive adhesive double coated tape.

The 180°-peel strength (pressure sensitive adhesion), the lap shear strength, the holding power, and the resistance to lifting with regard to the resultant pressure sensitive adhesive double coated tapes were measured in the following way according to JIS-Z0237 (1991), and their results are shown in Table E4.

The 180°-peel strength was measured as follows: one face of the double coated tape was lined with a polyethylene telephthalate (PET) film, as treated with corona discharge, under atmosphere of 23° C. and 65% RH, cut into 25 mm width, and then attached onto a stainless steel sheet (SUS304) by running a 2-kg-heavy rubber roller twice back and forth; and 25 minutes later, the strength, as needed for peeling off the double coated tape from the stainless steel sheet at a peeling angle of 180 degrees at a rate of 300 mm/minute, was measured as the 180°-peel strength.

The lap shear strength was measured as follows: a sample of the double coated tape, as cut into the size of 25 mm×25 mm, was attached onto aluminum sheets at 23° C., and pressed by placing a 5-kg weight on it for 10 seconds; and 20 minutes later, the maximum strength, as needed for shearing off the double coated tape from the aluminum sheets at a rate of 10 mm/minute, was measured as the lap shear strength.

The holding power was measured as follows: one face of the double coated tape was lined with a PET film, as treated with corona discharge, under atmosphere of 23° C. and 65% RH, cut into 25 mm width, and then attached in the size of 25 mm×25 mm onto a stainless steel sheet (SUS304), and 20 minutes later maintained at 80° C.; and further 20 minutes later, a time, which passed since the double coated tape was provided with a load of 1 kg and until the double coated tape fell off from the stainless steel sheet, or a degree of the shear of the double coated tape 24 hours after provided with a load of 1 kg, was measured as the holding power.

The resistance to lifting was measured as follows: a 0.4-mm-thick, 20-mm-wide, and 180-mm-long aluminum sheet was attached onto one face of the double coated tape; a 3-mm-thick, 25-mm-wide, and 200-mm-long ABS resin (acrylonitrile-butadiene-styrene resin) plate was attached onto the other face of the double coated tape, and then deformed by flection, and subjected to 10 times of a cooling-heating cycle (leaving at −20° C. for 2 hours →heating to 80° C. over a 30-minute period →leaving at 80° C. for 2 hours →cooling to −20° C. over a 1-hour period), and left at normal temperature; and then a degree in mm, to which both ends of the double coated tape were lifted, was measured as the resistance to lifting.

TABLE E4

| Example No. and Comparative Example No. | | Evaluation of pressure sensitive adhesive properties | | | |
|---|---|---|---|---|---|
| | of carrier for pressure sensitive adhesive tape | 180°-peel strength (kg/25 mm) | Lap shear strength (kg/(25 mm × 25 mm)) | Holding power (mm) | Resistance to lifting |
| Example E31 | Example E21 | 3.3 | 42.1 | 0 | 0 |
| Example E32 | Example E22 | 3.1 | 40.3 | 0 | 0 |
| Example E33 | Example E23 | 3.1 | 40.8 | 0.2 | 0 |
| Example E34 | Example E24 | 2.9 | 41.5 | 0.1 | 0.1 |
| Example E35 | Example E25 | 3.3 | 41.6 | 0.2 | 0.1 |
| Comparative Example E31 | Comparative Example E21 | 1.8 | 42.2 | 0 | 8.5 |
| Comparative Example E32 | Comparative Example E22 | 2.3 | 41.2 | 0 | 4.5 |
| Comparative Example E33 | Comparative Example E23 | 1.8 | 41.3 | 0 | 11.3 |
| Comparative Example E34 | Comparative Example E24 | 3.4 | 40.2 | 1.5 | 10.5 |
| Comparative Example E35 | Comparative Example E25 | 3.6 | 39.8 | 2.5 | 18.2 |
| Comparative Example E36 | Comparative Example E26 | 2.4 | 43.2 | 5 hours | 28.0 |

As seen in Tables E1 to E4, the pressure sensitive adhesive product of the present invention having a carrier for a pressure sensitive adhesive product, which carrier is formed using a resin composition of the present invention for a carrier, is excellent with regard to the peel strength, the lap shear strength, the holding power, particularly the resistance to lifting.

Herein, the glass transition temperature (Tg: K) of the acrylic copolymer was determined in accordance with the aforementioned formula using the aforementioned Tg data of a homopolymer of each monomer.

INDUSTRIAL APPLICATION

The block polymer of the present invention is effectively available for resins for molding, hot-melt adhesives, hot-melt pressure sensitive adhesives, thermoplastic elastomers, resins for toners, carriers for pressure sensitive adhesive double coated tapes of high strength, water-soluble pressure sensitive adhesives, impact resistance-improving resins, compatibilizers, tackifiers, dispersants and the like, and inexpensive, because this block polymer includes a polyvalent mercaptan segment and two or more polymer segments and has a number-average molecular weight of 2,000 to 1,000,000, wherein the two or more polymer segments are radially extended from the polyvalent mercaptan segment and have two or more different compositions.

The process of the present invention for producing a block polymer can easily give a block polymer of the present invention at an industrially low cost, because this process includes a preparation step, a first polymerization step, an adding step, and a second polymerization step, wherein: the preparation step includes a step of preparing a first mixture including a first polymerizable unsaturated monomer and a polyvalent mercaptan; the first polymerization step includes a step of carrying out radical polymerization of the first polymerizable unsaturated monomer, the radical polymerization being initiated with a mercapto group of the polyvalent mercaptan which is contained in the first mixture; the adding step includes a step of adding a second polymerizable unsaturated monomer to a product from the radical polymerization in the first polymerization step, thus producing a second mixture, wherein the second polymerizable unsaturated monomer has a composition different from that of the first polymerizable unsaturated monomer; and the second polymerization step includes a step of carrying out radical polymerization of the polymerizable unsaturated monomers which are contained in the second mixture.

The thermoplastic addition polymer, according to the first embodiment of the present invention, gives a new block polymer having a star-shaped structure including gradient compositions, can enhance its functionality without involving the phase separation and has excellent transparency and mechanical strength, because this thermoplastic addition polymer includes a collective of macromolecules having a polyvalent mercaptan segment and two or more copolymer segments, wherein the copolymer segments include two or more kinds of different polymerizable unsaturated monomer units, are radially extended from the polyvalent mercaptan segment, and have compositions which continuously vary over the entire collective of macromolecules.

The thermoplastic addition polymer, according to the second embodiment of the present invention, has excellent transparency and mechanical strength, because this thermoplastic addition polymer includes two or more kinds of different polymerizable unsaturated monomer units and has a number-average molecular weight of 4,000 to 1,000,000, only one glass transition temperature peak with a width of 50° C. or more, and a parallel-rays transmittance of 85% or more.

The process for producing a thermoplastic addition polymer, according to the present invention, can produce a new thermoplastic addition polymer with industrial ease, wherein the thermoplastic addition polymer can enhance its functionality without involving the phase separation and has excellent transparency and mechanical strength, because this process includes a preparation step, an adding step, and a polymerization step, wherein: the preparation step includes a step of preparing a mixture including a first polymerizable unsaturated monomer and a polyvalent mercaptan; the adding step includes a step of gradually adding a second polymerizable unsaturated monomer to the mixture obtained by the preparation step, wherein the second polymerizable unsaturated monomer has a composition different from that of the first polymerizable unsaturated monomer; and the polymerization step includes a step of carrying out radical polymerization of a mixture of the first polymerizable unsaturated monomer and the added second polymerizable unsaturated monomer during the adding step, the radical polymerization being initiated with a mercapto group of the polyvalent mercaptan.

If the process for producing a thermoplastic addition polymer, according to the present invention, further includes a prepolymerization step of carrying out radical polymerization of the first polymerizable unsaturated monomer in between the preparation step and the adding step, the radical polymerization being initiated with a mercapto group of the polyvalent mercaptan, the process further has an advantage of giving a thermoplastic addition polymer which can more greatly display properties of a polymer deriving from the first polymerizable unsaturated monomer and has a wide range of performance.

The hot-melt resin composition, according to the first embodiment of the present invention, has excellent heat resistance and hot-melt workability, can lessen time, facilities and energy as needed for crosslinking under moisture or under irradiation of energy rays, or the like, in order to obtain the heat resistance, and is difficult to involve the deterioration of performance with time, because this hot-melt resin composition includes a block polymer having a polyvalent mercaptan segment and two or more polymer segments and further having a number-average molecular weight of 10,000 to 200,000, wherein the two or more polymer segments are radially extended from the polyvalent mercaptan segment and have two or more different compositions.

The hot-melt resin composition, according to the second embodiment of the present invention, has excellent heat resistance and hot-melt workability, can lessen time, facilities and energy as needed for crosslinking under moisture or under irradiation of energy rays, or the like, in order to obtain the heat resistance, and is difficult to involve the deterioration of performance with time, because this hot-melt resin composition includes a block polymer obtainable by a production process including a preparation step, a first polymerization step, an adding step, and a second polymerization step, wherein: the preparation step includes a step of preparing a first mixture including a first polymerizable unsaturated monomer and a polyvalent mercaptan; the first polymerization step includes a step of carrying out radical polymerization of the first polymerizable unsaturated monomer, the radical polymerization being initiated with a mercapto group of the polyvalent mercaptan; the adding step includes a step of adding a second polymerizable unsaturated monomer to a reaction mixture obtained by the first polymerization step, thus producing a second mixture, wherein the second polymerizable unsaturated monomer has a composition different from that of the first polymerizable unsaturated monomer; and the second polymerization step includes a step of carrying out radical polymerization of the polymerizable unsaturated monomers which are contained in the second mixture.

The hot-melt resin composition, according to the third embodiment of the present invention, has excellent heat resistance and hot-melt workability, can lessen time, facilities and energy as needed for crosslinking under moisture or under irradiation of energy rays, or the like, in order to obtain the heat resistance, and is difficult to involve the deterioration of performance with time, because this hot-melt resin composition includes a block polymer having a polyvalent mercaptan segment and two or more polymer segments and further having a number-average molecular weight of 10,000 to 200,000, wherein the two or more polymer segments have two or more different compositions including a carboxyl group-containing polymerizable unsaturated monomer unit and a (meth)acrylic acid ester monomer unit and are radially extended from the polyvalent mercaptan segment.

The hot-melt resin composition, according to the fourth embodiment of the present invention, has excellent heat resistance and hot-melt workability, can lessen time, facilities and energy as needed for crosslinking under moisture or under irradiation of energy rays, or the like, in order to obtain the heat resistance, and is difficult to involve the deterioration of performance with time, because this hot-melt resin composition includes a block polymer obtainable by a production process including a preparation step, a first polymerization step, an adding step, and a second polymerization step, wherein: the preparation step includes a step of preparing a first mixture including a first polymerizable unsaturated monomer and a polyvalent mercaptan, wherein the first polymerizable unsaturated monomer includes a carboxyl group-containing polymerizable unsaturated monomer and a (meth)acrylic acid ester monomer; the first polymerization step includes a step of carrying out radical polymerization of the first polymerizable unsaturated monomer, the radical polymerization being initiated with a mercapto group of the polyvalent mercaptan; the adding step includes a step of adding a second polymerizable unsaturated monomer to a reaction mixture obtained by the first polymerization step, thus producing a second mixture, wherein the second polymerizable unsaturated monomer includes a carboxyl group-containing polymerizable unsaturated monomer and a (meth)acrylic acid ester monomer and has a composition different from that of the first polymerizable unsaturated monomer; and the second polymerization step includes a step of carrying out radical polymerization of the polymerizable unsaturated monomers which are contained in the second mixture.

The hot-melt resin composition, according to the fifth embodiment of the present invention, has excellent heat resistance and hot-melt workability, can lessen time, facilities and energy as needed for crosslinking under moisture or under irradiation of energy rays, or the like, in order to obtain the heat resistance, and is difficult to involve the deterioration of performance with time, because this hot-melt resin composition includes a thermoplastic addition polymer including a collective of macromolecules having a polyvalent mercaptan segment and two or more copolymer segments, wherein the two or more copolymer segments include two or more kinds of different polymerizable unsaturated monomer units, are radially extended from the polyvalent mercaptan segment, and have compositions which continuously vary over the entire collective of macromolecules.

The hot-melt resin composition, according to the sixth embodiment of the present invention, has excellent heat resistance and hot-melt workability, can lessen time, facilities and energy as needed for crosslinking under moisture or under irradiation of energy rays, or the like, in order to obtain the heat resistance, and is difficult to involve the deterioration of performance with time, because this hot-melt resin composition includes a thermoplastic addition polymer, wherein the thermoplastic addition polymer includes two or more kinds of different polymerizable unsaturated monomer units and has a number-average molecular weight of 10,000 to 200,000, only one glass transition temperature peak with a width of 50° C. or more, and a parallel-rays transmittance of 85% or more.

The hot-melt resin composition, according to the seventh embodiment of the present invention, has excellent heat resistance and hot-melt workability, can lessen time, facilities and energy as needed for crosslinking under moisture or under irradiation of energy rays, or the like, in order to obtain the heat resistance, and is difficult to involve the deterioration of performance with time, because this hot-melt resin composition includes a thermoplastic addition polymer which is obtainable by a production process including a preparation step, an adding step, and a polymerization step, wherein: the preparation step includes a step of preparing a mixture including a first polymerizable unsaturated monomer and a polyvalent mercaptan; the adding step includes a step of gradually adding a second polymerizable unsaturated monomer to the mixture obtained by the preparation step, wherein the second polymerizable unsaturated monomer has a composition different from that of the first polymerizable unsaturated monomer; and the polymerization step includes a step of carrying out radical polymerization of a mixture of the first polymerizable unsaturated monomer and the added second polymerizable unsaturated monomer during the adding step, the radical polymerization being initiated with a mercapto group of the polyvalent mercaptan.

As to the hot-melt resin composition according to the seventh embodiment of the present invention, if the process for producing a thermoplastic addition polymer further includes a prepolymerization step of carrying out radical polymerization of the first polymerizable unsaturated monomer in between the preparation step and the adding step, the radical polymerization being initiated with a mercapto group of the polyvalent mercaptan, the hot-melt resin composition further has an advantage in that the thermoplastic addition polymer is transparent.

The hot-melt resin composition, according to the eighth embodiment of the present invention, has excellent heat resistance and hot-melt workability, can lessen time, facilities and energy as needed for crosslinking under moisture or under irradiation of energy rays, or the like, in order to obtain the heat resistance, and is difficult to involve the deterioration of performance with time, because this hot-melt resin composition includes a thermoplastic addition polymer including a collective of macromolecules having a polyvalent mercaptan segment and two or more copolymer segments, wherein the two or more copolymer segments include polymerizable unsaturated monomer units including a carboxyl group-containing polymerizable unsaturated monomer unit and a (meth)acrylic acid ester monomer unit, are radially extended from the polyvalent mercaptan segment, and have compositions which continuously vary over the entire collective of macromolecules.

The hot-melt resin composition, according to the ninth embodiment of the present invention, has excellent heat resistance and hot-melt workability, can lessen time, facilities and energy as needed for crosslinking under moisture or under irradiation of energy rays, or the like, in order to obtain the heat resistance, and is difficult to involve the deterioration of performance with time, because this hot-melt resin composition includes a thermoplastic addition polymer, wherein the thermoplastic addition polymer includes a carboxyl group-containing polymerizable unsaturated monomer unit and a (meth)acrylic acid ester monomer unit and has a number-average molecular weight of 10,000 to 200,000, only one glass transition temperature peak with a width of 50° C. or more, and a parallel-rays transmittance of 85% or more.

The hot-melt resin composition, according to the tenth embodiment of the present invention, has excellent heat resistance and hot-melt workability, can lessen time, facilities and energy as needed for crosslinking under moisture or under irradiation of energy rays, or the like, in order to obtain the heat resistance, and is difficult to involve the deterioration of performance with time, because this hot-melt resin composition includes a thermoplastic addition polymer which is obtainable by a production process including a preparation step, an adding step, and a polymerization step, wherein: the preparation step includes a step of preparing a mixture including a first polymerizable unsaturated monomer and a polyvalent mercaptan, wherein the first polymerizable unsaturated monomer includes a carboxyl group-containing polymerizable unsaturated monomer and a (meth)acrylic acid ester monomer; the adding step includes a step of gradually adding a second polymerizable unsaturated monomer to the mixture obtained by the preparation step, wherein the second polymerizable unsaturated monomer includes a carboxyl group-containing polymerizable unsaturated monomer and a (meth)acrylic acid ester monomer and has a composition different from that of the first polymerizable unsaturated monomer; and the polymerization step includes a step of carrying out radical polymerization of a mixture of the first polymerizable unsaturated monomer and the second polymerizable unsaturated monomer during the adding step, the radical polymerization being initiated with a mercapto group of the polyvalent mercaptan.

As to the hot-melt resin composition according to the tenth embodiment of the present invention, if the process for producing a thermoplastic addition polymer further includes a prepolymerization step of carrying out radical polymerization of the first polymerizable unsaturated monomer in between the preparation step and the adding step, the radical polymerization being initiated with a mercapto group of the polyvalent mercaptan, the hot-melt resin composition further has an advantage in that the thermoplastic addition polymer is transparent.

The hot-melt resin composition, according to the eleventh embodiment of the present invention, has excellent heat resistance and hot-melt workability, can lessen time, facilities and energy as needed for crosslinking under moisture or under irradiation of energy rays, or the like, in order to obtain the heat resistance, and is difficult to involve the deterioration of performance with time, because this hot-melt resin composition includes a thermoplastic addition polymer of a branched structure which has two or more (meth)acrylic polymer segments including a carboxyl group-containing polymerizable unsaturated monomer unit and a (meth)acrylic acid ester monomer unit.

As to the hot-melt resin composition according to the eleventh embodiment of the present invention, if the thermoplastic addition polymer further has a polyvalent mercaptan segment and if the (meth) acrylic polymer segments are radially extended from the polyvalent mercaptan segment, the viscosity becomes lower and the cohesion becomes higher.

The hot-melt resin composition, according to the twelfth embodiment of the present invention, has excellent heat resistance and hot-melt workability, because this hot-melt resin composition includes a thermoplastic addition polymer which has a branched structure and is obtainable by a production process including a preparation step and a polymerization step, wherein: the preparation step includes a step of preparing a mixture including a polymerizable unsaturated monomer and a polyvalent mercaptan, wherein the polymerizable unsaturated monomer includes a carboxyl group-containing polymerizable unsaturated monomer and a (meth)acrylic acid ester monomer; and the polymerization step includes a step of carrying out radical polymerization of the polymerizable unsaturated monomer, the radical polymerization being initiated with a mercapto group of the polyvalent mercaptan.

The hot-melt resin composition, according to the thirteenth embodiment of the present invention, has the same features as of any one of the hot-melt resin compositions according to the first to twelfth embodiments of the present invention, but further includes a metal ion source, thus having a lower viscosity and a higher cohesion than those free from a metal ion source, because the block polymer or the thermoplastic addition polymer is crosslinked by a metal ion.

As to the hot-melt resin composition according to the thirteenth embodiment of the present invention, if it further includes a phosphoric acid ester, the bonding force between the carboxyl group and the metal ion is weakened, because the phosphoric acid ester is coordinated to the metal ion, thus the hot-melt workability is improved.

The hot-melt resin composition, according to the fourteenth embodiment of the present invention, has excellent heat resistance and hot-melt workability, can lessen time, facilities and energy as needed for crosslinking under moisture or under irradiation of energy rays, or the like, in order to obtain the heat resistance, and is difficult to involve the deterioration of performance with time, because this hot-melt resin composition includes a (meth)acrylic thermoplastic addition polymer, a metal ion source, and a phosphoric acid ester, wherein the (meth)acrylic thermoplastic addition polymer includes a carboxyl group-containing polymerizable unsaturated monomer unit and a (meth)acrylic acid ester monomer unit.

The hot-melt resin composition, according to the fifteenth embodiment of the present invention, has the same features as of any one of the hot-melt resin compositions according to the first to fourteenth embodiments of the present invention, but further includes a tackifier resin, thus having a lower viscosity and a higher cohesion than those free from a tackifier resin.

The hot-melt resin composition, according to the sixteenth embodiment of the present invention, has the same features as of any one of the hot-melt resin compositions according to the first to fifteenth embodiments of the present invention, but further includes wax, thus having a lower viscosity than those free from wax.

The pressure sensitive adhesive composition of the present invention is usable for producing a pressure sensitive adhesive layer for soft vinyl chloride, which layer has excellent balance between the cohesion and the pressure sensitive adhesion, is difficult to involve the deterioration of the cohesion because of the transfer of a plasticizer, and has excellent shelf life that is important to practical use of a pressure sensitive adhesive product, because the pressure sensitive adhesive composition of the present invention includes an acrylic block polymer and an organic solvent, wherein the acrylic block polymer is obtainable by a production process including a preparation step, a first polymerization step, an adding step, and a second polymerization step, wherein: the preparation step includes a step of preparing a first mixture including a polyvalent mercaptan and a first polymerizable unsaturated monomer which is formable into a high glass transition temperature type polymer having a glass transition temperature of 273 K. or higher; the first polymerization step includes a step of carrying out radical polymerization of the first polymerizable unsaturated monomer, the radical polymerization being initiated with a mercapto group of the polyvalent mercaptan, thus producing a reaction mixture; the adding step includes a step of adding a monomer mixture to the reaction mixture, thus producing a second mixture, wherein the monomer mixture is formable into a polymer having no compatibility with the high glass transition temperature type polymer and includes an alkyl (meth)acrylate monomer; and the second polymerization step includes a step of carrying out radical polymerization of the monomers which are contained in the second mixture.

As to the pressure sensitive adhesive composition of the present invention, if the monomer mixture further includes a reactive functional group-containing polymerizable unsaturated monomer, the pressure sensitive adhesive composition further has an advantage in that its cohesion can optionally be controlled using a crosslinking agent having a functional group that is reactive to a reactive functional group of the polymerizable unsaturated monomer.

As to the pressure sensitive adhesive composition of the present invention, if the monomer mixture further includes a reactive functional group-containing polymerizable unsaturated monomer and still further includes a crosslinking agent having at least two functional groups which are reactive to a reactive functional group of the polymerizable unsaturated monomer, the pressure sensitive adhesive composition further has an advantage in that sufficient cohesion is obtainable even if the amount of the crosslinking agent is small.

If a pressure sensitive adhesive product according to an embodiment of the present invention is applied to a soft polyvinyl chloride molding, it has excellent balance between the cohesion and the pressure sensitive adhesion, is difficult to involve the deterioration of the cohesion because of the transfer of a plasticizer, and has excellent shelf life that is important to practical use of a pressure sensitive adhesive product, because the pressure sensitive adhesive product of the present invention has a pressure sensitive adhesive layer for soft vinyl chloride, wherein the pressure sensitive adhesive layer is formed using a pressure sensitive adhesive composition of the present invention.

The resin composition for a carrier, according to the present invention and being formable into a carrier for a pressure sensitive adhesive product, is formable into a pressure sensitive adhesive product which is difficult to detach even if subjected to the lap shear strength and the peel strength, and difficult to lift off from a face, to which the pressure sensitive adhesive product is attached, even if the face is a curved one, because the resin composition for a carrier, according to the present invention, includes an acrylic block polymer which is obtainable by a production process including a preparation step, a first polymerization step, an adding step, and a second polymerization step, wherein: the preparation step includes a step of preparing a first mixture including a polyvalent mercaptan and a first polymerizable unsaturated monomer which is formable into a high glass transition temperature type polymer having a glass transition temperature of 273 K. or higher; the first polymerization step includes a step of carrying out radical polymerization of the first polymerizable unsaturated monomer, the radical polymerization being initiated with a mercapto group of the polyvalent mercaptan, thus producing a reaction mixture; the adding step includes a step of adding a monomer mixture to the reaction mixture, thus producing a second mixture, wherein the monomer mixture is formable into a polymer having no compatibility with the high glass transition temperature type polymer and includes an alkyl (meth)acrylate monomer; and the second polymerization step includes a step of carrying out radical polymerization of the monomers which are contained in the second mixture.

As to the resin composition for a carrier, if the monomer mixture further includes a reactive functional group-containing polymerizable unsaturated monomer and still further includes a crosslinking agent having at least two functional groups which are reactive to a reactive functional group of the polymerizable unsaturated monomer, the resin composition for a carrier has an advantage in that a carrier for a pressure sensitive adhesive product, which has more excellent balance between the cohesion and the pressure sensitive adhesion and further has the controlled stress-dispersibility, is easy to obtain.

A pressure sensitive adhesive product according to another embodiment of the present invention is difficult to detach even if subjected to the lap shear strength and the peel strength, and difficult to lift off from a face, to which the pressure sensitive adhesive product is attached, even if the face is a curved one, because the pressure sensitive adhesive product has a carrier for a pressure sensitive adhesive product and further has a pressure sensitive adhesive layer, wherein the carrier is formed from a resin composition of the present invention for a carrier, and wherein the pressure sensitive adhesive layer is formed on one or both faces of the carrier.

We claim:

1. A star-shaped block polymer, which comprises:

a polyvalent mercaptan segment and at least three polymer segments which are radially extended from the polyvalent mercaptan segment and have two or more different compositions, each of said polymer segments having a number-average molecular weight of 2000 to 200,000 ;

the block polymer having a number-average molecular weight of 10,000 to 400,000.

2. A polymer as in claim 1, wherein the polyvalent mercaptan segment includes a 3- to 6-valent mercaptan residue, and wherein the two or more polymer segments have two different compositions, the polymer being shown by the following general formula (I):

(I)

wherein:

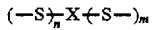

denotes the 3- to 6-valent mercaptan residue wherein X is an organic radical having a valence of 3 to 6;

n+m is a number in a range of 3 to the valence number of the mercaptan residue;

n is a number of 0.1 or more; and m is a number of 0.1 or more.

3. A process for producing a block polymer, which comprises:

a preparation step of preparing a first mixture including a first polymerizable unsaturated monomer and a polyvalent mercaptan;

a first polymerization step of carrying out radical polymerization of the first polymerizable unsaturated monomer, the radical polymerization being initiated with one or more mercapto groups of the polyvalent mercaptan which is contained in the first mixture and producing a first reaction product;

an adding step of adding a second polymerizable unsaturated monomer to said first reaction product from the radical polymerization in the first polymerization step, thus producing a second mixture, wherein the second polymerizable unsaturated monomer has a composition different from that of the first polymerizable unsaturated monomer; and a second polymerization step of carrying out radical polymerization of the polymerizable unsaturated monomers which are contained in the second mixture, said radical polymerization in said second polymerization step being initiated with one or more unreacted mercapto groups of said first reaction product.

4. A hot-melt resin composition, which comprises a star-shaped block polymer having:

a polyvalent mercaptan segment;

two or more polymer segments which are radially extended form the polyvalent mercaptan segment and have two or more different compositions and having a number-average molecular weight of 3,000 to 100,000; and a number-average molecular weight of 10,000 to 200,000.

5. A hot-melt resin composition, which comprises a block polymer being obtained by a production process including:

a preparation step of preparing a first mixture including a first polymerizable unsaturated monomer and a polyvalent mercaptan;

a first polymerization step of carrying out radical polymerization of the first polymerizable unsaturated monomer, the radical polymerization being initiated with one or more mercapto groups of the polyvalent mercaptan and producing a first reaction product;

an adding step of adding a second polymerizable unsaturated monomer to said first reaction product obtained by the first polymerization step, thus producing a second mixture, where the second polymerizable unsaturated monomer has a composition different from that of the first polymerizable unsaturated monomer; and a second polymerization step of carrying out radical polymerization of the polymerizable unsaturated monomers which are contained in the second mixture, said radical polymerization in said second polymerization step being initiated with one or more unreacted mercapto groups of said first reaction product.

6. A hot-melt resin composition, which comprises a star-shaped block polymer having:

a polyvalent mercaptan segment;

at least three polymer segments which have two or more different compositions including a carboxyl group-containing polymerizable unsaturated monomer unit and a (meth)acrylic acid ester monomer unit and are radially extended from the polyvalent mercaptan segment each said polymer segments having a number-average molecular weight of 3,000 to 100,000; and a number-average molecular weight of 10,000 to 200,000.

7. A hot-melt resin composition, which comprises a block polymer being obtained by a production process including:

a preparation step of preparing a first mixture including a first polymerizable unsaturated monomer and a polyvalent mercaptan, wherein the first polymerizable unsaturated monomer includes a carboxyl group-containing polymerizable unsaturated monomer and a (meth)acrylic acid ester monomer;

a first polymerization step of carrying out radical polymerization of the first polymerizable unsaturated monomer, the radical polymerization being initiated with one or more mercapto groups of the polyvalent mercaptan and producing a first reaction product;

an adding step of adding a second polymerizable unsaturated monomer to said first reaction product obtained by the first polymerization step, thus producing a second mixture, wherein the second polymerizable unsaturated monomer includes a carboxyl group-containing polymerizable unsaturated monomer and a (meth)acrylic acid ester monomer and has a composition different from that of the first polymerizable unsaturated monomer; and a second polymerization step of carrying out radical polymerization of the polymerizable unsaturated monomers which are contained in the second mixture, said radical polymerization in said second polymerization step being initiated with one or more unreacted mercapto groups of said first reaction product.

8. A hot-melt resin composition as in claim 4, which further comprises a metal ion source.

9. A hot-melt resin composition as in claim 8, which further comprises a phosphoric acid ester.

10. A hot-melt resin composition as in claim 9, which further comprises a tackifier resin.

11. The process of claim 3, wherein said first and second polymerization steps produce polymer segments having a number-average molecular weight of 5,000 to 200,000.

12. The process of claim 3, wherein said first and second polymerization steps produce polymer segments having a number-average molecular weight of 10,000 to 100,000.

13. The block polymer of claim 1, wherein polymer segments have a number-average molecular weight of at least 2,100.

14. The block polymer of claim 2, wherein said polyvalent mercaptan segment is selected from the group consisting of 3-valent trimethylolpropane-based organic radicals, 4-valent pentaerythritol-based organic groups and 6-valent dipentaerythritol-based organic groups.

15. The block polymer of claim 2, wherein said polyvalent mercaptan segment is selected from the group consisting of trimethylolpropane trithioglycolate, trimethylolpropane trithiopropionate, pentaerythritol tetrakisthioglycolate, pentaerythritol tetrakisthiopropionate, dipentaerythritol hexakisthioglycolate and dipentaerythritol hexakisthiopropionate.

16. The process of claim 3, wherein said polymerization steps are carried out by bulk polymerization or solution polymerization.

17. The composition of claim 5, wherein said polymerization steps are carried out by bulk polymerization or solution polymerization.

18. The composition of claim 7, wherein said polymerization steps are carried out by bulk polymerization or solution polymerization.

19. The process of claim 3, wherein said polyvalent mercaptan contains a plurality of active mercapto groups, and wherein said first reaction product comprises at least one active mercapto group for reacting with said second polymerizable monomer.

* * * * *